(12) United States Patent
Angeli et al.

(10) Patent No.: US 11,184,306 B1
(45) Date of Patent: Nov. 23, 2021

(54) CONTEXTUAL COMMUNICATION ROUTING METHODS AND SYSTEMS

(71) Applicant: Square, Inc., San Francisco, CA (US)

(72) Inventors: Gabor Angeli, Redwood City, CA (US); Pei Xuan Lee, Burlingame, CA (US); Jason Purdy, Alameda, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 17/218,736

(22) Filed: Mar. 31, 2021

Related U.S. Application Data

(60) Provisional application No. 63/131,398, filed on Dec. 29, 2020.

(51) Int. Cl.
| | |
|---|---|
| *H04L 12/58* | (2006.01) |
| *G06F 40/289* | (2020.01) |
| *G06Q 10/10* | (2012.01) |
| *G06F 16/9032* | (2019.01) |
| *G06F 40/30* | (2020.01) |

(52) U.S. Cl.
CPC ........ *H04L 51/14* (2013.01); *G06F 16/90332* (2019.01); *G06F 40/289* (2020.01); *G06F 40/30* (2020.01); *G06Q 10/1095* (2013.01)

(58) Field of Classification Search
CPC .............. H04L 51/14; G06F 16/90332; G06F 16/24575; G06F 40/289; G06F 40/30; G06Q 10/1095; G10L 15/1815; G10L 15/22
See application file for complete search history.

(56) References Cited

U.S. PATENT DOCUMENTS

| | | | |
|---|---|---|---|
| 8,996,639 B1* | 3/2015 | Faaborg | H04L 51/02 709/206 |
| 9,754,591 B1* | 9/2017 | Kumar | G10L 15/183 |
| 9,881,288 B1* | 1/2018 | Bell | G06F 3/04886 |
| 10,366,378 B1* | 7/2019 | Han | G06Q 20/202 |
| 10,402,064 B1* | 9/2019 | Al-Sallami | G06Q 20/20 |
| 10,594,757 B1* | 3/2020 | Shevchenko | H04L 65/605 |
| 2005/0241440 A1* | 11/2005 | Beck | B23P 15/40 76/106.5 |
| 2010/0322395 A1* | 12/2010 | Michaelis | H04M 3/5307 379/88.14 |

(Continued)

*Primary Examiner* — Eric Yen
(74) *Attorney, Agent, or Firm* — Lee & Hayes, P.C.

(57) ABSTRACT

Contextual routing and/or management of communications is described. Server(s) of service provider can receive a first communication via a first communication channel. The first communication can be associated with a first service offered by the service provider and with a merchant identifier of a merchant that is an intended recipient of the first communication. The server(s) can generate, based at least partly on context data associated with the first communication, a recommendation for the merchant to respond via (i) a second communication channel that is different than the first communication channel and/or (ii) a second service that is different than the first service. The server(s) can cause the first communication and the recommendation to be presented via a consolidated communication user interface of a computing device of the merchant that presents (i) the first communication and (ii) a second communication between the merchant and a second customer of the merchant.

20 Claims, 15 Drawing Sheets

(56) References Cited

U.S. PATENT DOCUMENTS

| | | | | |
|---|---|---|---|---|
| 2014/0280579 | A1* | 9/2014 | Auger | G06Q 50/01 709/204 |
| 2015/0142717 | A1* | 5/2015 | Guiver | G06Q 10/107 706/46 |
| 2015/0200899 | A1* | 7/2015 | Sanketi | H04L 51/24 709/206 |
| 2016/0055571 | A1* | 2/2016 | Wouhaybi | G06Q 30/0635 705/12 |
| 2017/0364504 | A1* | 12/2017 | Dandapat | G06F 40/279 |
| 2018/0005289 | A1* | 1/2018 | Angell | G06Q 30/0613 |
| 2018/0052909 | A1* | 2/2018 | Sharifi | G06F 16/3326 |
| 2018/0174152 | A1* | 6/2018 | Fortin | G06Q 20/40145 |
| 2019/0102376 | A1* | 4/2019 | Agrawal | G06F 40/30 |
| 2019/0204868 | A1* | 7/2019 | Choi | G06F 1/1626 |
| 2019/0207876 | A1* | 7/2019 | Terry | G06Q 10/1093 |
| 2019/0378194 | A1* | 12/2019 | Jarvis | G06F 16/9537 |
| 2020/0034430 | A1* | 1/2020 | Hoshino | G06F 40/30 |

\* cited by examiner

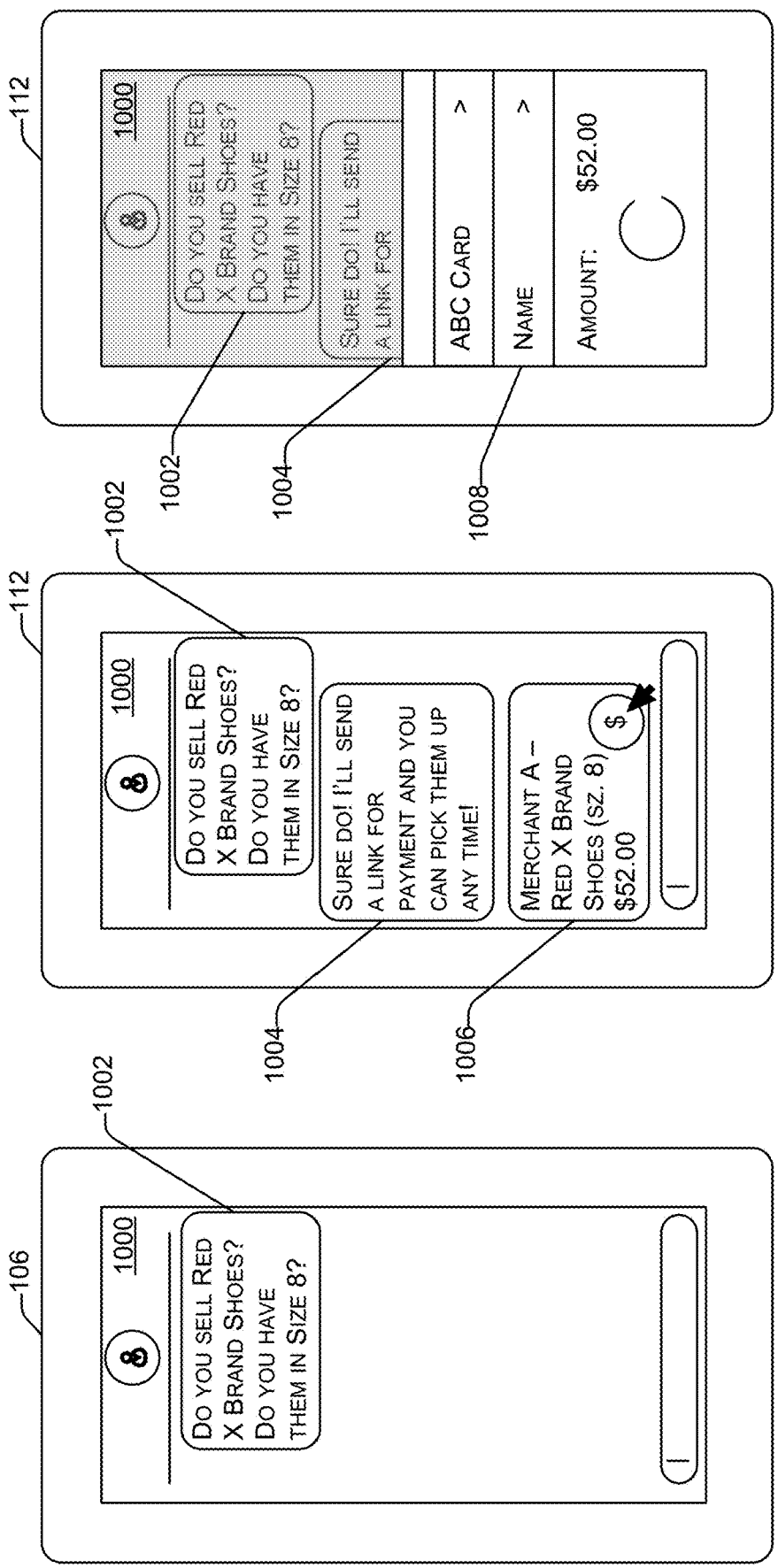

CONTEXTUAL COMMUNICATION ROUTING METHODS AND SYSTEMS

PRIORITY

This application claims priority to U.S. Provisional Application No. 63/131,398, filed on Dec. 29, 2020, the entire contents of which are incorporated by reference herein.

TECHNICAL FIELD

Users utilize different communication channels such as text messaging, email messaging, social media messaging, etc. to communicate with one another. In a business setting, merchants and customers can exchange multiple communications to schedule an appointment, reschedule an appointment, and cancel an appointment. Communications can be difficult to manage in view of the different communication channels through which merchants and customers can communicate to facilitate various interactions.

BRIEF DESCRIPTION OF THE DRAWINGS

Features of the present disclosure, its nature and various advantages, will be more apparent upon consideration of the following detailed description, taken in conjunction with the accompanying drawings.

FIGS. 10A-10C illustrate an example user interface associated with conversational commerce, as described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
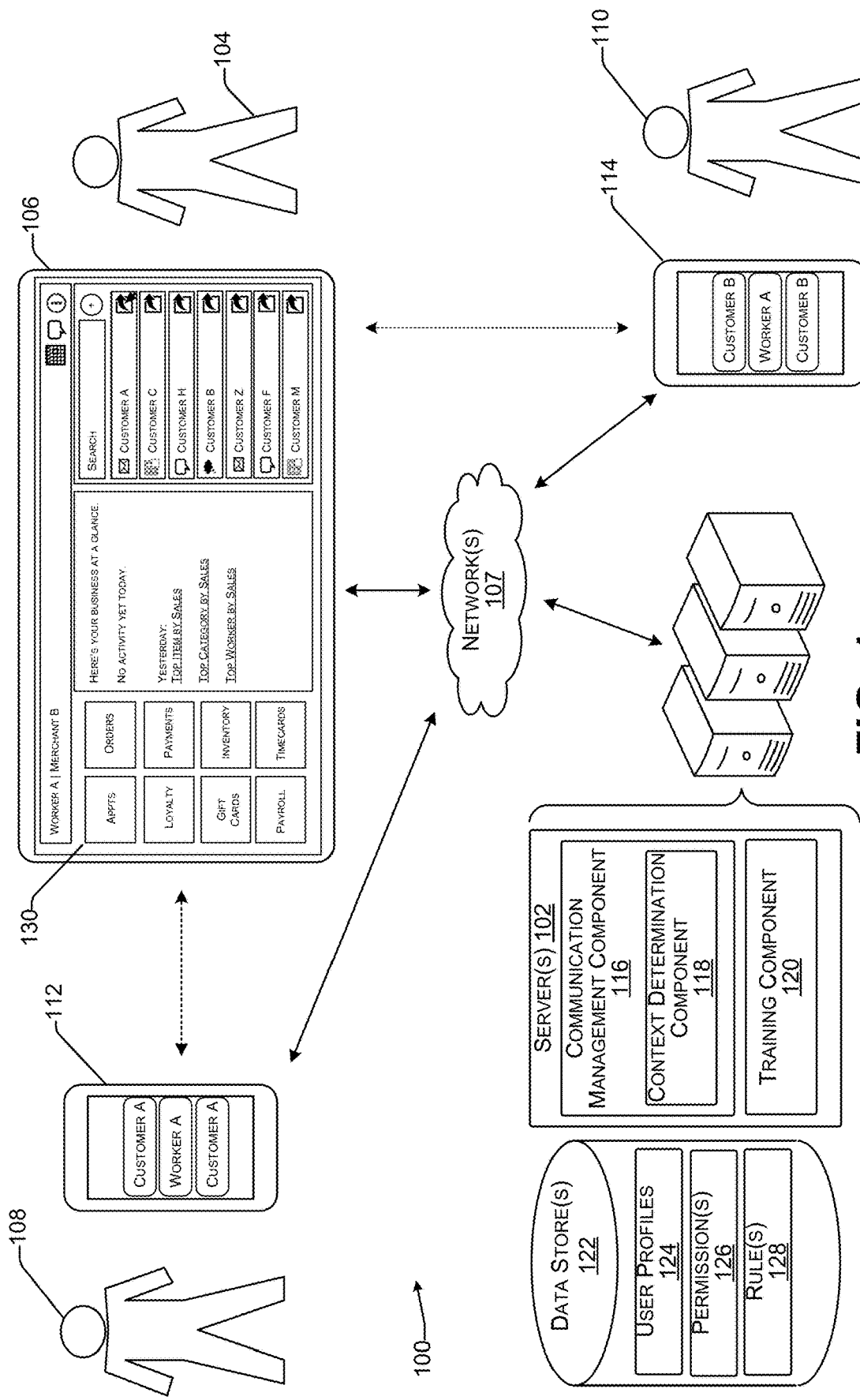
FIG. 1 illustrates an example environment for performing techniques described herein.

Contextual communication routing and/or management is described. A service provider can provide multiple services, each of which can enable a merchant to perform various business operations. Examples of such services include a feedback service (e.g., to receive feedback about various aspects of a business), an appointment service (e.g., for managing appointments), a payroll service (e.g., for making payroll payments to workers of the merchant), a marketing service (e.g., for marketing item(s) offered by the merchant), a directory service (e.g., for maintaining contact information of contacts of the merchant), a gift card service (e.g., for ordering and/or selling gift cards or other stored value cards), a loyalty service (e.g., for managing loyalty rewards and/or redemptions), an invoice service (e.g., for managing invoices for services rendered and/or goods purchased), an estimate service (e.g., for managing estimates for services to be rendered and/or goods to be purchased), a contracts service (e.g., for managing contracts between the merchant and other entities), a reservation service (e.g., for managing reservations), an ecommerce service (e.g., for facilitating online or "ecommerce" transactions), a chat service (e.g., for facilitating communications between the merchant and other entities), a payment processing service (e.g., for processing payments on behalf of the merchant), and/or the like. In some examples, a merchant can utilize individual platforms associated with the services to communicate with other users (e.g., customers, vendors, etc.). In some examples, each platform can be associated with multiple, different communication channels through which the merchant can send or receive communications. For instance, a merchant can send or receive communications via text, email, social media, an application (e.g., first-party, third-party, etc.), and/or the like. Further, such communications can be text-based, image-based, voice-based, or based on any combination of the foregoing or other data. Techniques described herein enable a merchant to access communications from different communication channels and/or platforms via a single access point (e.g., a consolidated communication user interface) that allows the merchant to access and/or manage communications from multiple communication channels and/or multiple platforms from one platform without having to navigate between different communication channels and/or platforms. That is, techniques described herein enable two-way communication between merchants and customers via a single access point (e.g., a consolidated communication user interface).

In some examples, techniques described herein utilize context data (e.g., a date associated with a communication, a time associated with the communication, a topic associated with the communication, content of the communication, a merchant preference of a merchant associated with the communication, a customer preference of a customer associated with the communication, a communication channel via which the communication was received, a service/platform via which the communication was received, etc.) to optimize communication by recommending or automatically (e.g., without user input) switching to a different communication channel (e.g., text communication, email communication, social media communication, in-application notification, and/or the like) and/or platform during a conversation with a user. For example, a customer can email a merchant to schedule an appointment via an appointment service. Based at least in part on determining contextual data associated with the incoming email, techniques described herein can determine that a different communication channel (e.g., text, in-application notification, social media, telephone, etc.) and/or platform is better (e.g., for efficiency purposes) for responding to the customer than via a return email and/or the platform associated with the appointment service. This can optimize communication so that a responsive communication is transmitted through a communication channel that is appropriate for the situation and via an appropriate platform.

In at least one example, techniques described herein can utilize machine-trained models to determine context data associated with communications. In some examples, such machine-trained models can be trained based on temporal expressions. As such, context data can be used for negotiating time elements in communications. In some examples, the machine-trained models described above can be utilized by a virtual assistant or other bot to automate communications between users associated with the service provider described herein. In some examples, the machine-trained models can be utilized by a computing component to generate recommendations that can be used to streamline communications as described herein. As an example, a communication can be received and analyzed using a machine-trained model as described herein. In some examples, the communication can first be parsed using natural language processing, image processing, or the like. In at least one example, after a communication is parsed, an expression (e.g., temporal expression, geographical/location expression, a commercial expression, etc.) can be identified in the communication and the expression can be used to determine a response to the communication. This can be particularly helpful in extracting details with respect to time, for example, for appointments, reservations, or the like, and/or with respect to location for moving the appointment from one location to another. Examples are provided below. However, the machine-learning techniques described herein can be applicable to additional or alternative implementations.

In at least one example, techniques described herein can utilize stored and/or determined permissions and/or rules to route communications to certain workers and/or devices. For instance, context data associated with a communication can trigger an authorization event (e.g., based on the stored and/or determined permissions and/or rules) such that the communication can be routed to a particular worker and/or device for handling. As an example, if a customer requests a coupon or a discount, the communication can be routed to a manager to handle instead of routing to another worker who does not have the authority to provide a coupon or discount. In some examples, multiple workers can be associated with a same merchant and the stored and/or determined permissions and/or rules can filter or otherwise selectively present communications to certain workers and not other workers. As an example, if a communication is associated with a question for a particular hair stylist in a salon, the communication can be presented for viewing by the particular hair stylist and may not be viewed by other hair stylists (e.g., based on the stored permissions and/or rules). In a similar manner, permissioning rules can be based on device attributes, such that the communications can be parsed (e.g., for context based on "vocabulary and tone detection") and automatically routed to specific devices capable of handling the communications. In at least one example, computing devices of workers can be configured to handle communications routed thereto based on provisioning functionality to such computing devices for the particular request, for a particular time/duration, and/or the like. In some examples, an application, a portion of an application (i.e., an instant application), or other software can be downloaded to or otherwise accessed by a computing device of a worker to handle a request and/or manage conversation associated with such a request. The application, the portion of the application, or other software can be downloaded to or otherwise accessible by the computing device for the duration of the conversation.

Techniques described herein thus support optimized switching between communication channels and/or services/platforms based on context. The contextual analysis, in one example, can be through model interpretation of temporal terms. Messages from different services/platforms can also be consolidated on one interface, and, in some examples, can be accessible via a software developer kit (SDK) platform and/or application programming interface (API). That is, disparate services/platforms (e.g., first-party or third-party) can utilize SDKs or APIs to exchange communications via techniques described herein. Further, techniques described herein allow authorization triggers to be set such that certain communications are automatically routed to certain workers/devices based on context in the communications. For example, if a customer requests coupon, a computing device can send an authorization request to a manager (e.g., via a chat interface, a push notification, an email, a text message, etc.), and can transition control back to the original worker after the coupon request is granted. Thus, in some examples, for each communication, there can be a customized tree of interaction that dictates the flow of information between the customer and the merchant (and all merchant entities). This tree can vary based on each interaction and each customer-merchant relationship. Such a tree can be stored as a rule, as described herein.

Techniques described herein offer various improvements over existing communication technologies. For instance, techniques described herein are directed to a consolidated communication user interface, wherein communications sent and/or received via different communication channels and/or service provider platforms can be accessed via a single access point. In at least one example, such a consolidated communication user interface provides an improved user experience and reduces interactions with a user computing device. With existing techniques, merchants receive communications from different platforms and different communication channels. Such communications can be difficult to manage as they can be stored in different locations corresponding to the various platforms and/or communication channels. As described herein, a consolidated communication user interface allows communications to be converted into a "standardized format" for presentation via a dashboard, or other user interface, of a merchant computing device. That is, a communication incoming from a communication channel and/or platform can be converted by a network-based communication management component from its existing format into a standardized format for storage and/or presentation via a user interface (e.g., a consolidated communication user interface). Such a converted communication can be stored in the standardized format in a network-based storage device (e.g., a data store)

and can be presented via the consolidated communication user interface as described herein.

In at least one example, a merchant can have access to the communication(s) via an access point such as an application on a merchant computing device and/or a web browser. That is, a merchant can have remote access through the consolidated communication user interface to view and/or respond to communication(s) received. Such a consolidated communication user interface can provide a source of truth for communications between merchants and customers. In some examples, a merchant can respond to communications via the consolidated communication user interface. In such an example, a response can be converted from the standardized format into a format specific to the communication channel and/or platform to which the communication is to be delivered. Such a consolidated communication user interface allows merchants to manage and/or respond to communications in a single location without needing to access multiple different communication channels and/or user interfaces. In at least one example, such a unified cross-communication channel communication platform allows a single communication script to execute on a merchant computing device with several other communication channels interwoven with the communication script such that regardless of which communication channel the communication originates, the communication can be configured for the merchant or the user. That is, regardless of which platform and/or service a communication originates, techniques described herein can reformat, repackage, reconfigure, etc. such a communication for presentation via a consolidated communication user interface, which can enable the merchant to quickly access incoming and/or outgoing communications without having to manually look up or consolidate communications received and/or sent to the merchant. As such, techniques described herein are directed to an improvement over existing and/or conventional systems by allowing remote users (e.g., merchants) to receive and/or send communications in real time in a standardized format regardless of the format in which the communications are received (e.g., by the service provider) and/or ultimately delivered.

In some examples, threads of communications or conversations can be grouped by services, goods, vendors, merchants, and/or the like. Furthermore, techniques described herein can be similarly implemented for customers. That is, in at least one example, a customer can be associated with a consolidated communication user interface through which customers can respond to multiple merchants and/or otherwise manage communications associated with different merchants, communication channels, and/or the like.

Moreover, in at least one example, techniques described herein can utilize the centralized nature of a network-based service provider and its ability to provide multiple services for merchants associated therewith. The centralized nature of the network-based service provider enables the service provider to access data across multiple platforms associated with the multiple services and to determine context based at least in part on that information. Furthermore data and/or interactions associated with one or more services can be integrated into the consolidated communication user interface and/or conversations as described herein to enable merchants and/or virtual assistants (e.g., bots) to communicate with more relevance, accuracy, and efficiency than is available with existing techniques.

Further, techniques described herein are directed to using machine learning and/or artificial intelligence to intelligently determine which communication channels and/or platforms to route communications. In some examples, such machine learning and/or artificial intelligence can be used to analyze content of an incoming communication (e.g., using natural language processing, image processing, and/or the like) and to intelligently generate a response to the incoming communication. In at least one example, models can be trained using machine learning and/or artificial intelligence using communications and/or other communications transmitted via the service provider. That is, in some examples, communications sent and/or received can be used as training data to train a model that can be used for determining context of future incoming communications. In some examples, such a response can be automatically sent (e.g., without requiring additional input from a merchant) and/or a response can be associated with a recommendation for responding to the incoming communication. In some examples, the machine learning and/or artificial intelligence can be used to negotiate time (e.g., as used in making and/or managing reservations and/or appointments) and minimize the back-and-forth required for managing reservations, appointments, and/or the like. In some examples, the machine learning and/or artificial intelligence can be used to facilitate a payment transaction. The use of such machine learning and/or artificial intelligence can provide an improved user experience and can reduce interactions with a user computing device. That is, such intelligence can reduce merchant interaction with a computing device by automating and/or semi-automating parts of conversational communications. Additionally, in some examples, machine-learning and/or artificial intelligence, as described herein, provide improvements to virtual assistants (e.g., bots) such that virtual assistants can understand requests/queries and respond to said requests/queries with more accuracy.

In at least one example, techniques described herein can provide improvements to existing systems with respect to access control, security, and/or efficiency. As described herein, techniques can use rules, which can be stored on and/or determined by a network-based computing system to control access to certain communications and/or operations (e.g., sending communications), which can provide security and efficiency to systems as described herein. Existing systems can expose communications to workers inappropriately. Existing systems can require transmission of communications among and/or between multiple user computing devices due to the inability to route such communications to appropriate end users for resolution and/or handling. That is, in some examples, existing techniques can require multiple "passes" to route a communication to a proper recipient. Techniques described herein relate to a technological solution to such problems. That is, techniques described herein can utilize a technology-based solution of filtering communications using stored and/or determined permission(s) and/or rule(s) to overcome problems in existing systems.

FIG. 1 illustrates an example environment 100 for performing techniques described herein. In at least one example the environment 100 can include server computing device(s) (e.g., server(s) 102) that can be associated with a service provider. The service provider can provide one or more services. Examples of such services include a feedback service (e.g., to receive feedback about various aspects of a business), an appointment service (e.g., for managing appointments), a payroll service (e.g., for making payroll payments to workers of the merchant), a marketing service (e.g., for marketing item(s) offered by the merchant), a directory service (e.g., for maintaining contact information of contacts of the merchant), a gift card service (e.g., for ordering and/or selling gift cards or other stored value cards), a loyalty service (e.g., for managing loyalty rewards and/or redemptions), an invoice service (e.g., for managing invoices for services rendered and/or goods purchased), an estimate service (e.g., for managing estimates for services to be rendered and/or goods to be purchased), a contracts service (e.g., for managing contracts between the merchant and other entities), a reservation service (e.g., for managing reservations), an ecommerce service (e.g., for facilitating online or "ecommerce" transactions), a chat service (e.g., for facilitating communications between the merchant and other entities), a payment processing service (e.g., for processing payments on behalf of the merchant), and/or the like. In at least one example, individual of the services can be associated with their own platforms and, in some examples, can utilize SDKs to communicate with centralized communication components described herein.

In at least one example, a merchant 104 can operate a computing device, such as a merchant computing device 106, to utilize services offered by the service provider. That is, the merchant computing device 106 can be configured to communicate with the server(s) 102 over one or more networks (e.g., network(s) 107). In some examples, the merchant computing device 106 can have one or more applications stored thereon that can specially configure the merchant computing device 106 to communicate with the server(s) 102. In some examples, the one or more applications can be provided by the service provider (e.g., to access one or more services associated therewith). In some examples, each application can be associated with a service provided by the service provider. In some examples, an application can be associated with multiple services provided by the service provider. In some examples, the merchant 104 can access service(s) of the service provider via a web browser or other access point. As used herein, a "platform" can comprise computing components (e.g., software and a surrounding ecosystem of resources) associated with service(s) provided by the service provider. While a single merchant 104 is illustrated, any number of merchants can be present in the environment 100.

In at least one example, one or more customers, such as a customer 108 and a customer 110, can operate respective computing devices, such as a customer computing device 112 and a customer computing device 114. In at least one example, the customer computing devices 112, 114 can communicate with the merchant computing device 106 via the network(s) 107. In some examples, the customer computing devices 112, 114 can communicate with the merchant computing device 106 directly (e.g., without going through the server(s) 102) and/or indirectly (e.g., via the server(s) 102). In at least one example, the customer computing devices 112, 114 can be associated with functionality to enable the customer computing devices 112, 114 to send and/or receive communications. Such communications can include text communications, email communications, social media communications, first-party application communications (e.g., communications exchanged via an application associated with the service provider), third party application communications (e.g., communications exchanged via an application associated with a party other than the service provider and accessible by the service provider through one or more dedicated API connection points), etc. While two customers 108, 110 and two customer computing devices 112, 114 are shown, any number of customers can be present in the environment 100.

The merchant computing device 106 and the customer computing devices 112, 114 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The server(s) 102 can be one or more servers or other types of computing devices that can be embodied in any number of ways. For example, in the example of a server, components, other functional components, and/or data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication management component 116, which can be associated with a context determination component 118, and a training component 120. In at least one example, the server(s) 102 can be associated with one or more data stores 122, which can store data including, but not limited to, user profiles 124, permission(s) 126, and/or rule(s) 128.

The communication management component 116 can manage and/or route communications as described herein. In at least one example, the customer 108 can send a communication to a merchant 104 via computing devices associated therewith. In at least one example, the customer computing device 112 can send a communication to the merchant computing device 106 via the server(s) 102. In some examples, the customer computing device 112 can send a communication to the merchant computing device 106 directly. In at least one example, the communication can be associated with a merchant identifier identifying the merchant and a customer identifier identifying the customer. In some examples, the customer identifier can be a device identifier or the like. In some examples, the customer identifier can be particular to the type of communication channel through which the communication is transmitted (e.g., a customer identifier can be a phone number if the communication channel is a text communication, an email address if the communication channel is an email, etc.). In at least one example, the communication can be sent via a first communication channel, which can comprise a text communication, an email communication, a communication sent via a first-party application, a communication sent via a third-party application, a social media communication, and/or the like. "Communications," as used herein, can refer to any object, which can be associated with textual elements, graphical elements, image elements, video elements, sound elements, and/or the like, that can be transmitted via a communication channel. In some examples, communications can be associated with attachments, coupons, and/or embedded functionality (e.g., deeplinks, hyperlinks, payment links, etc.). While not described in detail, in at least one example, the customer computing device 112 can initiate a conversation via a phone call. In some examples, the customer computing device 112 can initiate the conversation via a first platform associated with a first service, such as a feedback service, an appointment service, and/or the like, as described above.

As described above, in some examples, the communication management component 116 can receive the communication. The communication management component 116 can determine where to route the communication (e.g., send the communication) based at least in part on the merchant identifier associated with the communication. In some examples, the communication management component 116 can associate a token, or other identifier, with the communication. The token, or other identifier, can be associated with the sending entity (e.g., the customer 108 and/or customer computing device 112). Messages associated with the same token, or other identifier, can be consolidated into a conversation (or "transcript") representative of all communications between the merchant 104 and the customer 108. In some examples, a conversation can be threaded such that communications associated with a same customer and/or same event/interaction can be grouped together. In at least one example, a conversation, as described herein, can be represented in a consolidated communication user interface 130 described herein.

In some examples, the communication management component 116 can convert the communication into a "standardized format." The converted communication can be stored (e.g., in the data store(s) 122) and, in some examples, can be presented via a consolidated communication user interface 130, as illustrated in FIG. 1. In at least one example, the merchant 104 can access the consolidated communication user interface 130 via an application, web browser, or the like. The communication management component 116 can consolidate communications received by the merchant 104 (e.g., the merchant 104 is the intended recipient) via different communication channels and/or platforms into a single access point (e.g., the consolidated communication user interface) such that the merchant 104 can view and/or respond to communications via interaction with the single access point. In some examples, communications can be arranged by entity (e.g., customer, vendor, etc.), which can be based at least in part on tokens, or other identifiers, as described above. In some examples, communications can be arranged based on date, time, communication channel, content, rules, and/or the like. In some examples, communications can be arranged based on priority, characteristic(s) of the sender (e.g., customer), etc. Additional details associated with the consolidated communication user interface 130 are provided below with reference to FIGS. 2A-2F.

In some examples, the communication management component 116 can receive a communication from the merchant computing device 106. In at least one example, the communication can be associated with a merchant identifier to identify the merchant and an identifier of the recipient (e.g., a customer, vendor, or the like). In at least one example, the communication management component 116 can route the communication to the intended recipient (e.g., based at least in part on the recipient identifier associated therewith). In some examples, the communication management component 116 can associate a token, or other identifier, with the communication, which can be used for consolidating communications as described above. In some examples, the communication management component 116 can convert the communication into a particular format based at least in part on the communication channel through which it is to be transmitted (e.g., from the standardized format to a text communication format or the like). In some examples, the communication management component 116 can send a request to the intended recipient to obtain consent to receive communications from the merchant 104 and/or the service provider.

In some examples, communications that originate from the merchant computing device 106 can be associated with any of the communication channels described above (e.g., a text communication, an email communication, a communication sent via a first-party application, a communication sent via a third-party application, a social media communication, and/or the like) and/or any platform described above.

In some examples, a communication sent responsive to a communication received by a customer (e.g., a response to the communication sent from the customer computing device 112 above) can be associated with a same communication channel and/or platform as the communication was received or a different communication channel and/or platform as the communication was received. That is, in an example as described above wherein a communication is sent from the customer computing device 112 to the merchant computing device 106 via a first communication channel and first platform, a response to such a communication can be sent via the first communication channel and first platform or a second communication channel and/or second platform. In some examples, the context determination component 118 can recommend which communication channel(s) and/or platform(s) for sending communications and/or can automatically switch between different communication channel(s) and/or platform(s) to optimize communication as described herein.

The context determination component 118 can determine context data associated with communications. In at least one example, the context determination component 118 can determine one or more of a date associated with a communication, a time associated with the communication, a topic associated with the communication, content of the communication, a merchant preference of a merchant associated with the communication, a customer preference of a customer associated with the communication, a communication channel via which the communication was received, a service/platform via which the communication was received, etc. In at least one example, the context determination component 118 can determine a date based at least in part on a datestamp associated with the communication and/or a time based at least in part on a timestamp associated with the communication.

In at least one example, the content determination component 118 can determine a merchant preference based at least in part on using a merchant identifier associated with the communication to access a merchant profile of the user profiles 124. In at least one example, the content determination component 118 can determine a merchant preference based at least in part on determining that a merchant is similar to another one or more merchants associated with the service provider (e.g., using a similarity algorithm or the like) of which one or more preferences are known. In at least one example, the context determination component 118 can determine a customer preference based at least in part on using a customer identifier associated with the communication to access a customer profile of the user profiles 124. In at least one example, the context determination component 118 can determine a customer preference based at least in part on determining that a customer is similar to another one or more customers associated with the service provider (e.g., using a similarity algorithm or the like) of which one or more preferences are known. In some examples, the context determination component 118 can determine a communication channel and/or service/platform via which the communication was received based at least in part on metadata associated with the communication.

In some examples, the context determination component 118 can determine a topic and/or content of the communication based at least in part on analyzing data associated with a communication (including historical communications and communications received by other similar merchants and/or creating a priority tree based on the history of such communications) and information related to the parties (e.g., merchants and/or customers) involved in the communication. Communications can be received in the form of questions about hours of the merchant (e.g., "when is the merchant open?"), confusion about appointments, requests to add/change services, questions regarding merchant location and other appointment details, confirmation of appointment details, post appointment questions, "last communication between the specific merchant and customer," etc. In some examples, the context determination component 118 can utilize natural language processing, image processing, and/or other machine-trained models to determine content of the communication. In some examples, the context determination component 118 can utilize a classifier or other model to determine semantic meaning of the communication and can determine a topic of the communication based at least in part on such a determination. In some examples, a communication can be translated into a particular language for processing and, any responses can be translated back to the original language associated with the incoming communication.

In some examples, the context determination component 118 can determine that a communication is associated with a temporal expression. That is, in at least one example, the content determination component 118 can utilize a machine-trained model (e.g., a classifier, etc.) to detect a temporal expression in the contents of a communication. In some examples, rule-based approaches or probabilistic semantic parsing can be used to detect a temporal expression in a communication. In at least one example, the context determination component 118 can partition a communication based on identified temporal expressions and can model the communication with an expression representative of the communication. Examples of communications including a temporal expression and corresponding expressions are provided below in Table A. In at least one example, a multi-stage pipeline can be used to label and parse communications. In some examples, labels can be determined by artificial neural networks, such as transformers, using an information extraction head. In some examples, parsing can be performed using a rule-based context free grammar (CFG) parser. In some examples, semantic role labeling and parsing, such as (text) span labeling or dependency labeling, can be used to discover the context in a sentence. In one example, techniques described herein can identify labelled spans by fine-tuning the artificial neural networks with an information extraction head, and parse spans using a rule-based CFG parser.

TABLE A

| | Example | Expression |
|---|---|---|
| Dates/ Times Constants | Do you have any openings at 2 on Sep. 12, 2019? | 2019-12-09TX2 |
| | What about tomorrow? | Tomorrow |
| | Mondays work best for me | Mondays |
| | Let's meet on Mother's Day at 12? | And(MothersDay,TX12) |
| Event Referents | What about the morning that day? | DayOf(ReferenceTime) |
| | Ok, let's keep the same day, but at 2 pm? | And(DayOf(EventTime), T14) |
| Indexing and Projection | Can you fit me in the same time next Monday? | And(TimeOf(EventTime), Next(Mondays)) |
| Modifiers | I'm free anytime before 3 pm. | Before(T15) |
| | Running late, can we postpone by 30 minutes? | ShiftF(EventTime, PT30M) |

TABLE A-continued

| | Example | Expression |
|---|---|---|
| Quantifiers | I need to reschedule to either a Friday at 5:15 no later or a Saturday not Jan 25th either at noon or 1 | Or(And(Fri.,TX5:15), And(Sat.,Or(T12,T13))) |

In at least one example, temporal expressions can be associated with labels indicating inclusionary or exclusionary preferences. The context determination component 118 can utilize heuristic pragmatics to determine which preferences to update or keep. In some examples, a previously presented candidate time can be used as a reference time and date and time preferences can be updated independently. In at least one example, the context determination component 118 can compose one or more temporal expressions associated with a communication into an aggregated expression, which can be combined with grammar and backed with logical formalism, to compose a long, complex temporal expression, and which can be used for determining a response and/or otherwise negotiating time. Such context determination (e.g., of temporal expressions) can be used to negotiate time, as described herein, which can be useful for scheduling or rescheduling appointments, reservations, and/or the like.

Machine learning techniques as described herein can be applicable to additional or alternative implementations beyond the negotiation of time for scheduling or rescheduling appointments, reservations, and/or the like. For instance, in some examples, the context determination component 118 can determine that a communication is associated with a geographical and/or location-based expression (e.g., the communication is location-related). As an additional or alternative example, in some examples, the context determination component 118 can determine that a communication is associated with a commercial expression (e.g., the communication is transaction-related). As described above with reference to temporal expressions, in some examples, rule-based approaches or probabilistic semantic parsing can be used to detect such expression in a communication. In at least one example, the context determination component 118 can partition a communication based on identified commercial expressions and can model the communication with an expression representative of the communication. As described above, in at least one example, a multi-stage pipeline can be used to label and parse communications. In some examples, labels can be determined by artificial neural networks, such as transformers, using an information extraction head. In some examples, parsing can be performed using a rule-based CFG parser. In some examples, semantic role labeling and parsing, such as (text) span labeling or dependency labeling, can be used to discover the context in a sentence. In one example, techniques described herein can identify labelled spans by fine-tuning the artificial neural networks with an information extraction head, and parse spans using a rule-based CFG parser.

In some examples, the communication management component 116 can utilize context data to generate a response to a question or a recommendation for response, or even provide an array of responses to choose from. That is, in at least one example, the communication management component 116 can utilize context data to determine content for responsive communications. In one example, the communication management component 116 can apply natural language processing, such as sentence similarity, to create responses matching the preceding question/response and the "tone" therein thus ensuring "conversational flow." In such an example, vector representations generated by communication management component 116 may be similar for similar sentences representing similar concepts or similar relationships. As such, a comparison of the vector representations of two sentences may indicate whether or not the sentences represent a similar concept or relationship. For example, the communication management component 116 will analyze a phrase's grammar structure or predicate-argument-structure that includes other parts of speech utilized within the grammar sentence structure, and when responding add or delete adjectives, prepositions, etc., to improve sentence similarity, such as changing <subject/object/temporal expression> to <temporal expression/preposition>.

In some examples, context data can be used by the communication management component 116 to recommend actions to be performed in association with a responsive communication, such as attaching a file (e.g., a receipt, an invoice, etc.), embedding a link (e.g., a scheduling link, a payment link, a virtual cart, etc.), etc. That is, in some examples, the context data can be used to generate a recommendation to attach or associate an object (e.g., receipt, feedback, link, etc.) with a communication and/or associate data associated with an event/interaction with a communication. In some examples, the recommendation can be used to generate a response that includes an actuation mechanism or other mechanism for a merchant and/or customer to perform an action (e.g., "click here" or the like).

In some examples, a link, as described above, can be created with embedded elements to allow the customer to interact with the service/platform. For example, if an incoming communication is associated with a request to reschedule an appointment, the context data associated with the incoming communication can be used by the communication management component 116 to generate a response or a recommendation for a response that includes an alternative appointment date or time. In some examples, the response or recommendation can include a link to enable the customer to reschedule their appointment. As another example, if an incoming communication is associated with a request to purchase an item, the context data associated with the incoming communication can be used by the communication management component 116 to generate a response or recommendation for a response that includes a link to purchase an item from the merchant 104. In some examples, the merchant 104 can use the recommendation for the response, or a portion thereof, for responding to the customer. In some examples, the response can be automatically sent to the customer computing device without input from the merchant 104.

In some examples, the communication management component 116 can output recommendations to improve content of communications. For example, the communication management component 116 can output recommendations with respect to improved grammar, spelling, tone, sentiment, etc. In some examples, the communication management component 116 can provide suggestions that a communication includes inappropriate material (e.g., related to sex, hate speech, alcohol, firearms, tobacco, cannabis, etc. as determined by carriers and/or internet service providers (ISPs)), suggestions to reduce options for opting out of communications or into communications, etc. In some examples, the communication management component 116 can pre-populate replies and/or suggest words and/or phrases while the merchant 104 is composing a communication to streamline communication composition. Such recommendations can improve the quality of communications sent by merchants. Further, such recommendations can help reduce chargebacks and disputes (e.g., by addressing disputes upon receipt with responses that provide context (e.g., attach a receipt to a response communication responsive to a query about a charge), or the like).

In some examples, a domain-specific language can be used by the communication management component 116 to facilitate conversational exchanges automatically (e.g., without a merchant and/or worker intervening). Such a domain-specific language can be used for conversational flows, which can be used by virtual assistants (e.g., bots), etc. for facilitating conversations. In some examples, the domain-specific language can be rules based and/or learned.

In some examples, context data can be used by the communication management component 116 to determine which communication channel(s) and/or platform(s) to send communications. In at least one example, context data can be provided to the communication management component 116. In at least one example, the communication management component 116 can utilize the context data to generate recommendations and/or perform operations with respect to messaging. For instance, in at least one example, the communication management component 116 can recommend that a communication received via a first communication channel be responded to via a second communication channel. As an additional or alternative example, the communication management component 116 can recommend that a communication received via a first platform be responded to via a second platform. In some examples, such a recommendation can be surfaced via the consolidated communication user interface 130. In some examples, the communication management component 116 can utilize such a recommendation to perform an operation without input from the merchant 104 (e.g., automatically). For instance, the communication management component 116 can send a response via the second communication channel and/or second platform without receiving an instruction to do so from the merchant 104 (and/or without the merchant 104 having knowledge of such).

In at least one example, certain types of communications (e.g., marketing communications) may not be sent via one communication channel but may be sent via another communication channel. In such an example, the context data associated with a communication—indicating a type of communication—can be used to determine how to route the communication. In some examples, the communication management component 116 can utilize merchant and/or customer preference(s) to determine which communication channel(s) and/or platform(s) to send communications. For example, in some examples, a customer can be associated with multiple identifiers associated with a same communication channel (e.g., multiple phone numbers, multiple email addresses, etc.). In such examples, customer preferences can be used to determine which identifier to send a communication. In some examples, compliance data and/or other rule(s) can be used to determine which, of multiple identifiers associated with a same communication channel, to send a communication.

In at least one example, the context determination component 118 can utilize a machine-trained model (e.g., a classifier, a neural network, etc.) to determine which communication channel(s) and/or platform(s) to route communications. In some examples, such a model can be trained based at least in part on previous communications associated with users of the service provider. Such communications can be associated with metadata indicating content of such communications, date and/or time of such communications, communication channels and/or platforms associated with such communications, users associated with such communications, and/or the like. Such data can be used to train a model, for example using machine learning mechanisms. The resulting machine-trained model can be a statistical classifier, a neural network, or the like. The machine-trained model can output one or more classes, wherein each class represents a different communication channel or platform. In some examples, such classes can be representative of different identifiers of an individual user, wherein each identifier corresponds to a different communication channel (e.g., email address/email, phone number/text message, identifier/social media platform, etc.). Classes can be ranked or otherwise arranged such to identify the recommended communication channel and/or platform for routing a communication.

In some examples, recommendations related to communication channels and/or platforms for routing communications can be surfaced via the consolidated communication user interface 130. In some examples, the communication management component 116 can utilize such a recommendation to perform an operation without input from the merchant 104 (e.g., automatically). For instance, the communication management component 116 can send a response via the second communication channel and/or second platform without receiving an instruction to do so from the merchant 104.

In at least one example, the communication management component 116 can generate the consolidated communication user interface 130 and can send instructions for presenting the consolidated communication user interface 130 via the merchant computing device 106. In at least one example, the communication management component 116 can aggregate communications and/or other contextual data (e.g., appointments, receipts, feedback received, orders, fulfillment actions, payments, etc.) based at least in part on such communications and/or other contextual data being associated with a same token, or other identifier. That is, communications and/or other contextual data associated with a same token, or other identifier, can be consolidated into a conversation. Representations of conversations can be presented via the consolidated communication user interface 130, as described in more detail below.

The training component 120 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. Machine-trained models described above can be generated and/or trained by the training component 120 and stored for use at run time.

In at least one example, the training component 120 can utilize stored communication data associated with communications or other communications received and/or sent by the communication management component 116 as training data for training, using machine learning, a model for determining temporal expressions in communications. Such temporal expressions can be used for determining recommendations with respect to responses to communications. In at least one example, the training component 120 can receive new training data based at least in part on recommendations previously output by the machine-trained models and can modify weights or other aspects of the machine-trained models to improve the accuracy thereof. That is, in at least one example, communication data associated with communications received and/or sent by the communication management component 116, recommendations generated based thereon, new product or service integrations, etc. can be associated with new training data that, when analyzed by the training component 120, cause improvements to features associated with the machine-trained models. As such, techniques described herein enable such machine-trained models to improve over time.

The data store(s) 122 can be configured to store data that is accessible, manageable, and updatable. In some examples, the data store(s) 122 can be integrated with the server(s) 102. In other examples, the data store(s) 122 can be located remotely from the server(s) 102 and can be accessible to the server(s) 102. The data store(s) 122 can comprise multiple databases and/or servers connected locally and/or remotely via the network(s) 107.

In at least one example, the data store(s) 122 can store user profiles 124, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, merchant preferences (e.g., learned or merchant-specified), identifier(s) of the merchant (which can be associated with different communication channels and/or platforms), etc.), a merchant category classification (MCC), item(s) (e.g., good(s) or service(s)) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, messaging data, etc. A merchant profile can securely store bank account information as provided by the merchant. In some examples, a merchant profile can include merchant preferences with respect to which communication channel(s) and/or platform(s) they prefer to use for communication, which identifier(s) associated with communication channel(s) they prefer to use for communication, etc. In some examples, historical communication data associated with a merchant (e.g., communications sent, communications received, responses, response time, etc.) can be associated with a merchant profile.

Customer profiles can store customer data including, but not limited to, customer information (e.g., name, phone number, address, banking information, identifier(s) (e.g., associated with different communication channels and/or platforms), etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, messaging data, etc. In some examples, a customer profile can include merchant preferences with respect to which communication channel(s) and/or platform(s) they prefer to use for communication, which identifier(s) associated with communication channel(s) they prefer to use for communication, etc. In some examples, historical communication data associated with a customer (e.g., communications sent, communications received, responses, response time, etc.) can be associated with a customer profile.

In at least one example, the data store(s) 122 can store permission(s) 126. The permission(s) 126 can indicate which users are permitted to send and/or receive communications. In some examples, such permission(s) 126 can be particular to an individual worker, a merchant, a title or role associated with a worker (e.g., a worker associated with a title of "owner," "manager," "receptionist," or the like, a worker associated with a role of "full access worker," or the like, etc.), or the like. In some examples, permission(s) 126 can be particular to device codes (e.g., codes provisioned to users to grant temporary access to a functionality). The permission(s) 126 can provide security and/or access control to individual communications. That is, in some examples, the permission(s) 126 can enable the communication management component 116 to selectively present communications to certain worker(s) while restricting access of other worker(s) to certain communications. In some examples, the communication management component 116 can utilize the permission(s) 126 to restrict how worker(s) are able to interact and/or respond to communications. In at least one example, permissions can be set via a settings user interface.

The rule(s) 128 can indicate types of communications that are to be routed to particular users and/or users associated with particular titles. The rule(s) 128 can enable routing of communications to particular users and/or users associated with particular titles to enable efficient resolution of particular issues and/or requests. That is, in some examples, the rule(s) 128 can enable the communication management component 116 to route communications to particular worker(s) and/or worker(s) with particular titles, which can provide security, access control, and/or efficiencies as described herein. In some examples, a worker receiving a communication routed to them based at least in part on the rule(s) 128 can handle the communication and/or assign the communication to another worker. Trees, as described above, can be stored in the rule(s) 128.

In some examples, the permission(s) 126 and/or rule(s) 128 can be configured by individual merchants and/or users via a settings user interface. In some examples, permission(s) 126 and/or rule(s) 128 can be learned or otherwise determined.

While FIG. 1 is directed to merchants and customers, techniques described herein can be applicable to any communications exchanged between users such as merchants and vendors, peers in a peer-to-peer transaction, and/or the like.

In some examples, the messaging functionality described herein can be integrated into first-party and/or third-party applications via SDKs, APIs, and/or the like.

FIGS. 2A-2F illustrate examples of a user interface 200 that can present a consolidated communication user interface, as described herein. In at least one example, the user interface 200 can be presented via an application on the merchant computing device 106, a web browser on the merchant computing device 106, and/or the like. In at least one example, the user interface 200 can be a dashboard, or an information management tool that enables the merchant 104 to visually track, analyze, and/or displays key performance indicators (KPI), metrics, and/or key data points to monitor the health of a business, department, or specific process. In some examples, the user interface 200 can be presented via a point-of-sale application (e.g., associated with a payment processing service offered by the service provider) and/or another application associated with a service provided by the service provider. In some examples, the user interface 200 can be presented via a merchant-facing messaging application. In at least one example, the functional component configured to present the user interface 200 can obtain communications and/or other data from one or more customer-facing services/platforms and/or communication channels. In some examples, the user interface 200 can be associated with actuation mechanism(s) 202 that enable the merchant 104 to navigate to other functional component(s) associated with service(s) available via the service provider. In some examples, by actuating one of the actuation mechanism(s) 202, the application, web browser, and/or the like can navigate to a functional component associated with the corresponding service. In some examples, another application or web page can open to provide access to the corresponding service.

In some examples, the user interface 200 can include a section 204 that can present information relevant to the merchant 104. In some examples, the section 204 can include activity, KPIs, and/or the like. In at least one example, the user interface 200 can include one or more elements 206, which can include text, images, pictures, videos, and/or the like to enable the merchant 104 to navigate to other functional components, such as an electronic calendar user interface, a consolidated communication user interface, a help user interface, and/or the like. In at least one example, the content and/or configuration of content associated with the user interface 200 can be customizable to meet the specific needs of the merchant 104.

Figure 2A:
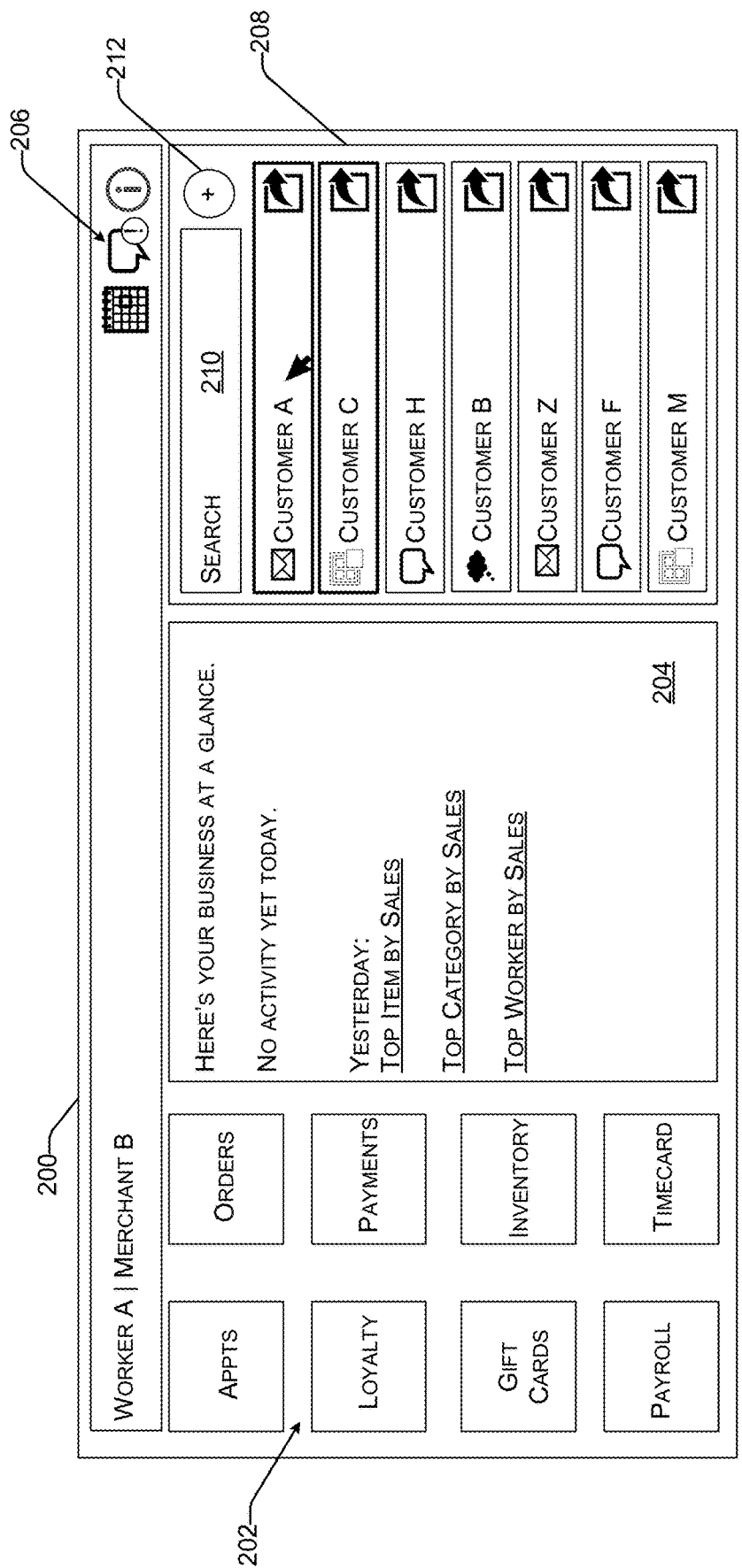
FIG. 2A illustrates an example user interface for presenting, among other information, communications as described herein.

In at least one example, the one or more elements 206 can be associated with respective actuation mechanisms, such that an input associated with one of the one or more elements 206 can cause a corresponding user interface, or portion thereof, to be presented via the user interface 200, or a portion thereof. As illustrated in FIG. 2A, a consolidated communication user interface 208 is presented via a portion of the user interface 200. In at least one example, based at least in part on detecting an actuation of the element of the element(s) 206 associated with the consolidated communication user interface 208, the merchant computing device 106 can send a request for instructions and/or other data for generating the consolidated communication user interface 208. In some examples, new communications and/or contextual data can be pushed to the merchant computing device 106 for updating the consolidated communication user interface 208. In FIG. 2A, the consolidated communication user interface 200 is presented via a section of the user interface 200. However, in additional or alternative examples, the consolidated communication user interface 208 can be presented via a new user interface, a pop-up, an overlay, and/or the like. In at least one example, the consolidated communication user interface 208 can present communications, or representations of conversations comprising one or more communications, associated with the merchant 104 in a single access point. That is, the communications presented in the consolidated communication user interface 200 can be associated with multiple communication channels and/or multiple platforms associated with the service provider. In some examples, the communications can be arranged by entity (e.g., customer, vendor, etc.), as described above. In some examples, communications can be arranged based on date, time, communication channel, content, rules, and/or the like. In some examples, communications associated with a particular entity (e.g., a customer), which can be associated with a token, or other identifier, provided by the communication management component 116, can be associated with a conversation, a representation of which can be presented via the consolidated communication user interface 208.

In some examples, all conversations associated with the merchant 104 can be presented via the consolidated communication user interface 208. In some examples, a subset of all conversations associated with the merchant can be presented via the consolidated communication user interface 208. In some examples, the subset can be selected based on recent activity, customer status (e.g., based on loyalty, a membership program, or the like), priority, etc. In some examples, conversations that can be handled by a virtual assistant (e.g., bot) can be filtered out of the subset. For conversations that are not presented via the consolidated communication user interface 208, the merchant 104 can search for particular conversations and/or otherwise browse for other conversations using functionality associated with the user interface 200.

Messaging, as described herein, can be used by merchants for managing one or more aspects of their businesses. For example, messaging can be used for appointments such as prior to booking appointments (e.g., answering questions relating to hours, location, etc.), prior to appointments (e.g., clarifying details of an appointment, adding/changing services, answering questions about an appointment, confirming an appointment, answering questions related to location, scheduling or rescheduling an appointment, etc.), during appointments, after appointments (e.g., answering questions, receiving feedback, etc.). Furthermore, messaging can be useful for conducting transactions such as prior to a transaction, during a transaction, or after a transaction. As an example, messaging can be useful for answering questions about a brick-and-mortar location of a merchant (e.g., hours, location, pricing, etc.), questions about item availability, questions related to shipping or fulfillment, questions about charges or disputed charges, questions about order fulfillment, etc. In some examples, messaging can be used for confirming protocols (e.g., health and sanitation protocols), following-up with customers (e.g., regarding feedback, an item left behind, etc.) marketing items to customers, managing subscriptions, providing receipts, or other communications. Additional or alternative communications can be used by merchants for managing one or more aspects of their businesses.

In at least one example, the merchant computing device 106 can be used by multiple workers of the merchant 104. In some examples, a worker is required to sign-in or log-on such that the user interface 200 is presented for a particular worker. In some examples, such a sign-in or log-on can authenticate the worker with the service provider and the worker, while signed-in or logged-on, can be associated with an active authentication session. That is, the merchant computing device 106 can be authenticated for use by a particular worker based at least in part on the worker having provided authentication credentials via a sign-in or log-on. This can be important for access control and/or routing communications as described herein. As illustrated in FIG. 2A, Worker A of Merchant B is authenticated for accessing the user interface 200 via the merchant computing device 106.

In at least one example, the consolidated communication user interface 208 can include a search mechanism 210 to enable the merchant 104 to perform a search of the communications. In at least one example, the consolidated communication user interface 208 can include an actuation mechanism 212 to enable the merchant 104 to draft a new communication. In at least one example, the merchant 104 can interact with representations of individual of the communications and/or conversations to view a communication history with the respective customer and/or to send a new communication. For instance, the merchant 104 can interact with the element representative of a conversation associated with Customer A. Based at least in part on interacting with such an element, a conversation between the merchant 104 and the customer (e.g., Customer A) can be presented via a pop-up, overlay, new user interface, or the like associated with the user interface 200. An example pop-up 214 is illustrated in FIG. 2B.

Figure 2B:
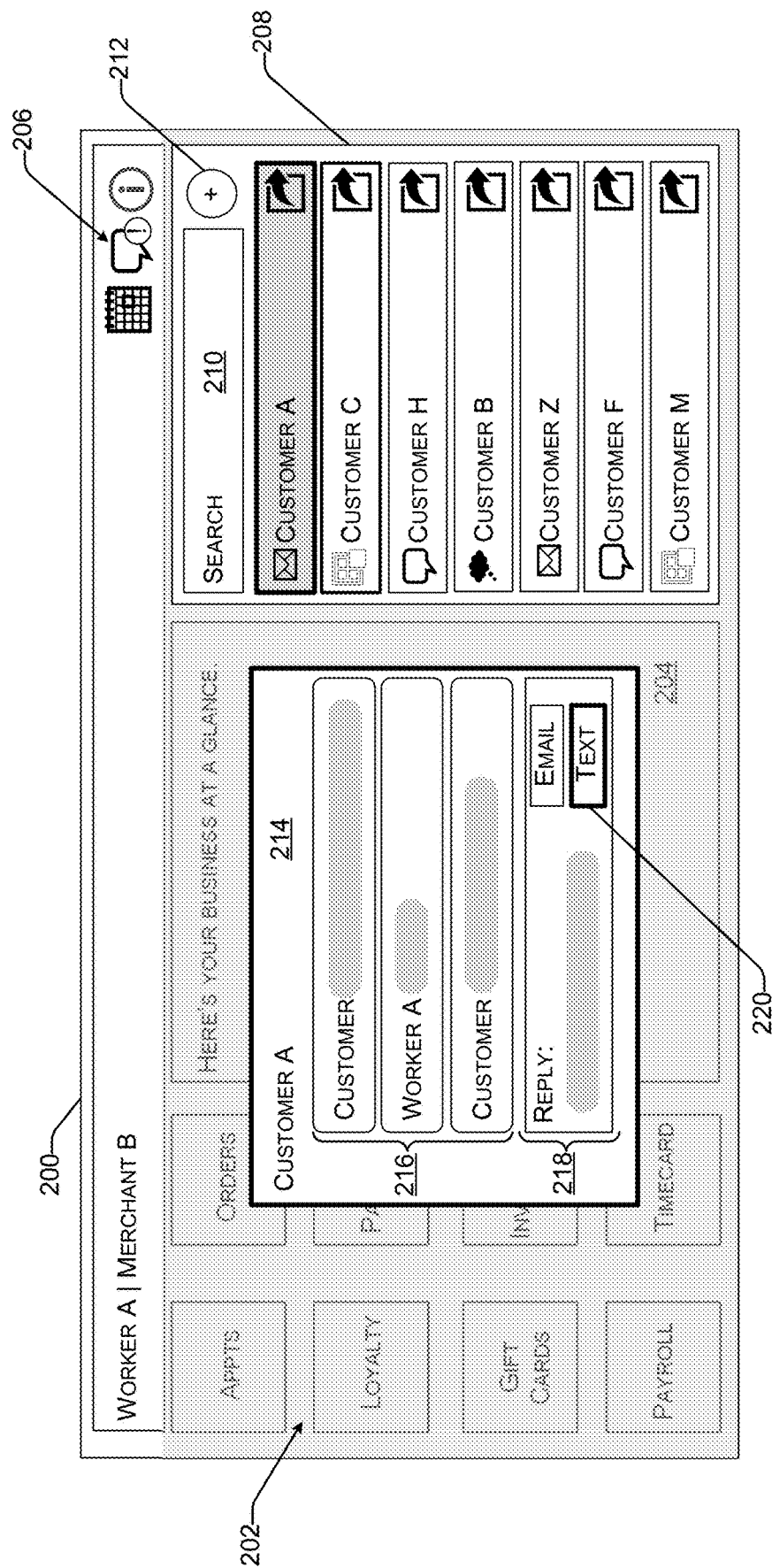
FIG. 2B illustrates an example user interface for presenting, among other information, communications as described herein.

As illustrated in FIG. 2B, the pop-up 214 can include one or more communications 216 previously exchanged between the merchant 104 and the customer (Customer A). The pop-up 214 can include a mechanism 218 to enable the merchant to draft a new communication and/or reply to a previous communication. In some examples, the pop-up 214 can include a recommendation associated with a communication channel for sending a communication and/or responding to a previously received communication, a platform for sending a communication and/or responding to a previously received communication, and/or the like. In some examples, the recommendation can be a pop-up, overlay, or the like. In some examples, an actuation mechanism can be associated with an indicator indicating a recommended communication channel. For example, in FIG. 2B, the "text" actuation mechanism 220 is associated with a visual indicator (e.g., a thicker border) indicating that the communication management component 116 recommends the communication be sent via text (e.g., instead of email). Additional or alternative examples of how a recommendation can be presented are within the scope of this disclosure. In some examples, the recommended communication channel may not be presented to the merchant 104 and may be determined by the communication management component 116 without input from the merchant 104. In such examples, the communication management component 116 can convert the communication as necessary for sending via the determined communication channel and can send the communication via the determined communication channel.

In some examples, as described above, the communication management component 116 can output a recommendation with respect to the content of a new and/or responsive communication. In some examples, such a recommendation can include words or phrases, images, files, embeddings, and/or the like to include in the new and/or responsive communication. In some examples, such a recommendation can relate to grammar, spelling, tone, sentiment, etc. In some examples, the communication management component 116 can pre-populate content and/or suggest words and/or phrases while the merchant 104 is composing a communication to streamline communication composition. In some examples, such recommendations can be presented as user interface elements of the user interface 200.

In some examples, additional contextual data associated with a customer can be presented in association with a conversation. That is, in some examples, additional contextual data can be presented with one or more communications between the merchant 104 and a customer. In some examples, such data can be obtained (e.g., via a push or pull) from one or more services of the service provider. As an example, an appointment of a customer can be added to a conversation and feedback provided in association with the appointment can be presented via the conversation. Any communications leading up to the appointment, during the appointment, and/or after the appointment can be included in the conversation. A receipt can be associated with the conversation. As another example, an order, a receipt associated with the order, and/or fulfillment data can be associated with a conversation between a customer and the merchant 104. In some examples automated communications and/or responses (e.g., provided by a virtual assistant or bot) can be added to a conversation. In some examples, automated communications and/or responses can be associated with an indicator indicating such. The merchant 104 can use this contextual data to provide better, more relevant responses to the customer. That is, in some examples, a "conversation" can comprise one or more communications and/or data associated with a particular customer that can be obtained or otherwise aggregated across services/platforms and/or communication channels. Such a conversation can be a source of truth for communications between the merchant 104 and the customer. Such a unified cross channel messaging interface can be interwoven with the services/platforms such that both the merchant and customer can access their communications via a single interface.

Figure 2C:
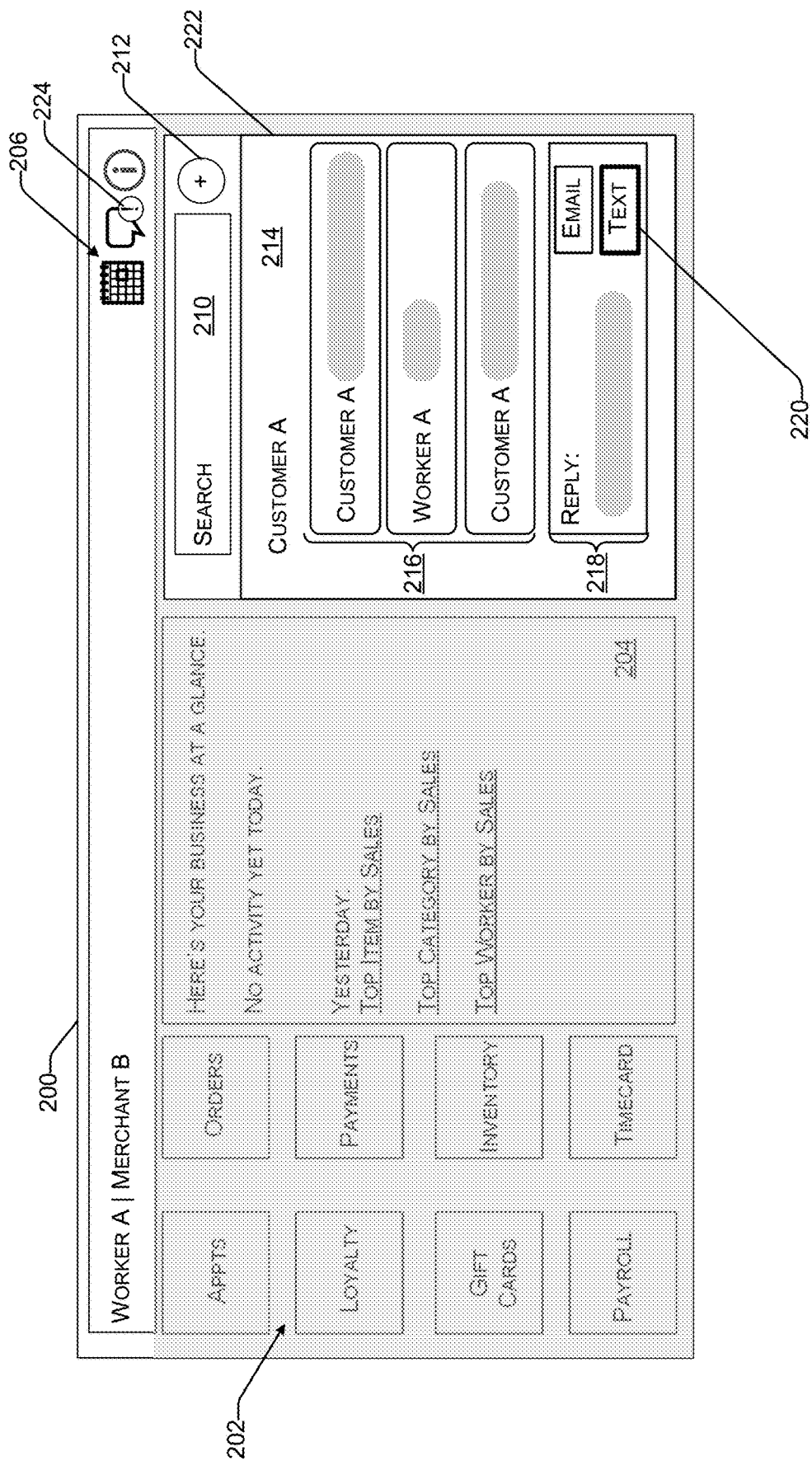
FIG. 2C illustrates an example user interface for presenting, among other information, communications as described herein.
Figure 2D:
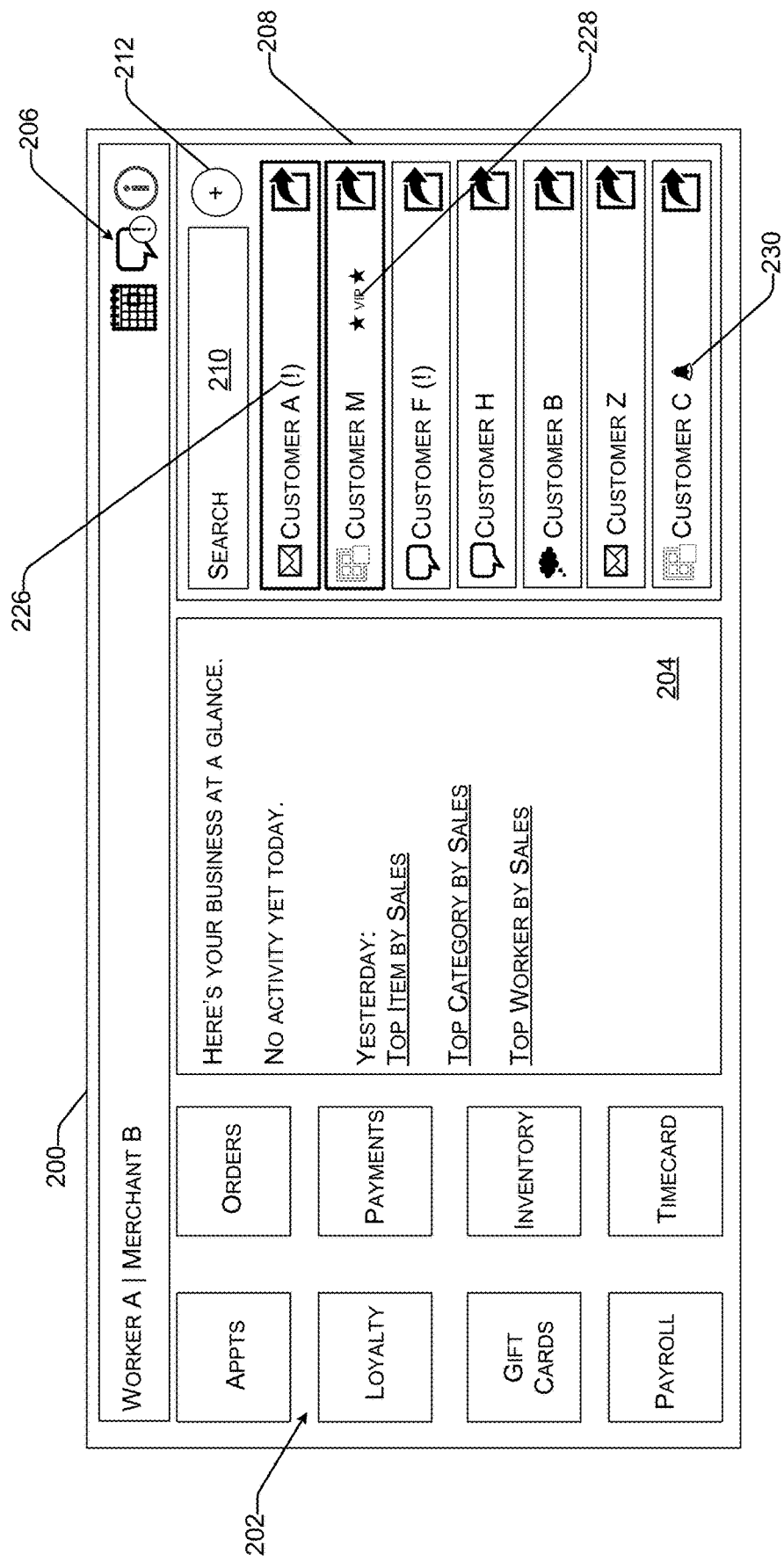
FIG. 2D illustrates an example user interface for presenting, among other information, communications as described herein.

FIG. 2C illustrates an alternative example (e.g., to the pop-up 214 illustrated in FIG. 2B) of a conversation (e.g., one or more communications 216 associated therewith) between the merchant 104 and the customer (Customer A) and an input mechanism 218 that can be presented as a section 222 within the user interface 200.

In some examples, when a new communication is received, the graphical element associated with the consolidated communication user interface can be associated with an indicator 224 to notify the merchant 104 of the new communication. In some examples, a new communication can pop-up on the user interface 200, scroll across the top of the user interface 200, be presented as a banner associated with the user interface 200, etc. In some examples, such a new communication can be ephemeral. In some examples, conversations associated with new communications can be associated with an indicator to notify which conversation is associated with a new communication. Conversations and/or communications can be associated with additional or alternative indictors indicating whether a communication has been read, is unread, is urgent, etc.

As described above, in some examples, the communications associated with the consolidated communication user interface 208 can be arranged by entity (e.g., customer, vendor, etc.). In some examples, communications can be arranged based on date, time, communication channel, content, rules, and/or the like. In some examples, the communications can be arranged based at least in part on a priority, characteristic(s) of customer(s), or the like. For example, in FIG. 2D, the conversations, or representations of conversations comprising one or more communications, presented via the consolidated communication user interface 208 can be arranged based at least in part on priority and/or characteristic(s) of customer(s).

In an example, the communication management component 116 can analyze the communication(s) as they are received, for example, to determine whether the content associated therewith is associated with a priority (e.g., a level of importance). In some examples, priority can be determined based at least in part on rule(s). For example, a high priority communication can be a transaction-related communication or a communication associated with rescheduling a same-day appointment. In some examples, a communication requiring/requesting a response that has not been responded to within a period of time can be designated a high priority communication. In some examples, such rule(s) can be provided by individual merchants and/or can be learned by the communication management component 116 (e.g., based at least in part on previous communications associated with the merchant 104 and/or previous communications associated with other merchant(s)). In some examples, high priority communications and/or conversations can be associated with a graphical element 226 to indicate such. In some examples, high priority communications and/or conversations can be presented at the top of the conversations section of the user interface 200. In some examples, high priority communications and/or conversations can be presented in a separate section of the user interface 200 and/or can be pushed to the merchant 104 (e.g., via a text message, push notification, etc.). In some examples, such communications and/or conversations can be emphasized or presented differently than other communications and/or conversations.

In some examples, low priority communications and/or conversations can be associated with communications and/or conversations that do not require/request a response and/or are responded to via a bot or other automatic mechanism (e.g., without requiring input of the merchant 104). In some examples, such communications and/or conversations may be presented at the bottom of the conversations section of the user interface 200 or may not be presented at all (e.g., may be accessible via a search or request to view all communications and/or conversations). In some examples, such communications and/or conversations can be deemphasized or presented differently than other communications and/or conversations.

In some examples, communications and/or conversations can be arranged based at least in part on characteristic(s) of customers. For example, some customers can be associated with particular statuses (e.g., VIP), which can be determined based at least in part on loyalty programs, spending metrics, titles, and/or the like. In some examples, rule(s) associated with characteristic(s) of customers that affect whether a customer is associated with a particular status can be provided by individual merchants and/or can be learned by the communication management component 116 (e.g., based at least in part on previous communications associated with the merchant 104 and/or previous communications associated with other merchant(s)). In at least one example, such communications and/or conversations associated with customers having particular status can be denoted as such, for example, via association of a graphical element 228. In some examples, communications and/or conversations associated with such customers can be presented at the top of the conversations section of the user interface 200. In some examples, communications and/or conversations associated with such customers can be presented in a separate section of the user interface 200 and/or can be pushed to the merchant 104 (e.g., via a text message, push notification, etc.).

In some examples, the merchant 104 can have an option to delay responding to a communication for a period of time (e.g., "snooze" the communication). For example, a communication and/or conversation can be associated with an actuation mechanism that enables the merchant 104 to delay response and/or receive a reminder about a response at a later time. In some examples, the merchant 104 can respond with a key word or phrase that can be understood by the communication management component 116 to delay response and/or receive a reminder about a response at a later time. In such an example, the communication and/or conversation can be associated with a "snooze" status and the arrangement of communications and/or conversations can be updated based on such a status being associated with the communication. In some examples, such communications and/or conversations can be associated with a graphical element 230, which can indicate that the communication has been snoozed. In some examples, the communication management component 116 can cause a reminder to be sent, or otherwise surfaced, to the merchant 104 after the period of time has lapsed or an event has occurred that enables the merchant 104 to respond. For instance, such a reminder can be sent when an item associated with a snoozed communication is back in stock or when a designated period of time has lapsed.

The consolidated communication user interface 208 described herein can enable merchants significant time savings by enabling merchants to focus on communications and/or conversations that benefit from the expertise of the merchant. Time consuming, recurring tasks can be automated to enable merchants more time to focus on such communications. In some examples, by arranging communications and/or conversations on the consolidated communication user interface 208 in a way that merchants can quickly and easily identify which communications and/or conversations require response, the consolidated communication user interface 208 can provide improvements over existing technologies.

Figure 2E:
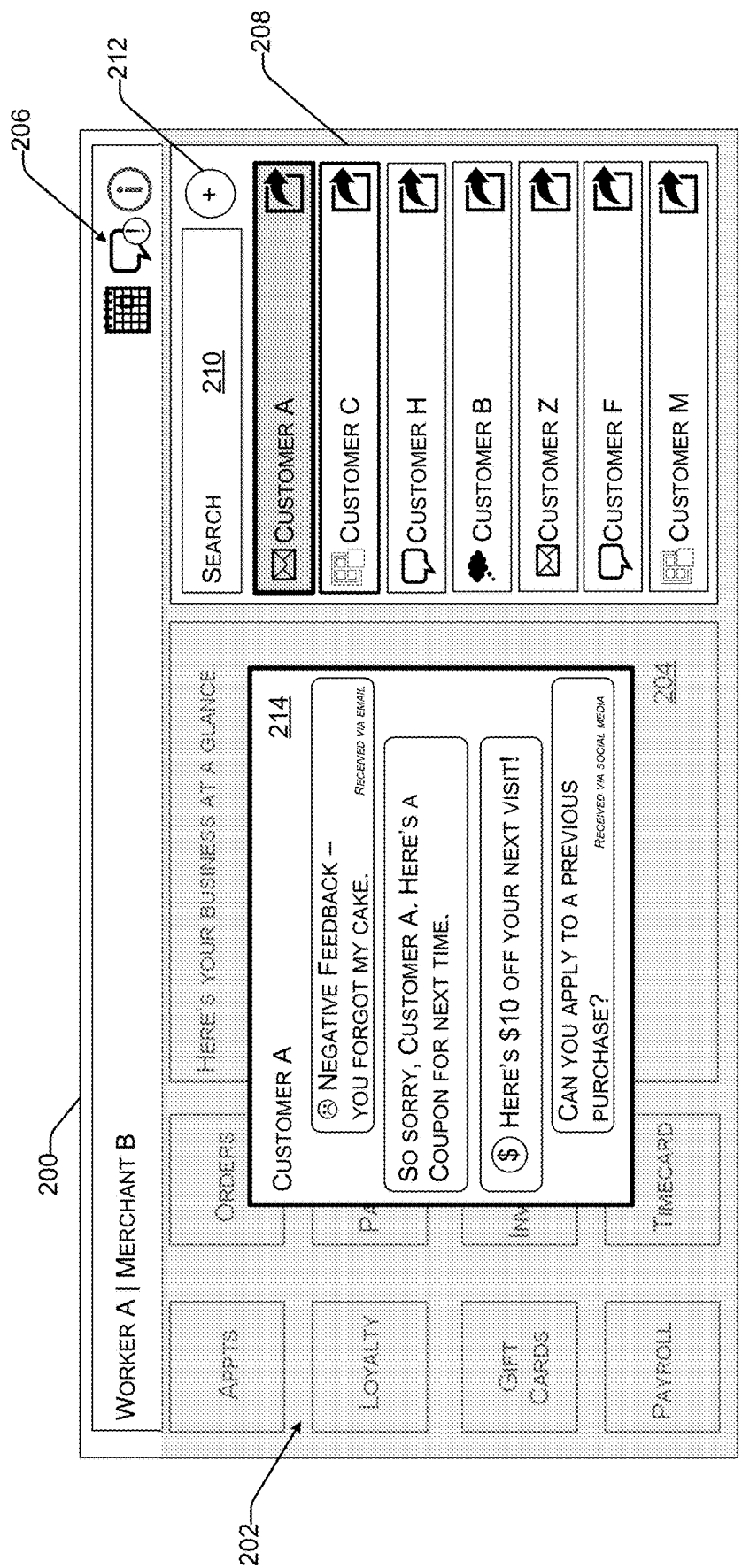
FIG. 2E illustrates an example user interface for presenting, among other information, cross-service/platform communications as described herein.
Figure 2F:
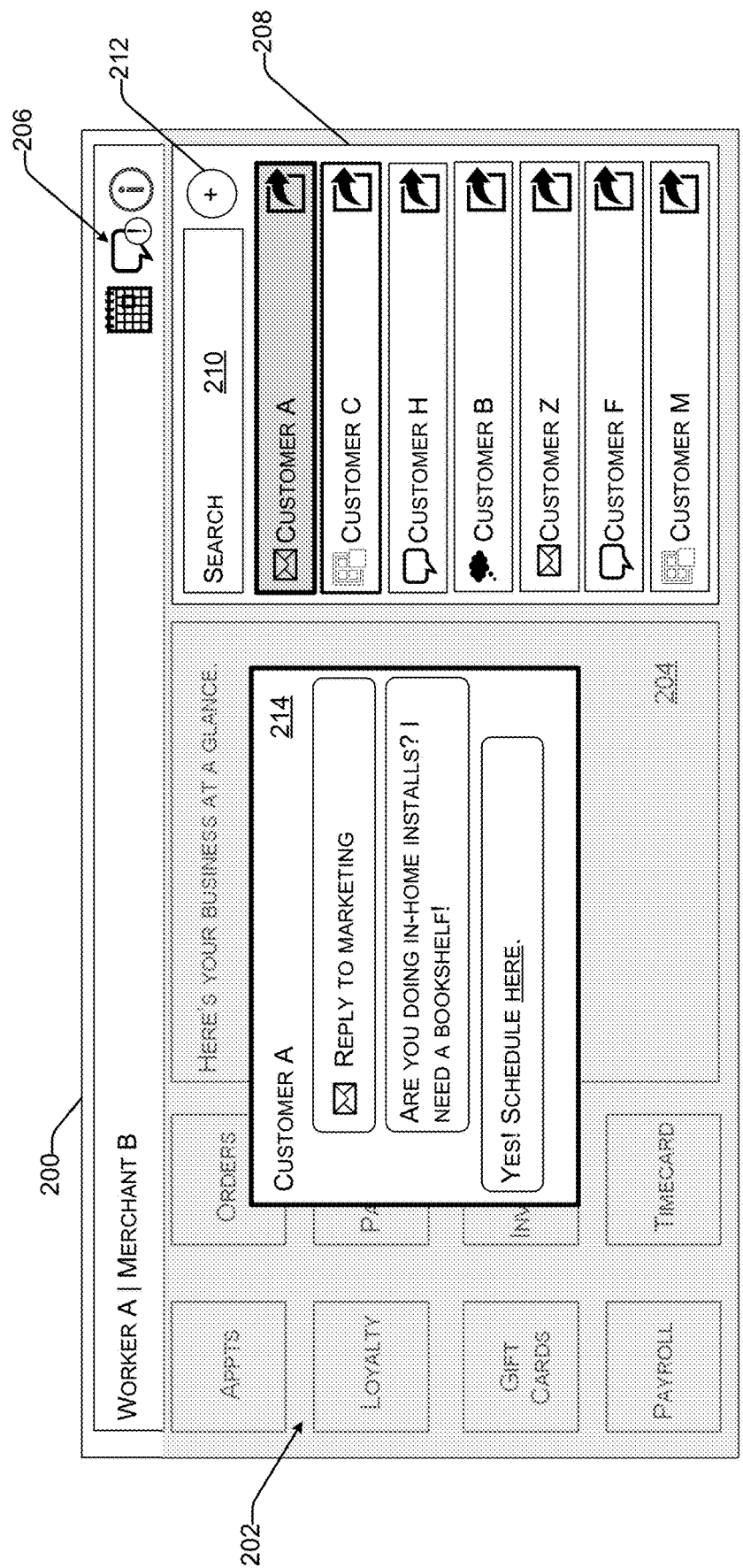
FIG. 2F illustrates an example user interface for presenting, among other information, cross-service/platform communications as described herein.

Further, in some examples, as illustrated in FIGS. 2E and 2F, the consolidated communication user interface 208 can enable the integration and/or consolidation of different services and/or communication platforms into a single user interface. As described above with reference to FIG. 2B, in at least one example, the merchant 104 can interact with representations of individual of the communications and/or conversations to view a communication history with the respective customer and/or to send a new communication. For instance, the merchant 104 can interact with the element representative of a conversation associated with Customer A. Based at least in part on interacting with such an element, a conversation between the merchant 104 and the customer (e.g., Customer A) can be presented via a pop-up, overlay, new user interface, or the like associated with the user interface 200. An example pop-up 214 is illustrated in FIG. 2E. In some examples, such a pop-up 214 can be presented without an actuation by the merchant 104 (e.g., in response to an event, such as receiving negative feedback (FIG. 2E) or receiving a comment via a marketing platform/service (FIG. 2F)).

For example, in FIG. 2E, a feedback service/platform can provide an indication of negative feedback received from a communication channel, e.g., Customer A's email. The merchant can respond via the consolidated communication user interface—manually or automatically—with an apologetic communication and a coupon or other incentive. That is, the communication management component 116 can receive context data via the feedback service/platform on a first communication channel (e.g., email) and can send a responsive communication via a second communication (e.g., customer A's text message or a chat interface with which Customer A is associated). In some examples, the responsive communication can be sent via a different platform/service. In at least this example, the merchant is able to consolidate all its customers communications on a single interface, and the responses back to the customers are customized and relayed on an appropriate communication channel (e.g., email, social network, etc.). FIG. 2F illustrates an example where a marketing service/platform receives a replay and the communication management component 116 can facilitate a response that can include a link to schedule an install (or additionally or alternatively, a link to buy the bookshelf or the like). That is, the communication management component 116 can receive context data via the marketing service/platform and can send a responsive communication via a different service/platform (e.g., appointments).

Figure 6:
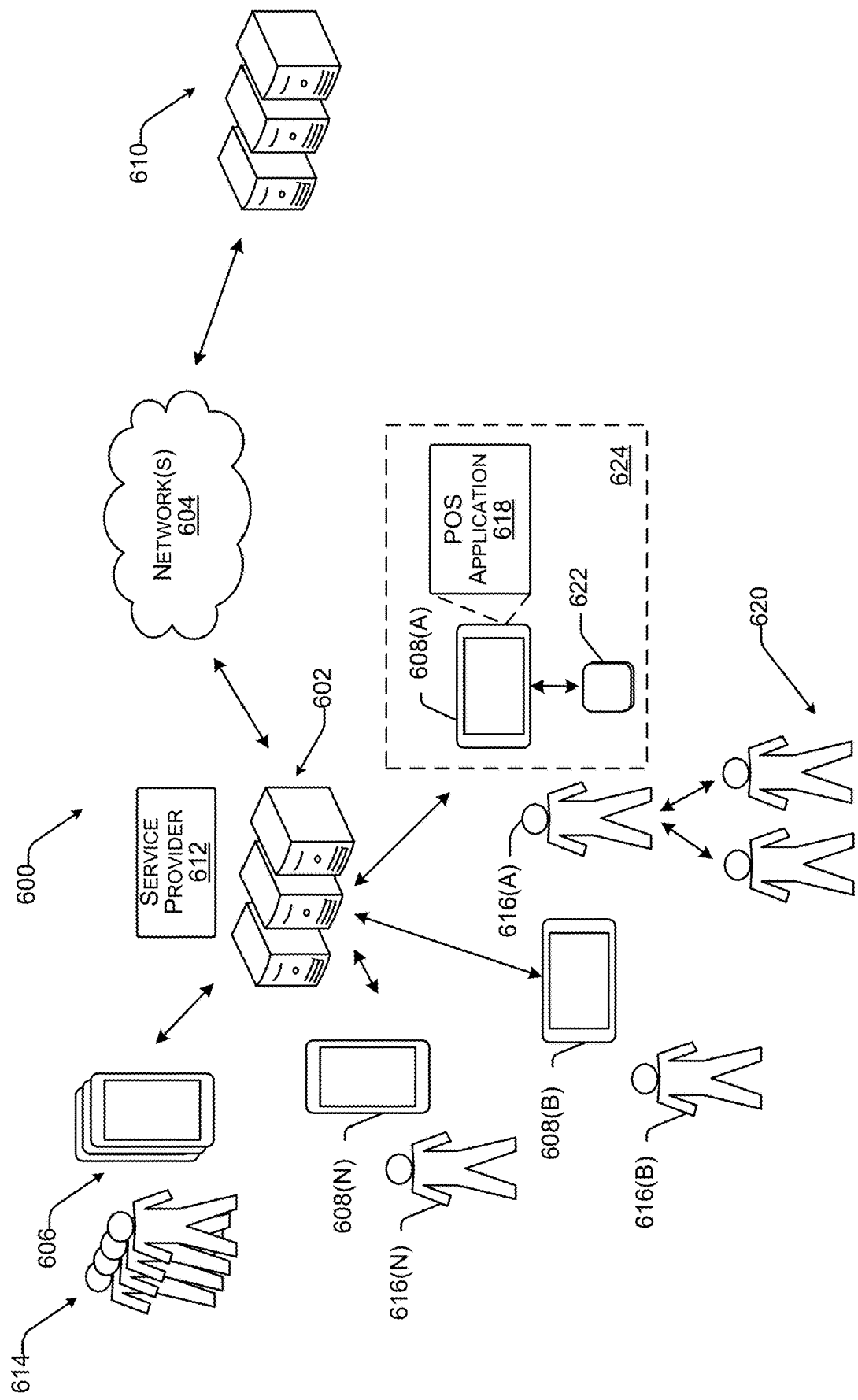
FIG. 6 illustrates an example merchant ecosystem for facilitating, among other things, techniques described herein.
Figure 7:
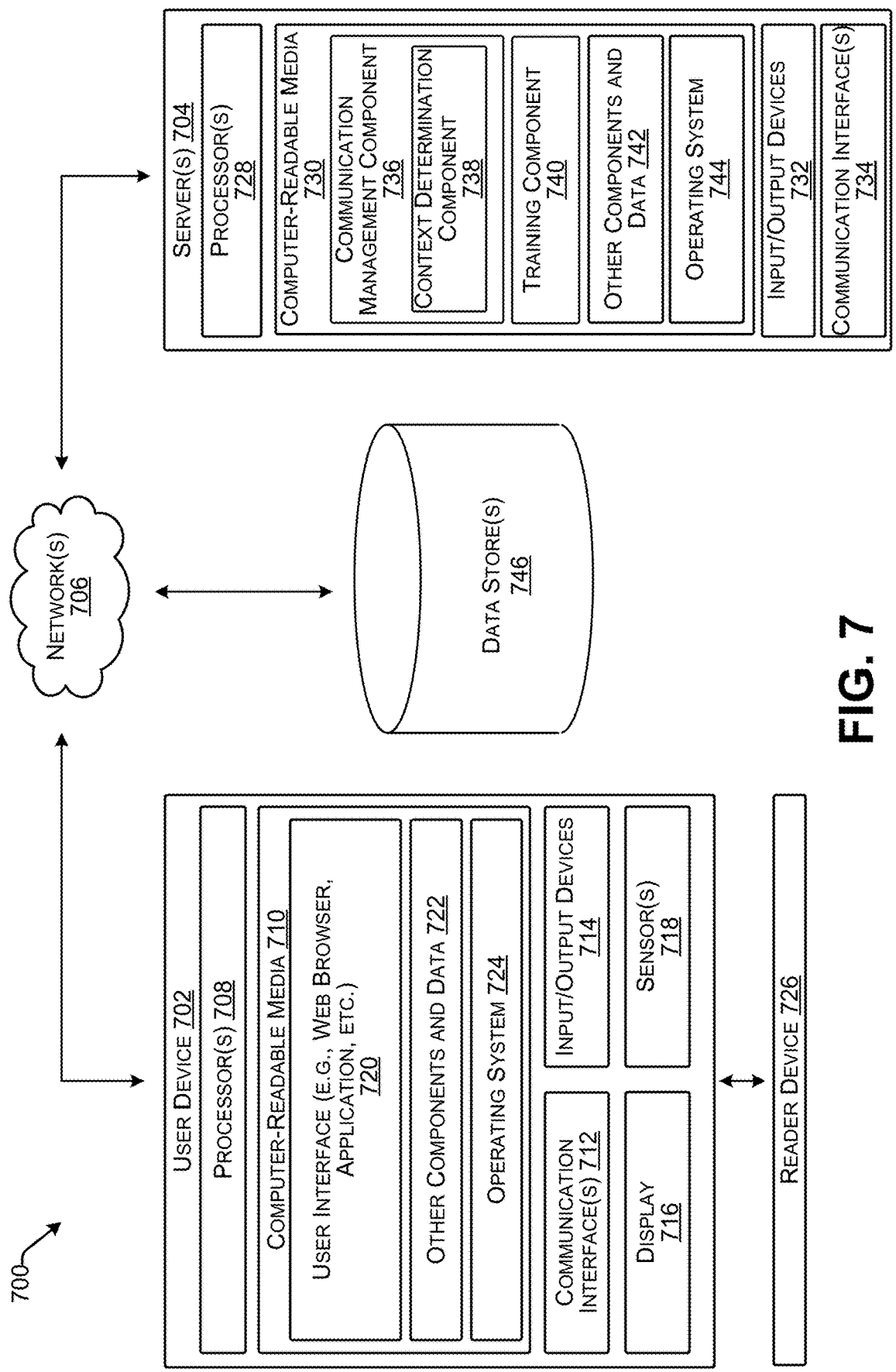
FIG. 7 illustrates additional details associated with individual components of the merchant ecosystem described above in FIG. 6.

FIGS. 3-5 and 8-9, below, are flowcharts showing example processes involving techniques as described herein. The processes illustrated in FIGS. 3-5 and 8-9 are described with reference to FIG. 1 for convenience and ease of understanding. FIGS. 6 and 7 provide additional details associated with the components of FIG. 1 above. The processes illustrated in FIGS. 3-5 and 8-9 are not limited to being performed using components described in FIG. 1, and such components are not limited to performing the processes illustrated in FIGS. 3-5 and 8-9.

The processes 300-500 and 800-900, below, are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 300-500 and 800-900 can be combined in whole or in part with each other or with other processes.

Figure 3:
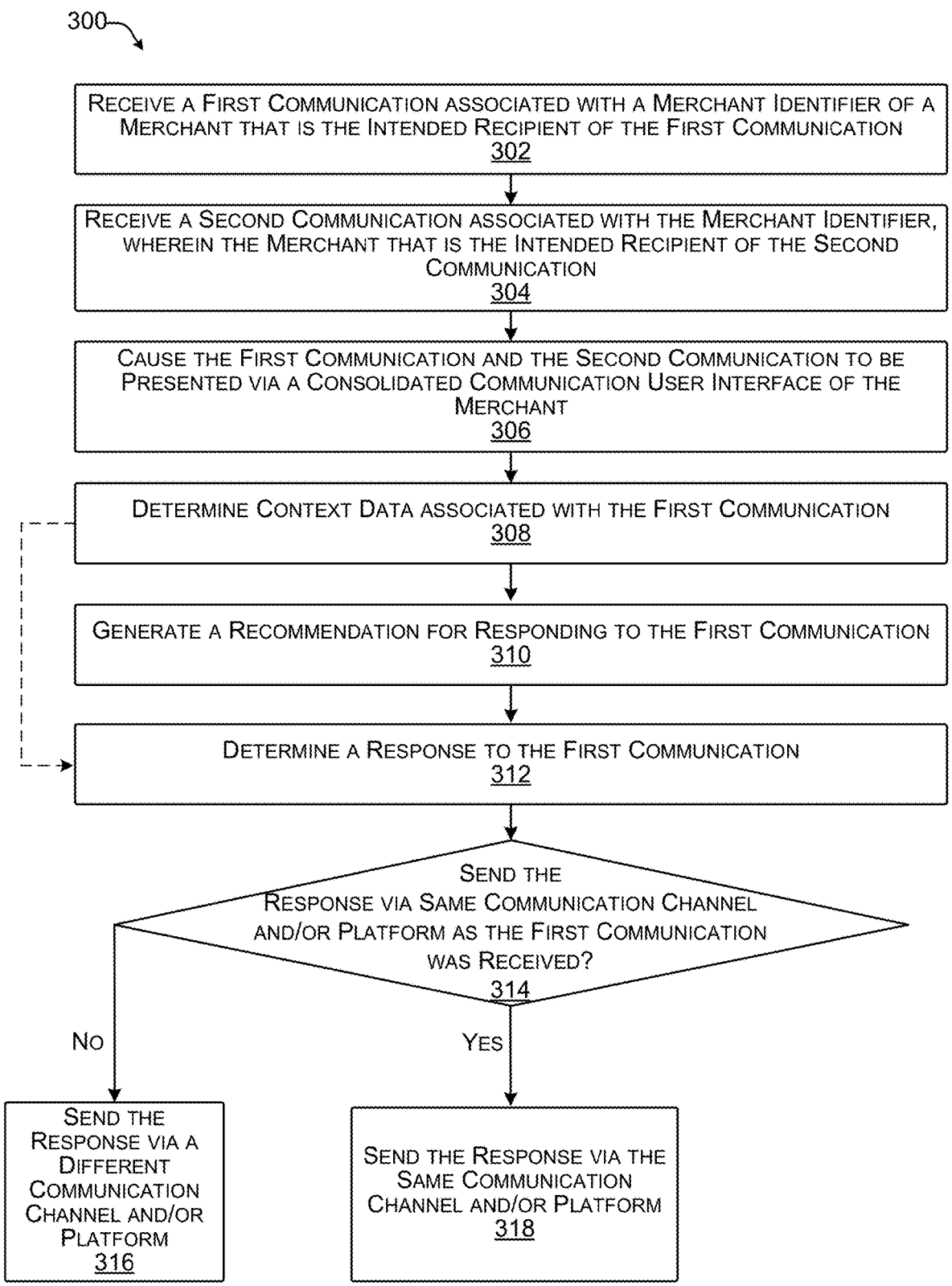
FIG. 3 illustrates an example process for generating a consolidated communication user interface as described herein.

FIG. 3 illustrates an example process 300 for generating a consolidated communication user interface as described herein.

At operation 302, the communication management component 116 can receive a first communication associated with a merchant identifier of a merchant that is the intended recipient of the first communication. In at least one example, the communication management component 116 can receive a communication from a first customer computing device, such as the customer computing device 112. In at least one example, the communication can be associated with a merchant identifier identifying the merchant and a customer identifier identifying the customer. In some examples, the customer identifier can be a device identifier or the like. In some examples, the customer identifier can be particular to the type of communication channel through which the communication is transmitted. In at least one example, the communication can be sent via a first communication channel, which can comprise a text communication, an email communication, a communication sent via a first-party application, a communication sent via a third-party application, a social media communication, and/or the like. In some examples, the communication management component 116 can associate a token, or other identifier, with the communication. The token, or other identifier, can be associated with the sending entity (e.g., the customer 108 and customer computing device 112). In some examples, the communication management component 116 can convert the communication into a "standardized format." In some examples, the converted communication can be stored (e.g., in the data store(s) 122).

At operation 304, the communication management component 116 can receive a second communication associated with the merchant identifier, wherein the merchant is the intended recipient of the second communication. In at least one example, the communication management component 116 can receive a second communication. In some examples, the second communication can be associated with the same user as the first communication. That is, in some examples, the second communication can be received from the first customer computing device 112 and/or another computing device of the customer 108 and, thus can be associated with a same token, or other identifier, as the first communication. In some examples, the second communication can be associated with a different user than the first communication. In such examples, the second communication can be received from a second customer computing device, such as the customer computing device 114 and/or another computing device of the customer 110. In such examples, the second communication can be associated with a different token, or other identifier, than the first communication. In some examples, the second communication can be received via a same communication channel as the first communication or a different communication channel as the first communication. For example, both the first communication and the second communication can be received as text communications. As another example, the first communication can be a text communication and the second communication an email, or vice versa. In some examples, the second communication can be received via a same platform as the first communication or a different platform as the first communication. For example, both the first communication and the second communication can be received via an appointments platform. As another example, the first communication can be received via an appointments platform and the second communication can be received via a feedback platform or vice versa.

At operation 306, the communication management component 116 can cause the first communication and the second communication to be presented via a consolidated communication user interface of the merchant. In at least one example, the communication management component 116 can generate the consolidated communication user interface and can send instructions for presenting the consolidated communication user interface via the merchant computing device 106. In at least one example, the communication management component 116 can aggregate communications and/or other contextual data (e.g., appointments, receipts, feedback received, orders, fulfillment actions, payments, etc.) based at least in part on such communications and/or other contextual data being associated with a same token, or other identifier. That is, communications and/or other contextual data associated with a same token, or other identifier, can be consolidated into a conversation. In examples where the first communication and the second communication are associated with a same token, or other identifier, the first communication and the second communication can be associated with a same conversation. In examples where the first communication and the second communication are associated with a different token, or other identifier, the first communication can be associated with a first conversation and the second communication can be associated with a second conversation. Representations of conversations can be presented via the consolidated communication user interface.

In some examples, the communication management component 116 can utilize the permission(s) 126 and/or rule(s) 128, described above, to selectively present the first communication and/or the second communication. In some examples, the first communication and/or the second communication can additionally or alternatively be sent as a direct communication, text communication, email, or the like to the appropriate recipient (e.g., as determined by the permission(s) 126 and/or rule(s) 128). In some examples, two different workers associated with a same merchant may see different consolidated communication user interfaces based on their respective permission(s) 126 and/or rule(s) 128.

At operation 308, the context determination component 118 can determine context data associated with the first communication. The context determination component 118 can determine context data associated with communications. In at least one example, the context determination component 118 can determine one or more of a date associated with a communication, a time associated with the communication, a topic associated with the communication, content of the communication, a merchant preference of a merchant associated with the communication, a customer preference of a customer associated with the communication, a communication channel via which the communication was received, a service/platform via which the communication was received, etc. In at least one example, the context determination component 118 can determine a date based at least in part on a datestamp associated with the communication and/or a time based at least in part on a timestamp associated with the communication.

In at least one example, the content determination component 118 can determine a merchant preference based at least in part on using a merchant identifier associated with the communication to access a merchant profile of the user profiles 124. In at least one example, the content determination component 118 can determine a merchant preference based at least in part on determining that a merchant is similar to another one or more merchants associated with the service provider (e.g., using a similarity algorithm or the like) of which one or more preferences are known. In at least one example, the context determination component 118 can determine a customer preference based at least in part on using a customer identifier associated with the communication to access a customer profile of the user profiles 124. In at least one example, the context determination component 118 can determine a customer preference based at least in part on determining that a customer is similar to another one or more customers associated with the service provider (e.g., using a similarity algorithm or the like) of which one or more preferences are known. In some examples, the context determination component 118 can determine a communication channel and/or service/platform via which the communication was received based at least in part on metadata associated with the communication.

In some examples, the context determination component 118 can determine a topic and/or content of the communication based at least in part on analyzing data associated with a communication. In some examples, the context determination component 118 can utilize natural language processing, image processing, and/or other machine-trained models to determine content of the communication. In some examples, the context determination component 118 can utilize a classifier or other model to determine semantic meaning of the communication and can determine a topic of the communication based at least in part on such a determination. In some examples, a communication can be translated into a particular language for processing and, any responses can be translated back to the original language associated with the incoming communication.

At operation 310, the communication management component 116 can generate a recommendation for responding to the first communication. In at least one example, context data can be provided to the communication management component 116. In at least one example, the communication management component 116 can utilize the context data to generate recommendations and/or perform operations with respect to messaging or other communication. For instance, in at least one example, the communication management component 116 can recommend that a communication received via a first communication channel be responded to via a second communication channel. As an additional or alternative example, the communication management component 116 can recommend that a communication received via a first platform be responded to via a second platform. In some examples, such a recommendation can be surfaced via the consolidated communication user interface 130.

In some examples, the context data can be utilized to generate a response or a recommendation for response. For example, if an incoming communication is associated with a request to reschedule an appointment, the context data associated with the incoming communication can be used by the communication management component 116 to generate a response or a recommendation for a response that includes an alternative appointment date or time. In some examples, the merchant can use the recommendation for the response for responding to the customer. In some examples, a recommendation can recommend that the merchant perform an action in association with the response, such as attaching an invoice, attaching a receipt, attaching a coupon, embedding a link (e.g., to an invoice, receipt, coupon, virtual cart, payment, appointment, etc.), attaching or embedding an image, etc. In some examples, such a recommended action can be tied to particular words or phrases, such that a recommendation can be presented while a response is being generated. In at least one example, such attachments, embeddings, and/or the like can be automatically associated with responses (e.g., instead of requiring action on behalf of the merchant). While described with reference to responses, techniques described can similarly be applicable to any communications (e.g., whether responsive or not).

At operation 312, the communication management component 116 can determine a response to the first communication. In some examples, the communication management component 116 can receive a communication from the merchant computing device 106 that is responsive to the first communication. Such a communication can be a response to the first communication. In at least one example, the communication can be associated with a merchant identifier to identify the merchant and an identifier of the recipient (e.g., a customer, vendor, or the like). In at least one example, the communication management component 116 can route the communication to the intended recipient (e.g., based at least in part on the recipient identifier associated therewith). In some examples, the communication management component 116 can associate a token, or other identifier, with the communication, which can be used for consolidating communications as described above. In some examples, the communication management component 116 can convert the communication into a particular format (e.g., from the standardized format to a text communication format or the like).

In some examples, communications that originate from the merchant computing device 106 can be associated with any of the communication channels described above (e.g., a text communication, an email communication, a communication sent via a first-party application, a communication sent via a third-party application, a social media communication, and/or the like) and/or any platform described above. In some examples, a communication sent responsive to a communication received by a customer (e.g., a response to the communication sent from the customer computing device 112 above) can be associated with a same communication channel and/or platform as the communication was received or a different communication channel and/or platform as the communication was received. That is, in an example as described above wherein a communication is sent from the customer computing device 112 to the merchant computing device 106 via a first communication channel and first platform, a response to such a communication can be sent via the first communication channel and first platform or a second communication channel and/or second platform.

In some examples, the communication management component 116 can determine a response to the first communication (e.g., using machine-learning), without having received a communication from the merchant. In such examples, the communication management component 116 can utilize rule(s) and/or machine-trained model(s) to determine content associated with the response, as described above. That is, the communication management component 116 can operate as a bot or virtual assistant in determining content of the response. In at least one example, the communication management component 116 can associate the response with a merchant identifier to identify the merchant and an identifier of the recipient (e.g., a customer, vendor, or the like). In some examples, the communication management component 116 can associate a token, or other identifier, with the communication, which can be used for consolidating communications as described above. In some examples, the communication management component 116 can convert the communication into a particular format (e.g., from the standardized format to a text communication format or the like).

At operation 314, the communication management component 116 can determine whether to send the response to the first communication via a same communication channel and/or platform as the first communication was received. In at least one example, the communication management component 116 can determine which communication channel and/or platform to send the response. In some examples, the context determination component 118 can recommend which communication channel(s) and/or platform(s) for sending communications and/or can automatically switch between different communication channel(s) and/or platform(s) to optimize communication as described herein. At operation 316, the communication management component 116 can send the response via a different communication channel and/or platform. At operation 318, the communication management component 116 can send the response via the same communication channel and/or platform.

In some examples, if the response is to be sent via a communication channel different than the communication channel through which the first communication was received, the communication management component 116 can access a customer profile to determine whether the customer profile is associated with contact information for the new communication channel. That is, the communication management component 116 can utilize the customer identifier associated with the first communication to access the customer profile corresponding to the customer identifier. The communication management component 116 can determine whether the customer profile is associated with an identifier (e.g., contact information) for the new communication channel. In some examples, such contact information can be added by the merchant and/or a customer. In some examples, such contact information can be extracted from incoming communications. In at least one example, if the customer profile is associated with such information, the communication management component 116 can send the response using the associated information. In some examples, the communication management component 116 can send a request for consent to communicate via the communication channel prior to sending the response. If the customer profile is not associated with such information (or communication via such a communication channel is restricted), the communication management component 116 can send the response via the same communication channel through which the first communication was received (or another communication channel). In some examples, the merchant can send a request prior to the response prompting the customer to input the contact information for the new communication channel.

In some examples, the example process can proceed directly from operation 308 to operation 312 without generating a recommendation for responding to the first communication, as shown by the dashed line between operations 308 and 312.

The description above describes examples where the consolidated communication user interface is presented on a merchant computing device. However, in some examples, a consolidated communication user interface can be presented on a customer computing device to consolidate messages received by a merchant or multiple merchants associated with the service provider on a single buyer application.

Figure 4:
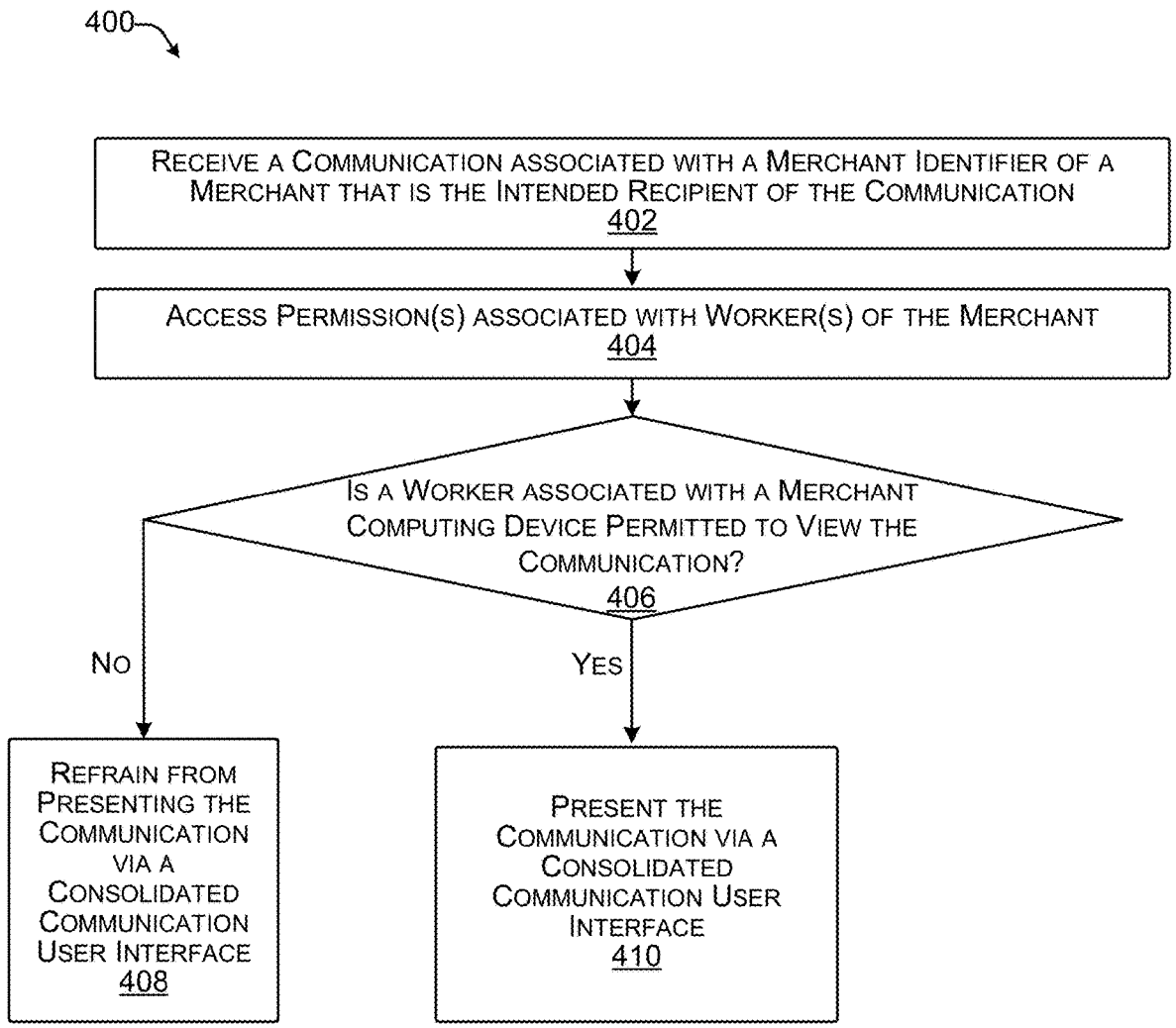
FIG. 4 illustrates an example process for selectively presenting communications to users based on permission(s) as described herein.

FIG. 4 illustrates an example process 400 for selectively presenting communications to users based on permission(s) as described herein.

At operation 402, the communication management component 116 can receive a communication associated with a merchant identifier of a merchant that is the intended recipient of the communication, as described above with reference to operation 302 of FIG. 3.

At operation 404, the communication management component 116 can access permission(s) associated with worker(s) of the merchant. In at least one example, the data store(s) 122 can store permission(s) 126. The permission(s) 126 can indicate which users are permitted to send and/or receive communications. In some examples, such permission(s) 126 can be particular to an individual worker, a merchant, a title or role associated with a worker (e.g., a worker associated with a title of "owner," "manager," "receptionist," or the like, a worker associated with a role of "full access worker," or the like, etc.), or the like. In some examples, permission(s) 126 can be particular to device codes (e.g., codes provisioned to users to grant temporary access to a functionality). The permission(s) 126 can provide security and/or access control to individual communications. In at least one example, permissions can be set via a settings user interface.

At operation 406, the communication management component 116 can determine whether a worker associated with a merchant is permitted to view the communication. In at least one example, a worker can be signed-in or logged-on to an application on the merchant computing device 108. That is, the worker can be associated with an active authentication session on the merchant computing device 108. In at least one example, the communication management component 116 can utilize an identifier of the worker (e.g., which can be accessed based on the sign-in or log-on) to determine which permission(s) 126 apply to the worker. Based at least in part on a determination that the worker is not permitted to view the communication (e.g., the permission(s) 126 indicate that the worker or a worker type or role associated with the work does not have access to the communication), the communication management component 116 can refrain from presenting the communication via the consolidated communication user interface, as illustrated at operation 408. Based at least in part on a determination that the worker is permitted to view the communication (e.g., the permission(s) 126 indicate that the worker or a worker type or role associated with the work has access to the communication), the communication management component 116 can present the communication via the consolidated communication user interface, as illustrated at operation 410.

In an example where the worker is not permitted to view the communication, the communication management component 116 can determine which worker is permitted to view the communication, based at least in part on the permission(s) 126, and can route the communication to the appropriate worker. In some examples, the permission(s) 126 can affect whether a worker is permitted to reply to a communication or otherwise interact with a communication. Utilizing the permission(s) 126 as described herein can enable the communication management component 116 to selectively present communications to relevant workers to maintain security and access control.

Figure 5:
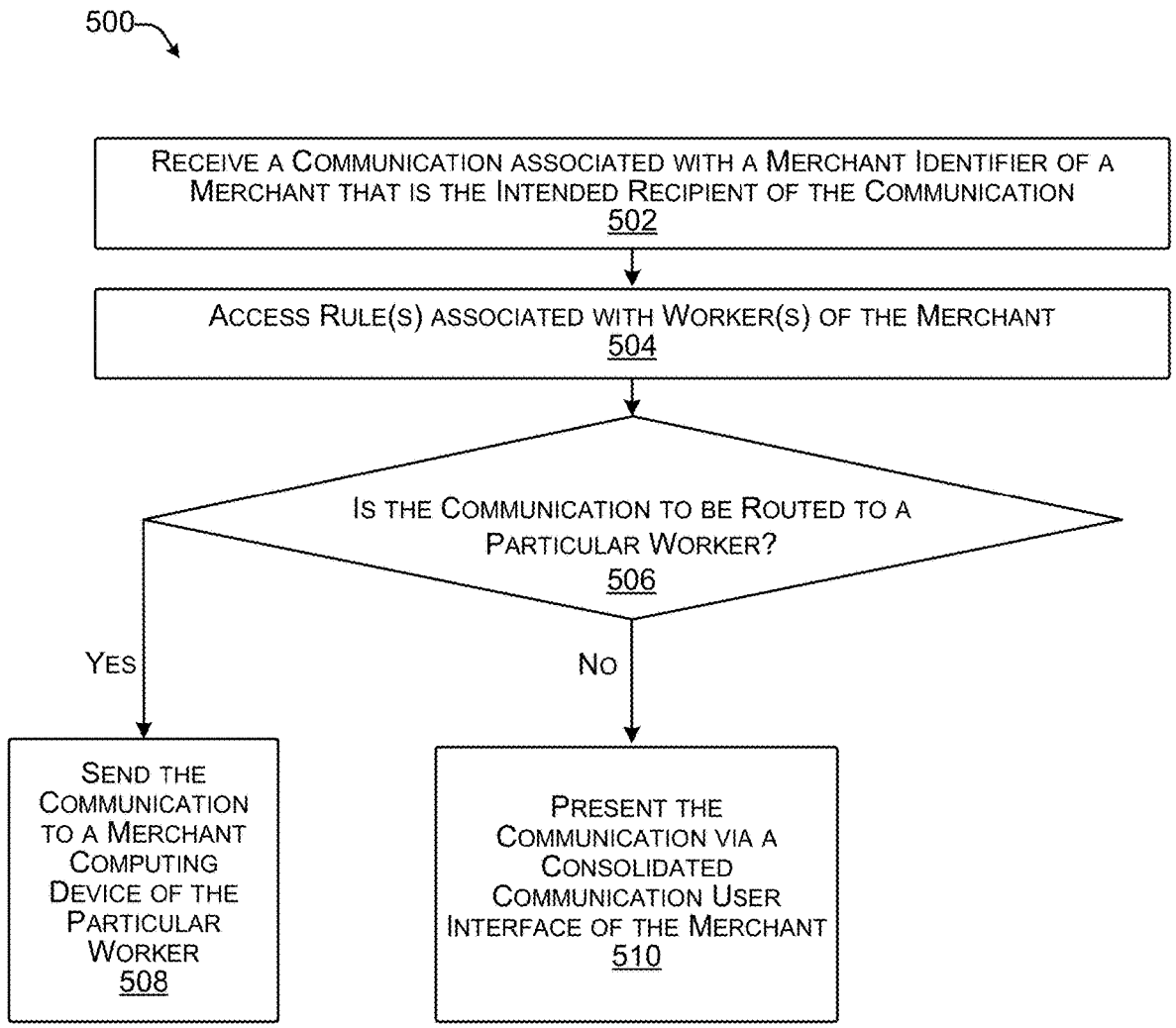
FIG. 5 illustrates an example process for routing communications to users based on rule(s) as described herein.

FIG. 5 illustrates an example process 500 for routing communications to users based on rule(s) as described herein.

At operation 502, the communication management component 116 can receive a communication associated with a merchant identifier of a merchant that is the intended recipient of the communication, as described above with reference to operation 302 of FIG. 3.

At operation 504, the communication management component 116 can access rule(s) associated with worker(s) of the merchant. As described above, the rule(s) 128 can indicate types of communications that are to be routed to particular users and/or users associated with particular titles. The rule(s) 128 can enable routing of communications to particular users and/or users associated with particular titles to enable efficient resolution of particular issues and/or requests. That is, in some examples, the rule(s) 128 can enable the communication management component 116 to route communications to particular worker(s) and/or worker(s) with particular titles, which can provide security, access control, and/or efficiencies as described herein.

At operation 506, the communication management component 116 can determine whether the communication is to be routed to a particular worker. In at least one example, the communication management component 116 can utilize context data and/or rules(s) 128, as described above, to determine if the communication is of the type that is to be handled by a particular worker and/or worker with a particular title. In at least one example, based at least in part on determining that the communication is to be routed to a particular worker, the communication management component 116 can send the communication to a merchant computing device of the particular worker, as illustrated at operation 508. In some examples, such a communication, when routed to a particular worker, can be presented via a consolidated communication user interface of the worker. In some examples, such a communication, when routed to a particular worker, can be presented as a pop-up, alert, or the like. In at least one example, based at least in part on determining that the communication is not to be routed to a particular worker, the communication management component 116 can present the communication via a consolidated communication user interface of the merchant, as illustrated at operation 508.

FIGS. 6 and 7 illustrate example environments that can, among other things, facilitate contextual communication routing and/or management. As described above, in some examples, a merchant can utilize individual platforms associated with the services to communicate with other users (e.g., customers, vendors, etc.). In some examples, each platform can be associated with multiple, different communication channels through which the merchant can send or receive communications. FIGS. 6 and 7 illustrate example environment that enable a merchant to access communications from different communication channels and/or platforms via a single access point (e.g., a consolidated communication user interface) that allows the merchant to access and/or manage communications from multiple communication channels and/or multiple platforms from one platform without having to navigate between different communication channels and/or platforms. That is, techniques described herein enable two-way communication between merchants and customers via a single access point (e.g., a consolidated communication user interface). As described above and below, the example environments can perform additional or alternative operations.

FIG. 6 illustrates an example environment 600. The environment 600 includes server computing device(s) 602 that can communicate over a network(s) 604 with user devices 606 (which, in some examples can be merchant devices 608 (individually, 608(A)-608(N))) and/or server computing device(s) 610 associated with third-party service provider(s). The server computing device(s) 602 can be associated with a service provider 612 that can provide one or more services for the benefit of users 614, as described below. Actions attributed to the service provider 612 can be performed by the server computing device(s) 602. In at least one example, the server computing device(s) 602 can correspond to the server(s) 102 of FIG. 1, the network(s) 604 can correspond to the network(s) 107 of FIG. 1, and the user devices 606 can correspond to the merchant computing device 106 and/or the customer computing devices 112, 114 of FIG. 1. The users 614 can include the merchant 104 and/or customers 108, 110 described above with reference to FIG. 1.

The environment 600 can include a plurality of user devices 606, as described above. Each one of the plurality of user devices 606 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 614. The users 614 can be referred to as customers, buyers, merchants, sellers, borrowers, employees, employers, payors, payees, couriers and so on. The users 614 can interact with the user devices 606 via user interfaces presented via the user devices 606. In at least one example, a user interface can be presented via a web browser, or the like. In other examples, a user interface can be presented via an application, such as a mobile application or desktop application, which can be provided by the service provider 612 or which can be an otherwise dedicated application. In some examples, individual of the user devices 606 can have an instance or versioned instance of an application, which can be downloaded from an application store, for example, which can present the user interface(s) described herein. In at least one example, a user 614 can interact with the user interface via touch input, spoken input, or any other type of input.

As described above, in at least one example, the users 614 can include merchants 616 (individually, 616(A)-616(N)). In an example, the merchants 616 can operate respective merchant devices 608, which can be user devices 606 configured for use by merchants 616. For the purpose of this discussion, a "merchant" can be any entity that offers items (e.g., goods or services) for purchase or other means of acquisition (e.g., rent, borrow, barter, etc.). The merchants 616 can offer items for purchase or other means of acquisition via brick-and-mortar stores, mobile stores (e.g., pop-up shops, food trucks, etc.), online stores, combinations of the foregoing, and so forth. In some examples, at least some of the merchants 616 can be associated with a same entity but can have different merchant locations and/or can have franchise/franchisee relationships. In additional or alternative examples, the merchants 616 can be different merchants. That is, in at least one example, the merchant 616(A) is a different merchant than the merchant 616(B) and/or the merchant 616(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 608 can have an instance of a POS application 618 stored thereon. The POS application 618 can configure the merchant device 608 as a POS terminal, which enables the merchant 616(A) to interact with one or more customers 620. As described above, the users 614 can include customers, such as the customers 620 shown as interacting with the merchant 616(A). For the purpose of this discussion, a "customer" can be any entity that acquires items from merchants. While only two customers 620 are illustrated in FIG. 6, any number of customers 620 can interact with the merchants 616. Further, while FIG. 6 illustrates the customers 620 interacting with the merchant 616(A), the customers 620 can interact with any of the merchants 616.

In at least one example, interactions between the customers 620 and the merchants 616 that involve the exchange of funds (from the customers 620) for items (from the merchants 616) can be referred to as "POS transactions" and/or "transactions." In at least one example, the POS application 618 can determine transaction data associated with the POS transactions. Transaction data can include payment information, which can be obtained from a reader device 622 associated with the merchant device 608(A), user authentication data, purchase amount information, point-of-purchase information (e.g., item(s) purchased, date of purchase, time of purchase, etc.), etc. The POS application 618 can send transaction data to the server computing device(s) 602. Furthermore, the POS application 618 can present a UI to enable the merchant 616(A) to interact with the POS application 618 and/or the service provider 612 via the POS application 618.

In at least one example, the merchant device 608(A) can be a special-purpose computing device configured as a POS terminal (via the execution of the POS application 618). In at least one example, the POS terminal may be connected to a reader device 622, which is capable of accepting a variety of payment instruments, such as credit cards, debit cards, gift cards, short-range communication-based payment instruments, and the like, as described below. In at least one example, the reader device 622 can plug in to a port in the merchant device 608(A), such as a microphone port, a headphone port, an audio-jack, a data port, or other suitable port. In additional or alternative examples, the reader device 622 can be coupled to the merchant device 608(A) via another wired or wireless connection, such as via a Bluetooth®, BLE, and so on. Additional details are described below with reference to FIG. 7. In some examples, the reader device 622 can read information from alternative payment instruments including, but not limited to, wristbands and the like.

In some examples, the reader device 622 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 622, and communicate with the server computing device(s) 602, which can provide, among other services, a payment processing service. The server computing device(s) 602 associated with the service provider 612 can communicate with server computing device(s) 610, as described below. In this manner, the POS terminal and reader device 622 may collectively process transaction(s) between the merchants 616 and customers 620. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 622 of the POS system 624 are shown as separate devices, in additional or alternative examples, the POS terminal and the reader device 622 can be part of a single device. In some examples, the reader device 622 can have a display integrated therein for presenting information to the customers 620. In additional or alternative examples, the POS terminal can have a display integrated therein for presenting information to the customers 620. POS systems, such as the POS system 624, may be mobile, such that POS terminals and reader devices may process transactions in disparate locations across the world. POS systems can be used for processing card-present transactions and card-not-present (CNP) transactions, as described below.

A card-present transaction is a transaction where both a customer 620 and his or her payment instrument are physically present at the time of the transaction. Card-present transactions may be processed by swipes, dips, taps, or any other interaction between a physical payment instrument (e.g., a card), or otherwise present payment instrument, and a reader device 622 whereby the reader device 622 is able to obtain payment data from the payment instrument. A swipe is a card-present transaction where a customer 620 slides a card, or other payment instrument, having a magnetic strip through a reader device 622 that captures payment data contained in the magnetic strip. A dip is a card-present transaction where a customer 620 inserts a payment instrument having an embedded microchip (i.e., chip) into a reader device 622 first. The dipped payment instrument remains in the payment reader until the reader device 622 prompts the customer 620 to remove the card, or other payment instrument. While the payment instrument is in the reader device 622, the microchip can create a one-time code which is sent from the POS system 624 to the server computing device(s) 610 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 620 may tap or hover his or her payment instrument (e.g., card, electronic device such as a smart phone running a payment application, etc.) over a reader device 622 to complete a transaction via short-range communication (e.g., NFC, RFID, Bluetooth®, BLE, etc.). Short-range communication enables the payment instrument to exchange information with the reader device 622. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 624, the server computing device(s) 602, and/or the server computing device(s) 610 may exchange payment information and transaction data to determine whether transactions are authorized. For example, the POS system 624 may provide encrypted payment data, user authentication data, purchase amount information, point-of-purchase information, etc. (collectively, transaction data) to server computing device(s) 602 over the network(s) 604. The server computing device(s) 602 may send the transaction data to the server computing device(s) 610. As described above, in at least one example, the server computing device(s) 610 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 610 associated therewith) can send a fund transfer request to a server computing device of a card payment network (e.g., Mastercard®, VISA®, etc.) to determine whether the transaction is authorized or deficient. In at least one example, the service provider 612 can serve as an acquirer and connect directly with the card payment network.

The card payment network (e.g., the server computing device(s) 610 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 610 associated therewith) can make a determination as to whether the customer has the capacity to absorb the relevant charge associated with the payment transaction. In at least one example, the service provider 612 can serve as an issuer and/or can partner with an issuer. The transaction is either approved or rejected by the issuer and/or the card payment network (e.g., the server computing device(s) 610 associated therewith), and a payment authorization communication is communicated from the issuer to the POS device via a path opposite of that described above, or via an alternate path.

As described above, the server computing device(s) 610, which can be associated with payment service provider(s), may determine whether the transaction is authorized based on the transaction data, as well as information relating to parties to the transaction (e.g., the customer 620 and/or the merchant 616(A)). The server computing device(s) 610 may send an authorization notification over the network(s) 604 to the server computing device(s) 602, which may send the authorization notification to the POS system 624 over the network(s) 604 to indicate whether the transaction is authorized. The server computing device(s) 602 may also transmit additional information such as transaction identifiers to the POS system 624. In one example, the server computing device(s) 602 may include a merchant application and/or other functional components for communicating with the POS system 624 and/or the server computing device(s) 610 to authorize or decline transactions.

Based on the authentication notification that is received by the POS system 624 from server computing device(s) 602, the merchant 616(A) may indicate to the customer 620 whether the transaction has been approved. In some examples, approval may be indicated at the POS system 624, for example, at a display of the POS system 624. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The service provider 612 can provide, among services described above and/or others, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 614 can access all of the services of the service provider 612. In other examples, the users 614 can have gradated access to the services, which can be based on risk tolerance, IDV outputs, subscriptions, and so on. In at least one example, access to such services can be availed to the merchants 616 via the POS application 618. In additional or alternative examples, each service can be associated with its own access point (e.g., application, web browser, etc.).

The service provider 612 can offer payment processing services for processing payments on behalf of the merchants 616, as described above. For example, the service provider 612 can provision payment processing software, payment processing hardware and/or payment processing services to merchants 616, as described above, to enable the merchants 616 to receive payments from the customers 620 when conducting POS transactions with the customers 620. For instance, the service provider 612 can enable the merchants 616 to receive cash payments, payment card payments, and/or electronic payments from customers 620 for POS transactions and the service provider 612 can process transactions on behalf of the merchants 616.

As the service provider 612 processes transactions on behalf of the merchants 616, the service provider 612 can maintain accounts or balances for the merchants 616 in one or more ledgers. For example, the service provider 612 can analyze transaction data received for a transaction to determine an amount of funds owed to a merchant 616(A) for the transaction. In at least one example, such an amount can be a total purchase price less fees charged by the service provider 612 for providing the payment processing services. Based on determining the amount of funds owed to the merchant 616(A), the service provider 612 can deposit funds into an account of the merchant 616(A). The account can have a stored balance, which can be managed by the service provider 612. The account can be different from a conventional bank account at least because the stored balance is managed by a ledger of the service provider 612 and the associated funds are accessible via various withdrawal channels including, but not limited to, scheduled deposit, same-day deposit, instant deposit, and a linked payment instrument.

A scheduled deposit can occur when the service provider 612 transfers funds associated with a stored balance of the merchant 616(A) to a bank account of the merchant 616(A) that is held at a bank or other financial institution (e.g., associated with the server computing device(s) 610). Scheduled deposits can occur at a prearranged time after a POS transaction is funded, which can be a business day after the POS transaction occurred, or sooner or later. In some examples, the merchant 616(A) can access funds prior to a scheduled deposit. For instance, the merchant 616(A) may have access to same-day deposits (e.g., wherein the service provider 612 deposits funds from the stored balance to a linked bank account of the merchant on a same day as POS transaction, in some examples prior to the POS transaction being funded) or instant deposits (e.g., wherein the service provider 612 deposits funds from the stored balance to a linked bank account of the merchant on demand, such as responsive to a request). Further, in at least one example, the merchant 616(A) can have a payment instrument that is linked to the stored balance that enables the merchant to access the funds without first transferring the funds from the account managed by the service provider 612 to the bank account of the merchant 616(A).

In at least one example, the service provider 612 may provide inventory management services. That is, the service provider 612 may provide inventory tracking and reporting. Inventory management services may enable the merchant 616(A) to access and manage a database storing data associated with a quantity of each item that the merchant 616(A) has available (i.e., an inventory). Furthermore, in at least one example, the service provider 612 can provide catalog management services to enable the merchant 616(A) to maintain a catalog, which can be a database storing data associated with items that the merchant 616(A) has available for acquisition (i.e., catalog management services). In at least one example, the catalog may include a plurality of data items and a data item of the plurality of data items may represent an item that the merchant 6121(A) has available for acquisition. The service provider 612 can offer recommendations related to pricing of the items, placement of items on the catalog, and multi-party fulfilment of the inventory.

In at least one example, the service provider 612 can provide business banking services, which allow the merchant 616(A) to track deposits (from payment processing and/or other sources of funds) into an account of the merchant 616(A), payroll payments from the account (e.g., payments to employees of the merchant 616(A)), payments to other merchants (e.g., business-to-business) directly from the account or from a linked debit card, withdrawals made via scheduled deposit and/or instant deposit, etc. Furthermore, the business banking services can enable the merchant 616(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 616 to visualize their cash flow to track their financial health, set aside money for upcoming obligations (e.g., savings), organize money around goals, etc.

In at least one example, the service provider 612 can provide financing services and products, such as via business loans, consumer loans, fixed term loans, flexible term loans, and the like. In at least one example, the service provider 612 can utilize one or more risk signals to determine whether to extend financing offers and/or terms associated with such financing offers.

In at least one example, the service provider 612 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 612 can offer different types of capital loan products. For instance, in at least one example, the service provider 612 can offer a daily repayment loan product, wherein a capital loan is repaid daily, for instance, from a portion of transactions processed by the payment processing service on behalf of the borrower. Additionally and/or alternatively, the service provider 612 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider 612 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 616. The service provider 612 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 612 (e.g., from payments owed to the merchant from payments processed on behalf of the merchant, funds transferred to the merchant, etc.). The service provider 612 can offer specific financial products, such as payment instruments, tied specifically to the loan products. For example, in one implementation, the server provider 612 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 612 can provide web-development services, which enable users 614 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 616. In at least one example, the service provider 612 can recommend and/or generate content items to supplement omni-channel presences of the merchants 616. That is, if a merchant of the merchants 616 has a web page, the service provider 612—via the web-development or other services— can recommend and/or generate additional content items to be presented via other channel(s), such as social media, email, etc.

Furthermore, the service provider 612 can provide payroll services to enable employers to pay employees for work performed on behalf of employers. In at least one example, the service provider 612 can receive data that includes time worked by an employee (e.g., through imported timecards and/or POS interactions), sales made by the employee, gratuities received by the employee, and so forth. Based on such data, the service provider 612 can make payroll payments to employee(s) on behalf of an employer via the payroll service. For instance, the service provider 612 can facilitate the transfer of a total amount to be paid out for the payroll of an employee from the bank of the employer to the bank of the service provider 612 to be used to make payroll payments. In at least one example, when the funds have been received at the bank of the service provider 612, the service provider 612 can pay the employee, such as by check or direct deposit, often a day, a week, or more after when the work was actually performed by the employee. In additional or alternative examples, the service provider 612 can enable employee(s) to receive payments via same-day or instant deposit based at least in part on risk and/or reliability analyses performed by the service provider 612.

Moreover, in at least one example, the service provider 612 can provide employee management services for managing schedules of employees. Further, the service provider 612 can provide appointment services for enabling users 614 to set schedules for scheduling appointments and/or users 614 to schedule appointments.

In some examples, the service provider 612 can provide restaurant management services to enable users 614 to make and/or manage reservations, to monitor front-of-house and/or back-of-house operations, and so on. In such examples, the merchant device(s) 608 and/or server computing device(s) 602 can be configured to communicate with one or more other computing devices, which can be located in the front-of-house (e.g., POS device(s)) and/or back-of-house (e.g., kitchen display system(s) (KDS)). In at least one example, the service provider 612 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 612 can provide fulfilment services, which can use couriers for delivery, wherein couriers can travel between multiple locations to provide delivery services, photography services, etc. Couriers can be users 614 who can travel between locations to perform services for a requesting user 614 (e.g., deliver items, capture images, etc.). In some examples, the courier can receive compensation from the service provider 612. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 612 can receive requests for courier services, automatically assign the requests to active couriers, and communicate dispatch instructions to couriers via user interface (e.g., application, web browser, or other access point) presented via respective devices 606.

In some examples, the service provider 612 can provide omni-channel fulfillment services. For instance, if a customer places an order with a merchant and the merchant cannot fulfill the order because one or more items are out of stock or otherwise unavailable, the service provider 612 can leverage other merchants and/or sales channels that are part of the platform of the service provider 612 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider 612 can enable conversational commerce via conversational commerce services, which can use one or more machine learning mechanisms to analyze communications exchanged between two or more users 614, voice inputs into a virtual assistant or the like, to determine intents of user(s) 614. In some examples, the service provider 612 can utilize determined intents to automate customer service, offer promotions, provide recommendations, or otherwise interact with customers in real-time. In at least one example, the service provider 612 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the service provider 612 can provide a peer-to-peer payment service that enables peer-to-peer payments between two or more users 614. In at least one example, the service provider 612 can communicate with instances of a payment application (or other access point) installed on devices 606 configured for operation by users 614. In an example, an instance of the payment application executing on a first device operated by a payor can send a request to the service provider 612 to transfer an amount of funds (e.g., fiat currency or non-fiat currency such as cryptocurrency, securities, and related assets) from an account of the payor to an account of a payee (e.g., a peer-to-peer payment). The service provider 612 can facilitate the transfer and can send a notification to an instance of the payment application executing on a second mobile device operated by the payee that the transfer is in process (or has been completed). In some examples, the service provider 612 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 612 funds the request to payee on behalf of the payor, to speed up the transfer process and compensate for any lags that may be attributed to payor's financial network.

In some implementations, the service provider 612 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee ( ₹ ), yuan (¥), etc. Although use of the dollar currency indicator ($) is used herein, it is to be understood that any currency symbol could equally be used. The peer-to-peer process can be initiated through a particular application executing on the user devices 606.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, communications on electronic bulletin boards, communications on a social networking platform, and/or any other types of communications. The forum can be employed by a content provider to enable users of the forum to interact with one another, (e.g., through creating communications, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a communication) over a wired or wireless communications network, through use of a communication. The messaging application can be employed by the service provider 612. For instance, the service provider 612 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 606 (e.g., mobile device or conventional personal computer (PC)) based on instructions transmitted to and from the server computing device(s) 602 (which, in such an example can be called a "messaging server"). In some instances, the messaging application can include a payment application with messaging capability that enables users of the payment application to communicate with one another. In such instances, the payment application can be executed on the user device 606 based on instructions transmitted to and from the server computing device(s) 602 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 612 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 614 may be new to the service provider 612 such that the user 614 that has not registered (e.g., subscribed to receive access to one or more services offered by the service provider) with the service provider 612. The service provider 612 can offer onboarding services for registering a potential user 614 with the service provider 612. In some examples, onboarding can involve presenting various questions, prompts, and the like to a potential user 614 to obtain information that can be used to generate a profile for the potential user 614. In at least one example, the service provider 612 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 614 providing all necessary information, the potential user 614 can be onboarded to the service provider 612. In such an example, any limited or short-term access to services of the service provider 612 can be transitioned to more permissive (e.g., less limited) or longer-term access to such services.

The service provider 612 can be associated with IDV services, which can be used by the service provider 612 for compliance purposes and/or can be offered as a service, for instance to third-party service providers (e.g., associated with the server computing device(s) 610). That is, the service provider 612 can offer IDV services to verify the identity of users 614 seeking to use or using their services. Identity verification requires a customer (or potential customer) to provide information that is used by compliance departments to prove that the information is associated with an identity of a real person or entity. In at least one example, the service provider 612 can perform services for determining whether identifying information provided by a user 614 accurately identifies the customer (or potential customer) (i.e., Is the customer who they say they are?).

The service provider 612 is capable of providing additional or alternative services and the services described above are offered as a sampling of services. In at least one example, the service provider 612 can exchange data with the server computing device(s) 610 associated with third-party service providers. Such third-party service providers can provide information that enables the service provider 612 to provide services, such as those described above. In additional or alternative examples, such third-party service providers can access services of the service provider 612. That is, in some examples, the third-party service providers can be subscribers, or otherwise access, services of the service provider 612.

Techniques described herein can be configured to operate in both real-time/online and offline modes. "Online" modes refer to modes when devices are capable of communicating with the service provider 612 (e.g., the server computing device(s) 602) and/or the server computing device(s) 610 via the network(s) 604. In some examples, the merchant device(s) 608 are not capable of connecting with the service provider 612 (e.g., the server computing device(s) 602) and/or the server computing device(s) 610, due to a network connectivity issue, for example. In additional or alternative examples, the server computing device(s) 602 are not capable of communicating with the server computing device(s) 610 due to network connectivity issue, for example. In such examples, devices may operate in "offline" mode where at least some payment data is stored (e.g., on the merchant device(s) 608) and/or the server computing device(s) 602 until connectivity is restored and the payment data can be transmitted to the server computing device(s) 602 and/or the server computing device(s) 610 for processing.

In at least one example, the service provider 612 can be associated with a hub, such as an order hub, an inventory hub, a fulfillment hub and so on, which can enable integration with one or more additional service providers (e.g., associated with the additional server computing device(s) 610). In some examples, such additional service providers can offer additional or alternative services and the service provider 612 can provide an interface or other computer-readable instructions to integrate functionality of the service provider 612 into the one or more additional service providers.

Techniques described herein are directed to services provided via a distributed system of user devices 606 that are in communication with one or more server computing devices 602 of the service provider 612. That is, techniques described herein are directed to a specific implementation—or, a practical application—of utilizing a distributed system of user devices 606 that are in communication with one or more server computing devices 602 of the service provider 612 to perform a variety of services, as described above. The unconventional configuration of the distributed system described herein enables the server computing device(s) 602 that are remotely-located from end-users (e.g., users 614) to intelligently offer services based on aggregated data associated with the end-users, such as the users 614 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 612, and those outside of the control of the service provider 612, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 614 and user devices 606. Furthermore, such features are changed dynamically based on the profiles of the users involved interacting with the GUIs. As such, techniques described herein are directed to improvements to computing systems.

FIG. 7 depicts an illustrative block diagram illustrating a system 700 for performing techniques described herein. The system 700 includes a user device 702, that communicates with server computing device(s) (e.g., server(s) 704) via network(s) 706 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 702 is illustrated, in additional or alternate examples, the system 700 can have multiple user devices, as described above with reference to FIG. 6. In at least one example, the user device 702 can correspond to the merchant computing device 106 and/or the customer computing devices 112, 114 of FIG. 1, the server(s) 704 can correspond to the server(s) 102 of FIG. 1, and the network(s) 706 can correspond to the network(s) 107 of FIG. 1.

In at least one example, the user device 702 can be any suitable type of computing device, e.g., portable, semi-portable, semi-stationary, or stationary. Some examples of the user device 702 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 702 can be any computing device capable of sending communications and performing the functions according to the techniques described herein. The user device 702 can include devices, e.g., payment card readers, or components capable of accepting payments, as described below.

In the illustrated example, the user device 702 includes one or more processors 708, one or more computer-readable media 710, one or more communication interface(s) 712, one or more input/output (I/O) devices 714, a display 716, and sensor(s) 718.

In at least one example, each processor 708 can itself comprise one or more processors or processing cores. For example, the processor(s) 708 can be implemented as one or more microprocessors, microcomputers, microcontrollers, digital signal processors, central processing units, state machines, logic circuitries, and/or any devices that manipulate signals based on operational instructions. In some examples, the processor(s) 708 can be one or more hardware processors and/or logic circuits of any suitable type specifically programmed or configured to execute the algorithms and processes described herein. The processor(s) 708 can be configured to fetch and execute computer-readable processor-executable instructions stored in the computer-readable media 710.

Depending on the configuration of the user device 702, the computer-readable media 710 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 710 can include, but is not limited to, RAM, ROM, EEPROM, flash memory, solid-state storage, magnetic disk storage, optical storage, and/or other computer-readable media technology. Further, in some examples, the user device 702 can access external storage, such as RAID storage systems, storage arrays, network attached storage, storage area networks, cloud storage, or any other medium that can be used to store information and that can be accessed by the processor(s) 708 directly or through another computing device or network. Accordingly, the computer-readable media 710 can be computer storage media able to store instructions, components or components that can be executed by the processor(s) 708. Further, when mentioned, non-transitory computer-readable media exclude media such as energy, carrier signals, electromagnetic waves, and signals per se.

The computer-readable media 710 can be used to store and maintain any number of functional components that are executable by the processor(s) 708. In some implementations, these functional components comprise instructions or programs that are executable by the processor(s) 708 and that, when executed, implement operational logic for performing the actions and services attributed above to the user device 702. Functional components stored in the computer-readable media 710 can include a user interface 720 to enable users to interact with the user device 702, and thus the server(s) 704 and/or other networked devices. In at least one example, the user interface 720 can be presented via a web browser, or the like. In other examples, the user interface 720 can be presented via an application, such as a mobile application or desktop application, which can be provided by a service provider 612 associated with the server(s) 704, or which can be an otherwise dedicated application. In some examples, the user interface 720 can correspond to the user interface 200 described above with reference to FIG. 2. In at least one example, the user interface 702 can present a consolidated communication user interface, or portion thereof. In at least one example, a user can interact with the user interface via touch input, spoken input, gesture, or any other type of input. The word "input" is also used to describe "contextual" input that may not be directly provided by the user via the user interface 720. For example, user's interactions with the user interface 720 are analyzed using, e.g., natural language processing techniques, to determine context or intent of the user, which may be treated in a manner similar to "direct" user input.

Depending on the type of the user device 702, the computer-readable media 710 can also optionally include other functional components and data, such as other components and data 722, which can include programs, drivers, etc., and the data used or generated by the functional components. In addition, the computer-readable media 710 can also store data, data structures and the like, that are used by the functional components. Further, the user device 702 can include many other logical, programmatic and physical components, of which those described are merely examples that are related to the discussion herein.

In at least one example, the computer-readable media 710 can include additional functional components, such as an operating system 724 for controlling and managing various functions of the user device 702 and for enabling basic user interactions.

The communication interface(s) 712 can include one or more interfaces and hardware components for enabling communication with various other devices, such as over the network(s) 706 or directly. For example, communication interface(s) 712 can enable communication through one or more network(s) 706, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 706 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 702 can further include one or more input/output (I/O) devices 714. The I/O devices 714 can include speakers, a microphone, a camera, and various user controls (e.g., buttons, a joystick, a keyboard, a keypad, etc.), a haptic output device, and so forth. The I/O devices 714 can also include attachments that leverage the accessories (audio-jack, USB-C, Bluetooth, etc.) to connect with the user device 702.

In at least one example, user device 702 can include a display 716. Depending on the type of computing device(s) used as the user device 702, the display 716 can employ any suitable display technology. For example, the display 716 can be a liquid crystal display, a plasma display, a light emitting diode display, an OLED (organic light-emitting diode) display, an electronic paper display, or any other suitable type of display able to present digital content thereon. In at least one example, the display 716 can be an augmented reality display, a virtually reality display, or any other display able to present and/or project digital content. In some examples, the display 716 can have a touch sensor associated with the display 716 to provide a touchscreen display configured to receive touch inputs for enabling interaction with a graphic interface presented on the display 716. Accordingly, implementations herein are not limited to any particular display technology. Alternatively, in some examples, the user device 702 may not include the display 716, and information can be presented by other means, such as aurally, haptically, etc.

In addition, the user device 702 can include sensor(s) 718. The sensor(s) 718 can include a GPS device able to indicate location information. Further, the sensor(s) 718 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 612, described above, to provide one or more services. That is, in some examples, the service provider 612 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 614 and/or for sending users 614 notifications regarding available appointments with merchant(s) located proximate to the users 614. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 702 can include various other components that are not shown, examples of which include removable storage, a power source, such as a battery and power control unit, a barcode scanner, a printer, a cash drawer, and so forth.

In addition, in some examples, the user device 702 can include, be connectable to, or otherwise be coupled to a reader device 726, for reading payment instruments and/or identifiers associated with payment objects. In some examples, as described above, the reader device 726 can plug in to a port in the user device 702, such as a microphone port, a headphone port, an audio-jack, a data port, or other suitable port. In additional or alternative examples, the reader device 726 can be coupled to the user device 702 via another wired or wireless connection, such as via a Bluetooth®, BLE, and so on. The reader device 726 can include a read head for reading a magnetic strip of a payment card, and further can include encryption technology for encrypting the information read from the magnetic strip. Additionally or alternatively, the reader device 726 can be an EMV payment reader, which in some examples, can be embedded in the user device 702. Moreover, numerous other types of readers can be employed with the user device 702 herein, depending on the type and configuration of the user device 702.

The reader device 726 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 726 may include hardware implementation, such as slots, magnetic tracks, and rails with one or more sensors or electrical contacts to facilitate detection and acceptance of a payment instrument. That is, the reader device 726 may include hardware implementations to enable the reader device 726 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 726 may also include a biometric sensor to receive and process biometric characteristics and process them as payment instruments, given that such biometric characteristics are registered with the payment service system 100 and connected to a financial account with a bank server.

The reader device 726 may include processing unit(s), computer-readable media, a reader chip, a transaction chip, a timer, a clock, a network interface, a power supply, and so on. The processing unit(s) of the reader device 726 may execute one or more components and/or processes to cause the reader device 726 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 726, the computer-readable media may include volatile memory (such as RAM), non-volatile memory (such as ROM, flash memory, miniature hard drive, memory card, or the like), or some combination thereof. In at least one example, the computer-readable media of the reader device 726 may include at least one component for performing various functions as described herein.

The reader chip may perform functionalities to control the operations and processing of the reader device 726. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 712, which may provide a clock signal indicating a time. Furthermore, the reader chip may perform functionality to control the network interface, which may interface with the network(s) 706, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 726. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 702, which can be a POS terminal, and the reader device 726 are shown as separate devices, in additional or alternative examples, the user device 702 and the reader device 726 can be part of a single device, which may be a battery-operated device. In such an example, components of both the user device 702 and the reader device 726 may be associated with the single device. In some examples, the reader device 726 can have a display integrated therewith, which can be in addition to (or as an alternative of) the display 716 associated with the user device 702.

The server(s) 704 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 704 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 704 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 704 can include one or more processors 728, one or more computer-readable media 730, one or more I/O devices 732, and one or more communication interfaces 734. Each processor 728 can be a single processing unit or a number of processing units, and can include single or multiple computing units or multiple processing cores. The processor(s) 728 can be implemented as one or more microprocessors, microcomputers, microcontrollers, digital signal processors, central processing units, state machines, logic circuitries, and/or any devices that manipulate signals based on operational instructions. For example, the processor(s) 728 can be one or more hardware processors and/or logic circuits of any suitable type specifically programmed or configured to execute the algorithms and processes described herein. The processor(s) 728 can be configured to fetch and execute computer-readable instructions stored in the computer-readable media 730, which can program the processor(s) 728 to perform the functions described herein.

The computer-readable media 730 can include volatile and nonvolatile memory and/or removable and non-removable media implemented in any type of technology for storage of information, such as computer-readable instructions, data structures, program components, or other data. Such computer-readable media 730 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 704, the computer-readable media 730 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 730 can be used to store any number of functional components that are executable by the processor(s) 728. In many implementations, these functional components comprise instructions or programs that are executable by the processors 728 and that, when executed, specifically configure the one or more processors 728 to perform the actions attributed above to the service provider 612 and/or payment processing service. Functional components stored in the computer-readable media 730 can optionally include a communication management component 736, which can include a context determination component 738, a training component 740, one or more other components and data 742, and an operating system 744.

The functionality of the communication management component 736, the context determination component 738, and the training component 740 are described above with reference to the communication management component 116, the context determination component 118, and the training component 120 of FIG. 1.

The one or more other components and data 742 can include a merchant component. The merchant component can be configured to receive transaction data from POS systems, such as the POS system 624 described above with reference to FIG. 6. The merchant component can transmit requests (e.g., authorization, capture, settlement, etc.) to payment service server computing device(s) to facilitate POS transactions between merchants and customers. The merchant component can communicate the successes or failures of payments associated with the POS transactions to the POS systems. Further, the one or more other components and data 742 can include programs, drivers, etc., and the data used or generated by the functional components. Further, the server(s) 704 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa. Further, SDK(s) and/or API(s) can be used by various platforms/services to enable the various platforms/services (first-party or third-party) to send and/or receive messages via techniques described herein.

The computer-readable media 730 can additionally include an operating system 744 for controlling and managing various functions of the server(s) 704.

The communication interface(s) 734 can include one or more interfaces and hardware components for enabling communication with various other devices, such as over the network(s) 706 or directly. For example, communication interface(s) 734 can enable communication through one or more network(s) 706, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 702 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 704 can further be equipped with various I/O devices 732. Such I/O devices 732 can include a display, various user interface controls (e.g., buttons, joystick, keyboard, mouse, touch screen, biometric or sensory input devices, etc.), audio speakers, connection ports and so forth.

In at least one example, the system 700 can include data store(s) 746 that can be configured to store data that is accessible, manageable, and updatable. In some examples, the data store(s) 746 can be integrated with the user device 702 and/or the server(s) 704. In other examples, as shown in FIG. 7, the data store(s) 746 can be located remotely from the server(s) 704 and can be accessible to the server(s) 704. The data store(s) 746 can comprise multiple databases and/or servers connected locally and/or remotely via the network(s) 706. In at least one example, the data store(s) 746 can correspond to the data store(s) 122, which are described above as storing user profiles, permission(s), rule(s), and/or the like. In at least one example, the data store(s) 746 can store inventory database(s) and/or catalog database(s), messaging database(s), and/or the like. As described above, an inventory database can store data associated with a quantity of each item that a merchant has available to the merchant. Furthermore, a catalog database can store data associated with items that a merchant has available for acquisition. A communication database can store communications and/or other communications exchanged via the service provider. The data store(s) 746 can store additional or alternative types of data as described herein.

Figure 8:
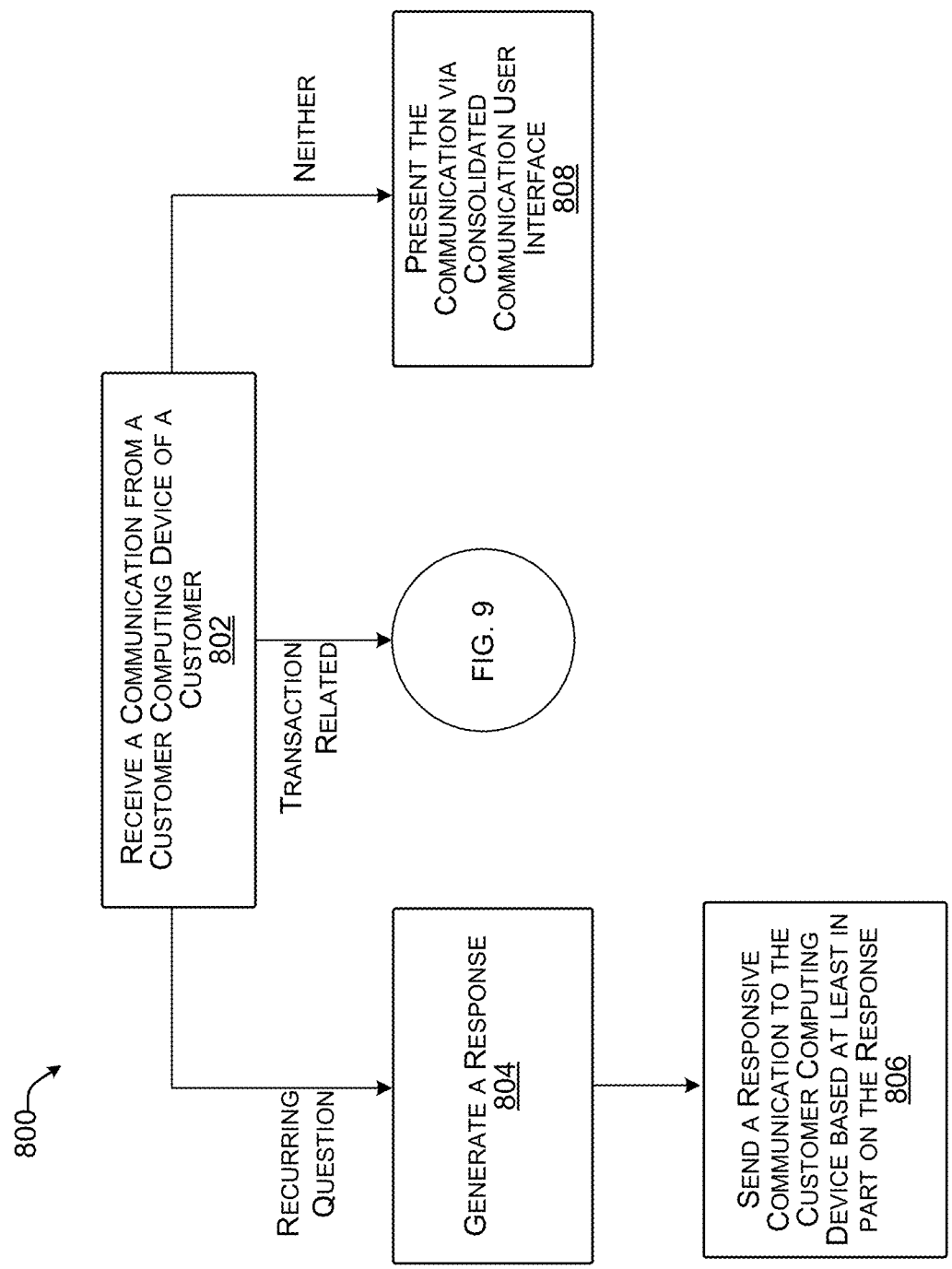
FIG. 8 illustrates an example process for responding to an incoming communication as described herein.

FIG. 8 illustrates an example process 800 for responding to an incoming communication as described herein.

At operation 802, the communication management component 116 can receive a communication from a customer computing device of a customer. In at least one example, the communication can be associated with a merchant identifier of a merchant that is the intended recipient of the communication. Additional details with such a communication, and the receiving thereof, are described above with reference to operation 302 of FIG. 3.

As described above, the context determination component 118 can determine context data associated with communications. In at least one example, the context determination component 118 can determine one or more of a date associated with a communication, a time associated with the communication, a topic associated with the communication, content of the communication, a merchant preference of a merchant associated with the communication, a customer preference of a customer associated with the communication, a communication channel via which the communication was received, a service/platform via which the communication was received, etc. In some examples, the context determination component 118 can determine a topic and/or content of the communication based at least in part on analyzing data associated with a communication (including historical communications and communications received by other similar merchants and creating a priority tree based on the history of such communications). Communications can be received in the form of questions about hours of the merchant (e.g., "when is the merchant open?"), confusion about appointments, requests to add/change services, questions regarding merchant location and other appointment details, confirmation of appointment details, post appointment questions, etc. In some examples, the context determination component 118 can utilize natural language processing, image processing, and/or other machine-trained models to determine content of the communication. In some examples, the context determination component 118 can utilize a classifier or other model to determine semantic meaning of the communication and can determine a topic of the communication based at least in part on such a determination. In some examples, a communication can be translated into a particular language for processing and, any responses can be translated back to the original language associated with the incoming communication.

In at least one example, semantic meaning and/or topics determined by the communication management component 116 can be used to determine whether incoming communications are associated with recurring questions (e.g., that can be answered via an automatic or semi-automatic process), transactions (e.g., conversational commerce), or other topics. In some examples, a classifier or other model can be trained to classify communications and, in some examples, can output a confidence score or metric indicating a confidence that a communication is classified correctly. In some examples, a classifier or other model can be trained to output additional or alternative classifications than those described with reference to FIG. 8. In some examples, the communication management component 116 can determine that a communication is associated with a particular classification based at least in part on a confidence score associated with the classification satisfying a threshold (e.g., meeting or exceeding a threshold).

At operation 804, based at least in part on the communication management component 116 determining that the communication is associated with a recurring question, the communication management component 116 can generate a response. In some examples, "recurring questions" can refer to questions that are received at a frequency above a threshold with respect to a particular merchant or across the service provider. Examples of recurring questions can include questions about discounts, taxes, sanitation and/or cleaning protocol, hours, directions, order-related questions (e.g., order status, fulfillment status, etc.), etc.

In some examples, a communication can be parsed using natural language processing, image processing, or the like. In at least one example, after a communication is parsed, context data associated with the communication can be identified in the communication. For example, key words or phrases can be identified based at least in part on such processing. For instance, the word "hours" in the question "What are your hours?" can be identified. As another example, the word "directions" in the question "What are the directions to your store?" can be identified. Such key words or phrases can be used to generate a response or recommendation for responding to a particular question. In some examples, as described above, a temporal expression can be identified in the communication and the temporal expression can be used to determine a response to the communication. This can be particularly helpful in extracting details with respect to time, for example, for appointments, reservations, or the like.

In some examples, the context data can be utilized to generate a response or a recommendation for response, or even provide an array of responses to choose from. That is, in at least one example, based at least in part on identifying context data associated with the communication, the communication management component 116 can generate a response, or a portion thereof, for responding to the communication. In some examples, the response can be automatically generated without input from the user. In some examples, a portion of a response can be automatically generated, and the user can provide the remaining portion of the response. In some examples, automatically or semi-automatically generated responses can be associated with attachments, coupons, and/or embedded functionality (e.g., deeplinks, hyperlinks, etc.). In some examples, sentence similarity can be used to create responses matching the original question thus ensuring "conversational flow."

In at least one example, responses to recurring questions can be generated using machine-trained model(s) and/or rule(s). In some examples, a bot or virtual assistant can be trained based on previous communications exchanged via the communication management component 116. In some examples, rule(s) can be designed by merchant(s) to provide response(s) to recurring question(s). In some examples, such rule(s) can be designed in response to a merchant answering a same or similar question more than a threshold number of times with a same answer. The communication management component 116 can prompt the merchant to determine whether the merchant desires to design a rule for answering the same or similar question in the future.

At operation 806, the communication management component 116 can send a responsive communication to the customer computing device based at least in part on the response. In some examples, a responsive communication can be sent automatically, without input from the merchant. In some examples, a merchant can approve the communication to be sent prior to the communication management component 116 sending the communication. In any event, the responsive communication can be sent to the customer computing device of the customer. As described above, in at least one example, the communication management component 116 can use machine learning and/or artificial intelligence to intelligently determine which communication channels and/or platforms to route communications.

Figure 9:
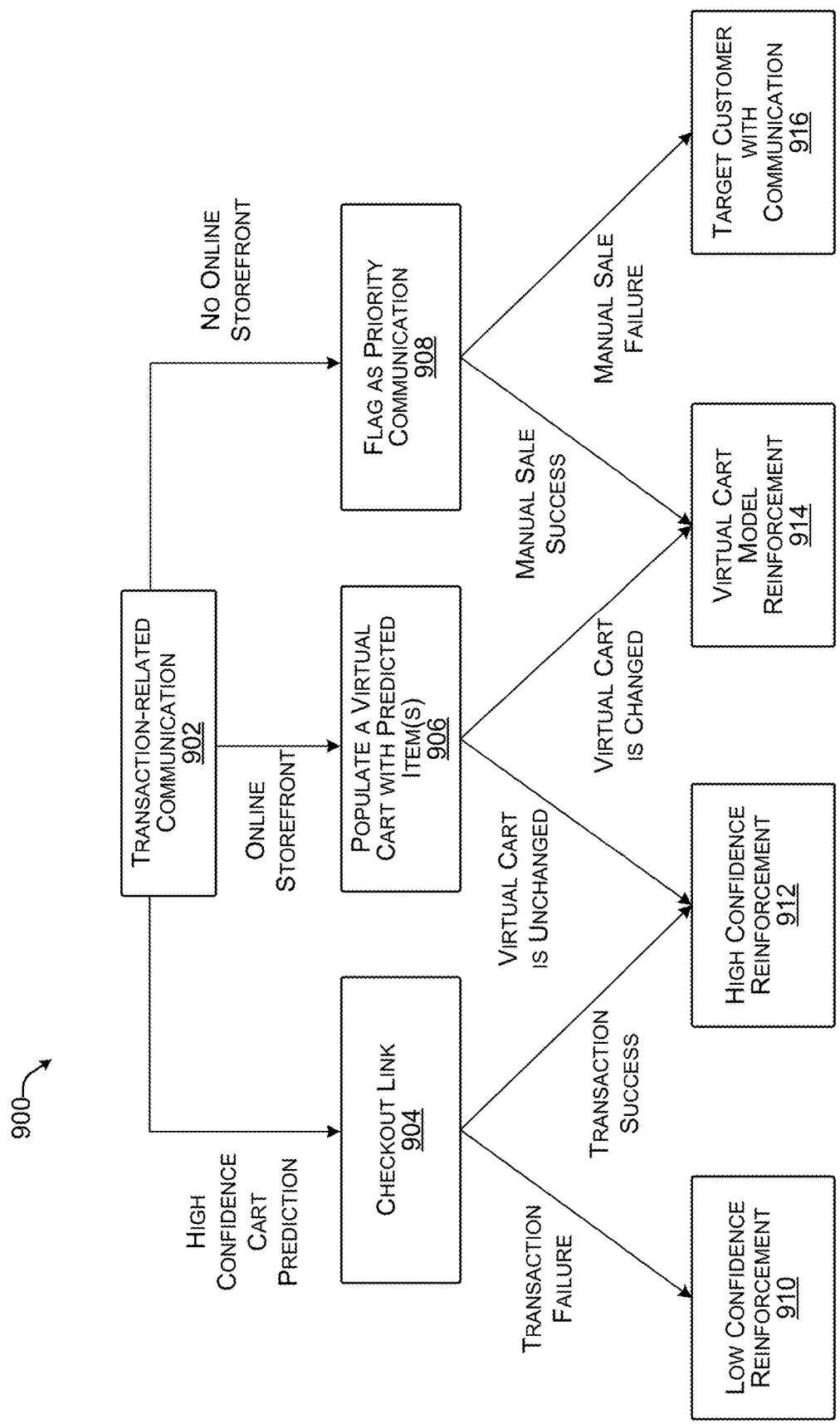
FIG. 9 illustrates an example process for responding to a transaction-related communication and/or updating a model based on responses and subsequent actions of a customer as described herein.

In at least one example, based at least in part on the communication management component 116 determining that the communication is transaction-related, the process 800 can continue as described in FIG. 9. In some examples, transaction-related communications can relate to invoices, sales, or the like. As described below with reference to FIG. 9 and in some examples, when a communication is associated with a confidence score that satisfies a threshold indicating that the communication is transaction-related, the communication management component 116 can associate a link or other mechanism (e.g., an "online checkout link," a virtual cart, etc.) that can facilitate a transaction for one or more items with a responsive communication. In some examples, such a communication can be sent automatically, without input from the merchant. In some examples, a merchant can approve the communication to be sent prior to the communication management component 116 sending the communication. As such, a recipient of the responsive communication can complete a transaction via interaction with the link or other mechanism.

In some examples, one or more communications can be exchanged between the customer and the merchant (e.g., via the service provider) to identify particular item(s) to be associated with a transaction. In some examples, at least some of the one or more communications can be handled by a bot or virtual assistant. In some examples, as described above, context data can be utilized to generate responses or recommendations for responses, or even provide an array of responses to choose from to facilitate the one or more communications. Sentence similarity can be used to create responses matching the original question thus ensuring "conversational flow."

At operation 808, based at least in part on the communication management component 116 determining that the communication is associated with neither a recurring question nor a transaction, the communication can be presented via the consolidated communication user interface as described above. In some examples, if the communication management component 116 determines that the communication is not associated with a recurring question or a transaction, determines that the communication is associated with another classification, or the like, the communication management component 116 can cause the communication to be presented via the consolidated communication user interface, as described above.

As illustrated in FIG. 8, in some examples, communications can be automatically or semi-automatically handled via the communication management component 116 with little or no input from the merchant. In some examples, communications that are automatically or semi-automatically handled may not be presented in the consolidated communication user interface. In some examples, such communications may be presented in the consolidated communication user interface but may be deprioritized, deemphasized, or the like.

FIG. 8 is but one example of how incoming communications can be responded to and/or routed. That is, in some examples, communications can be classified in additional or alternative classifications. In some examples, recurring questions can be answered manually or semi-automatically. In some examples, transaction-related communications can be answered manually or semi-automatically. In some examples, other communications can be answered automatically. That is, FIG. 8 is provided as an example, but additional or alternative implementations are within the scope of this disclosure.

FIG. 9 illustrates an example process 900 for responding to a transaction-related communication and/or updating a model based on responses and subsequent actions of a customer as described herein. As described above, in some examples, the communication management component 116 can determine that a communication is a transaction-related communication, as illustrated at operation 902. An example of such might be "I want to buy X," wherein "X" is a particular item, class of item, or the like. Other transaction-related communications can include "Can I get another soda?" or "Do you sell yoga pants?"

In at least one example, as described above, the communication management component 116 can process a received communication (e.g., using image processing, natural language processing, etc.) to determine context data associated with the communication. In at least one example, the communication management component 116 can utilize confidence scores or other metrics to determine a confidence associated with context data. In at least one example, based at least in part on determining that a confidence score indicating a likelihood that the transaction-related communication is associated with a particular item or items meets or exceeds a threshold, or is within a first range, the communication management component 116 can associate a checkout link or other mechanism to facilitate a payment for the item(s) with a responsive communication, as illustrated at operation 904, and send the responsive communication to the customer computing device of the customer. In at least one example, if the confidence score is below the threshold or is within a second range below the first range, the communication management component 116 may not associate a checkout link or other mechanism to facilitate a payment for the item(s) with a responsive communication and, instead, may populate a virtual cart with one or more items that the communication management component 116 predicts to be associated with the transaction-related communication (but at a confidence below a threshold or in a second range), as illustrated at operation 906. In at least one example, if the merchant with whom the transaction-related communication is sent does not have an online storefront (e.g., only brick-and-mortar, online storefront is not online, etc.), the communication management component 116 can flag the transaction-related communication as a priority, as illustrated at operation 908, such that the communication, when presented via the consolidated communication user interface, is presented and/or otherwise handled as a high-priority communication.

In some examples, the customer response can be used to update or retrain model(s) described herein. For example, if a transaction fails (e.g., the checkout link provided to the customer at operation 904 is not used to complete a transaction), the communication management component 116 can provide an indication of such to the training component 120, which can tune or modify a low confidence reinforcement associated with model(s) described herein, as illustrated at operation 910. In at least one example, if a transaction is successful (e.g., the checkout link provided to the customer at operation 904 is used to complete a transaction) or the virtual cart provided to the customer at operation 906 is unchanged (and the customer purchased each of the item(s) in the virtual cart), the communication management component 116 can provide an indication of such to the training component 120, which can tune or modify a high confidence reinforcement associated with model(s) as described herein, as illustrated at operation 912. In an example where the customer modifies item(s) provided in the virtual cart at operation 906, the communication management component 116 can provide an indication of such to the training component 120, which can tune or modify a virtual cart model reinforcement associated with model(s) described herein, as illustrated at operation 914. In some examples, if, in response to a communication generated by the merchant, a manual transaction associated with the communication is recorded (e.g., "manual sale success"), the communication management component 116 can provide an indication of such to the training component 120, which can tune or modify a virtual cart model reinforcement associated with model(s) described herein, as illustrated at operation 914. In some examples, if, in response to a communication generated by the merchant, a manual transaction associated with the communication is not recorded (e.g., "manual sale failure"), the communication management component 116 can target the customer with a communication, as illustrated at operation 916. In some examples, such a targeted communication can include a coupon, incentive, request for feedback, or the like.

FIGS. 10A-10C illustrate an example user interface 1000 associated with conversational commerce, as described herein. As described above, the communication management component 116 can receive a communication from a customer computing device of a customer, such as the customer computing device 112 of customer 108 of FIG. 1. In at least one example, the communication 1002 can be presented via the user interface 1000 in association with a conversation between the customer 108 and the merchant 104. The user interface 1000 can be presented via a customer-facing application, a web browser, or the like, which can be associated with the customer computing device 112. In at least one example, the communication can be presented via a user interface presented via the merchant computing device 106, an example of which is described above with reference to FIGS. 2A-2D.

As described above, the context determination component 118 can determine context data associated with communications. In at least one example, the context determination component 118 can determine one or more of a date associated with a communication, a time associated with the communication, a topic associated with the communication, content of the communication, a merchant preference of a merchant associated with the communication, a customer preference of a customer associated with the communication, a communication channel via which the communication was received, a service/platform via which the communication was received, etc. In some examples, the context determination component 118 can determine a topic and/or content of the communication based at least in part on analyzing data associated with a communication (including historical communications and communications received by other similar merchants and creating a priority tree based on the history of such communications). Communications can be received in the form of questions about hours of the merchant (e.g., "when is the merchant open?"), confusion about appointments, requests to add/change services, questions regarding merchant location and other appointment details, confirmation of appointment details, post appointment questions, etc. In some examples, the context determination component 118 can utilize natural language processing, image processing, and/or other machine-trained models to determine content of the communication. In some examples, the context determination component 118 can utilize a classifier or other model to determine semantic meaning of the communication and can determine a topic of the communication based at least in part on such a determination. In some examples, a communication can be translated into a particular language for processing and, any responses can be translated back to the original language associated with the incoming communication.

In at least one example, semantic meaning and/or topics determined by the communication management component 116 can be used to determine whether incoming communications are associated with recurring questions (e.g., that can be answered via an automatic or semi-automatic process), transactions (e.g., conversational commerce), or other topics. In at least one example, the communication management component 116 can determine that the communication is associated with a transaction. In at least one example, based at least in part on the communication management component 116 determining that the communication is transaction related.

In at least one example, based at least in part on determining that a confidence score indicating a likelihood that the transaction-related communication is associated with a particular item or items meets or exceeds a threshold, or is within a first range, the communication management component 116 can associate a checkout link or other mechanism to facilitate a payment for the item(s) with a responsive communication and send the responsive communication to the customer computing device of the customer. In at least one example, the communication management component 116 can determine that the communication is associated with a particular item (e.g., Red X Brand shoes in size 8), and can generate a checkout link to enable the customer to purchase the item. As illustrated in FIG. 10B, the communication management component 116 can cause a responsive communication 1004 and/or a checkout link 1006 to enable the customer to purchase the item referenced in the communication 1006. In at least one example, the checkout link 1006 can be associated with an actuation mechanism that when actuated can cause a payment interface 1008 to be presented via the user interface 1000. As such, the customer can input payment data (e.g., a credit card, debit card, user identifier associated with a stored balance, or the like) to purchase the item.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 1, 6, and 7 for convenience and ease of understanding. However, the methods illustrated are not limited to being performed using components described in FIGS. 1, 6, and 7, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Example Clauses

A. A method, implemented at least in part by a server computing device of a service provider, the method comprising: receiving, from a computing device of a first customer, a first communication via a first communication channel, wherein the first communication is associated with a first service offered by the service provider, and wherein the first communication is associated with a merchant identifier of a merchant, associated with the service provider, that is an intended recipient of the first communication; determining context data associated with the first communication; generating, based at least in part on the context data and in response to receiving the first communication, a recommendation for the merchant to respond via at least one of (i) a second communication channel that is different than the first communication channel or (ii) a second service, offered by the service provider, that is different than the first service; and causing, based at least in part on the merchant identifier, the first communication and the recommendation to be presented via a consolidated communication user interface of a computing device of the merchant, wherein the consolidated communication user interface presents at least (i) the first communication and (ii) a second communication between the merchant and a second customer of the merchant.

B. The method as clause A recites, wherein the first communication channel is associated with an email, text communication, first-party application communication, or third-party application communication.

C. The method as clause A or B recites, wherein the first service is associated with at least one of a feedback service, an appointment service, a payroll service, a marketing service, a directory service, a gift card service, a loyalty service, an invoice service, an estimate service, a contracts service, a reservation service, an ecommerce service, or a chat service.

D. The method as any of clauses A-C recites, wherein the first communication is associated with one or more of a text object, an image object, a video object, or a file object.

E. The method as any of clauses A-D recites, wherein the second communication is associated with at least one of a different communication channel than the first communication channel or a different service than the first service.

F. The method as any of clauses A-E recites, wherein the first communication is associated with a first identifier of the first customer, wherein the first identifier is associated with the first communication channel, the further comprising: accessing, based at least in part on the first identifier and from a database associated with the service provider, a customer profile associated with the first customer, wherein the customer profile stores contact information associated with the first customer; determining, based at least in part on the contact information, a second identifier associated with the second communication channel; and based at least in part on receiving, from the computing device of the merchant, a third communication to be sent to the first customer in response to the first communication, associating the third communication with the second identifier for transmission via the second communication channel.

G. The method as any of clauses A-F recites, wherein the context data is associated with at least one of a date associated with the first communication, a time associated with the first communication, a topic associated with the first communication, content of the first communication, a merchant preference of the merchant, a customer preference of the customer, the first communication channel, or the first service.

H. The method as any of clauses A-G recites, wherein the context data is determined based at least in part on analyzing the first communication using at least one of natural language processing or another machine-trained model, wherein the other machine-trained model is trained based at least in part on analyzing previous communications transmitted by the service provider.

I. The method as any of clauses A-H recites, further comprising: identifying, based at least in part on analyzing the first communication using at least one of natural language processing or another machine-trained model, a temporal expression associated with the first communication; determining, based at least in part on the temporal expression, a response for the first communication; and causing the response to be presented with the first communication and the recommendation via the consolidated communication user interface.

J. The method as clause I recites, wherein the first communication is associated with a request to reschedule an appointment, and wherein the response is associated with a new date or time for the appointment.

K. The method as any of clauses A-J recites, further comprising: storing, in a data store associated with the service provider, one or more permissions associated with the merchant, wherein the one or more permissions designate which workers associated with the merchant are permitted to view incoming communications; determining that the computing device of the merchant is authenticated for use by a particular worker associated with the merchant; determining, based at least in part on the one or more permissions, that the particular worker is permitted to view the first communication; and causing the first communication to be presented via the consolidated communication user interface based at least in part on determining that the particular worker is permitted to view the first communication and that the computing device of the merchant is authenticated for use by the particular worker associated with the merchant.

L. The method as any of clauses A-K recites, further comprising: storing, in a database associated with the service provider, one or more permissions associated with the merchant, wherein the one or more permissions designate which workers associated with the merchant are permitted to send outgoing communications; receiving, from the computing device of the merchant, a third communication to be sent to the first customer in response to the first communication; determining that the computing device of the merchant is authenticated for use by a particular worker associated with the merchant; determining, based at least in part on the one or more permissions, that the particular worker is permitted to send the third communication; and sending the third communication to the computing device of the first customer.

M. The method as any of clauses A-L recites, further comprising: storing, in a database associated with the service provider, one or more routing rules associated with the merchant, wherein the one or more routing rules designate that a particular type of communication is to be routed to a worker, associated with the merchant, that is associated with a particular role; determining, based at least in part on the context data and the one or more routing rules, that the first communication is to be routed to the worker associated with the particular role; determining that the computing device of the merchant is authenticated for use by the worker that is associated with the particular role; determining, based at least in part on a determination that the computing device of the merchant is authenticated for use by the worker that is associated with the particular role, to send the first communication to the computing device of the merchant; and causing the first communication to be presented via the consolidated communication user interface based at least in part on determining to send the first communication to the computing device of the merchant.

N. A system comprising: one or more processors; and one or more non-transitory computer-readable media storing instructions that, when executed by the one or more processors, cause the system to perform operations comprising: receiving, from a computing device of a first customer, a first communication via a first communication channel, wherein the first communication is associated with a first service offered by a service provider, and wherein the first communication is associated with a merchant identifier of a merchant, associated with the service provider, that is an intended recipient of the first communication; determining context data associated with the first communication; generating, based at least in part on the context data and in response to receiving the first communication, a recommendation for the merchant to respond via at least one of (i) a second communication channel that is different than the first communication channel or (ii) a second service, offered by the service provider, that is different than the first service; and causing, based at least in part on the merchant identifier, the first communication and the recommendation to be presented via a consolidated communication user interface of a computing device of the merchant, wherein the consolidated communication user interface presents at least (i) the first communication and (ii) a second communication between the merchant and a second customer of the merchant.

O. The system as clause N recites, wherein the first communication channel is associated with an email, text communication, first-party application communication, or third-party application communication.

P. The system as clause N or O recites, wherein the first service is associated with at least one of a feedback service, an appointment service, a payroll service, a marketing service, a directory service, a gift card service, a loyalty service, an invoice service, an estimate service, a contracts service, a reservation service, an ecommerce service, or a chat service.

Q. The system as any of clauses N-P recites, wherein the first communication is associated with one or more of a text object, an image object, a video object, or a file object.

R. The system as any of clauses N-Q recites, wherein the second communication is associated with at least one of a different communication channel than the first communication channel or a different service than the first service.

S. The system as any of clauses N-R recites, wherein the first communication is associated with a first identifier of the first customer, wherein the first identifier is associated with the first communication channel, the operations further comprising: accessing, based at least in part on the first identifier and from a database associated with the service provider, a customer profile associated with the first customer, wherein the customer profile stores contact information associated with the first customer; determining, based at least in part on the contact information, a second identifier associated with the second communication channel; and based at least in part on receiving, from the computing device of the merchant, a third communication to be sent to the first customer in response to the first communication, associating the third communication with the second identifier for transmission via the second communication channel.

T. The system as any of clauses N-S recites, wherein the context data is associated with at least one of a date associated with the first communication, a time associated with the first communication, a topic associated with the first communication, content of the first communication, a merchant preference of the merchant, a customer preference of the customer, the first communication channel, or the first service.

U. The system as any of clauses N-T recites, wherein the context data is determined based at least in part on analyzing the first communication using at least one of natural language processing or another machine-trained model, wherein the other machine-trained model is trained based at least in part on analyzing previous communications transmitted by the service provider.

V. The system as any of clauses N-U recites, the operations further comprising: identifying, based at least in part on analyzing the first communication using at least one of natural language processing or another machine-trained model, a temporal expression associated with the first communication; determining, based at least in part on the temporal expression, a response for the first communication; and causing the response to be presented with the first communication and the recommendation via the consolidated communication user interface.

W. The system as clause V recites, wherein the first communication is associated with a request to reschedule an appointment, and wherein the response is associated with a new date or time for the appointment.

X. The system as any of clauses N-W recites, the operations further comprising: storing, in a data store associated with the service provider, one or more permissions associated with the merchant, wherein the one or more permissions designate which workers associated with the merchant are permitted to view incoming communications; determining that the computing device of the merchant is authenticated for use by a particular worker associated with the merchant; determining, based at least in part on the one or more permissions, that the particular worker is permitted to view the first communication; and causing the first communication to be presented via the consolidated communication user interface based at least in part on determining that the particular worker is permitted to view the first communication and that the computing device of the merchant is authenticated for use by the particular worker associated with the merchant.

Y. The system as any of clauses N-X recites, the operations further comprising: storing, in a database associated with the service provider, one or more permissions associated with the merchant, wherein the one or more permissions designate which workers associated with the merchant are permitted to send outgoing communications; receiving, from the computing device of the merchant, a third communication to be sent to the first customer in response to the first communication; determining that the computing device of the merchant is authenticated for use by a particular worker associated with the merchant; determining, based at least in part on the one or more permissions, that the particular worker is permitted to send the third communication; and sending the third communication to the computing device of the first customer.

Z. The system as any of clauses N-Y recites, the operations further comprising: storing, in a database associated with the service provider, one or more routing rules associated with the merchant, wherein the one or more routing rules designate that a particular type of communication is to be routed to a worker, associated with the merchant, that is associated with a particular role; determining, based at least in part on the context data and the one or more routing rules, that the first communication is to be routed to the worker associated with the particular role; determining that the computing device of the merchant is authenticated for use by the worker that is associated with the particular role; determining, based at least in part on a determination that the computing device of the merchant is authenticated for use by the worker that is associated with the particular role, to send the first communication to the computing device of the merchant; and causing the first communication to be presented via the consolidated communication user interface based at least in part on determining to send the first communication to the computing device of the merchant.

AA. One or more non-transitory computer-readable media storing instructions that, when executed by one or more processors, cause the one or more processors to perform operations comprising: receiving, from a computing device of a first customer, a first communication via a first communication channel, wherein the first communication is associated with a first service offered by a service provider, and wherein the first communication is associated with a merchant identifier of a merchant, associated with the service provider, that is an intended recipient of the first communication; determining context data associated with the first communication; generating, based at least in part on the context data and in response to receiving the first communication, a recommendation for the merchant to respond via at least one of (i) a second communication channel that is different than the first communication channel or (ii) a second service, offered by the service provider, that is different than the first service; and causing, based at least in part on the merchant identifier, the first communication and the recommendation to be presented via a consolidated communication user interface of a computing device of the merchant, wherein the consolidated communication user interface presents at least (i) the first communication and (ii) a second communication between the merchant and a second customer of the merchant.

AB. The one or more non-transitory computer-readable media as clause AA recites, wherein the first communication channel is associated with an email, text communication, first-party application communication, or third-party application communication.

AC. The one or more non-transitory computer-readable media as clause AA or AB recites, wherein the first service is associated with at least one of a feedback service, an appointment service, a payroll service, a marketing service, a directory service, a gift card service, a loyalty service, an invoice service, an estimate service, a contracts service, a reservation service, an ecommerce service, or a chat service.

AD. The one or more non-transitory computer-readable media as any of clauses AA-AC recites, wherein the first communication is associated with one or more of a text object, an image object, a video object, or a file object.

AE. The one or more non-transitory computer-readable media as any of clauses AA-AD recites, wherein the second communication is associated with at least one of a different communication channel than the first communication channel or a different service than the first service.

AF. The one or more non-transitory computer-readable media as any of clauses AA-AE recites, wherein the first communication is associated with a first identifier of the first customer, wherein the first identifier is associated with the first communication channel, the operations further comprising: accessing, based at least in part on the first identifier and from a database associated with the service provider, a customer profile associated with the first customer, wherein the customer profile stores contact information associated with the first customer; determining, based at least in part on the contact information, a second identifier associated with the second communication channel; and based at least in part on receiving, from the computing device of the merchant, a third communication to be sent to the first customer in response to the first communication, associating the third communication with the second identifier for transmission via the second communication channel.

AG. The one or more non-transitory computer-readable media as any of clauses AA-AF recites, wherein the context data is associated with at least one of a date associated with the first communication, a time associated with the first communication, a topic associated with the first communication, content of the first communication, a merchant preference of the merchant, a customer preference of the customer, the first communication channel, or the first service.

AH. The one or more non-transitory computer-readable media as any of clauses AA-AG recites, wherein the context data is determined based at least in part on analyzing the first communication using at least one of natural language processing or another machine-trained model, wherein the other machine-trained model is trained based at least in part on analyzing previous communications transmitted by the service provider.

AI. The one or more non-transitory computer-readable media as any of clauses AA-AH recites, the operations further comprising: identifying, based at least in part on analyzing the first communication using at least one of natural language processing or another machine-trained model, a temporal expression associated with the first communication; determining, based at least in part on the temporal expression, a response for the first communication; and causing the response to be presented with the first communication and the recommendation via the consolidated communication user interface.

AJ. The one or more non-transitory computer-readable media as clause AI recites, wherein the first communication is associated with a request to reschedule an appointment, and wherein the response is associated with a new date or time for the appointment.

AK. The one or more non-transitory computer-readable media as any of clauses AA-AJ recites, the operations further comprising: storing, in a data store associated with the service provider, one or more permissions associated with the merchant, wherein the one or more permissions designate which workers associated with the merchant are permitted to view incoming communications; determining that the computing device of the merchant is authenticated for use by a particular worker associated with the merchant; determining, based at least in part on the one or more permissions, that the particular worker is permitted to view the first communication; and causing the first communication to be presented via the consolidated communication user interface based at least in part on determining that the particular worker is permitted to view the first communication and that the computing device of the merchant is authenticated for use by the particular worker associated with the merchant.

AL. The one or more non-transitory computer-readable media as any of clauses AA-AK recites, the operations further comprising: storing, in a database associated with the service provider, one or more permissions associated with the merchant, wherein the one or more permissions designate which workers associated with the merchant are permitted to send outgoing communications; receiving, from the computing device of the merchant, a third communication to be sent to the first customer in response to the first communication; determining that the computing device of the merchant is authenticated for use by a particular worker associated with the merchant; determining, based at least in part on the one or more permissions, that the particular worker is permitted to send the third communication; and sending the third communication to the computing device of the first customer.

AM. The one or more non-transitory computer-readable media as any of clauses AA-AL recites, the operations further comprising: storing, in a database associated with the service provider, one or more routing rules associated with the merchant, wherein the one or more routing rules designate that a particular type of communication is to be routed to a worker, associated with the merchant, that is associated with a particular role; determining, based at least in part on the context data and the one or more routing rules, that the first communication is to be routed to the worker associated with the particular role; determining that the computing device of the merchant is authenticated for use by the worker that is associated with the particular role; determining, based at least in part on a determination that the computing device of the merchant is authenticated for use by the worker that is associated with the particular role, to send the first communication to the computing device of the merchant; and causing the first communication to be presented via the consolidated communication user interface based at least in part on determining to send the first communication to the computing device of the merchant.

AN. A method, implemented at least in part by a server computing device of a service provider, the method comprising: receiving, from a computing device of a first customer, a first communication via a first communication channel, wherein the first communication is associated with a first service offered by the service provider, and wherein the first communication is associated with a merchant identifier of a merchant, associated with the service provider, that is an intended recipient of the first communication; determining context data associated with the first communication; generating, based at least in part on the context data and in response to receiving the first communication, a recommendation for the merchant to respond via at least one of (i) a second communication channel that is different than the first communication channel or (ii) a second service, offered by the service provider, that is different than the first service; and causing, based at least in part on the merchant identifier, the first communication and the recommendation to be presented via a consolidated communication user interface of a computing device of the merchant, wherein the consolidated communication user interface presents at least (i) the first communication and (ii) a second communication between the merchant and a second customer of the merchant.

AO. The method as clause AN recites, wherein the second communication is associated with at least one of a different communication channel than the first communication channel or a different service than the first service.

AP. The method as clause AN or AO recites, wherein the first communication is associated with a first identifier of the first customer, wherein the first identifier is associated with the first communication channel, the further comprising: accessing, based at least in part on the first identifier and from a data store associated with the service provider, a customer profile associated with the first customer, wherein the customer profile stores contact information associated with the first customer; determining, based at least in part on the contact information, a second identifier associated with the second communication channel; and based at least in part on receiving, from the computing device of the merchant, a third communication to be sent to the first customer in response to the first communication, associating the third communication with the second identifier for transmission via the second communication channel.

AQ. The method as any of clauses AN-AP recites, wherein the context data is associated with at least one of a date associated with the first communication, a time associated with the first communication, a topic associated with the first communication, content of the first communication, a merchant preference of the merchant, a customer preference of the customer, the first communication channel, or the first service.

AR. The method as any of clauses AN-AQ recites, wherein the context data is determined based at least in part on analyzing the first communication using at least one of natural language processing or another machine-trained model, wherein the other machine-trained model is trained based at least in part on analyzing previous communications transmitted by the service provider.

AS. The method as any of clauses AN-AR recites, further comprising: identifying, based at least in part on analyzing the first communication using at least one of natural language processing or another machine-trained model, a temporal expression associated with the first communication; determining, based at least in part on the temporal expression, a response for the first communication; and causing the response to be presented with the first communication and the recommendation via the consolidated communication user interface.

AT. The method as clause AS recites, wherein the first communication is associated with a request to reschedule an appointment, and wherein the response is associated with a new date or time for the appointment.

AU. The method as any of clauses AN-AT recites, further comprising: storing, in a data store associated with the service provider, one or more permissions associated with the merchant, wherein the one or more permissions designate which workers associated with the merchant are permitted to view incoming communications; determining that the computing device of the merchant is authenticated for use by a particular worker associated with the merchant; determining, based at least in part on the one or more permissions, that the particular worker is permitted to view the first communication; and causing the first communication to be presented via the consolidated communication user interface based at least in part on determining that the particular worker is permitted to view the first communication and that the computing device of the merchant is authenticated for use by the particular worker associated with the merchant.

AV. The method as any of clauses AN-AU recites, further comprising: storing, in a data store associated with the service provider, one or more permissions associated with the merchant, wherein the one or more permissions designate which workers associated with the merchant are permitted to send outgoing communications; receiving, from the computing device of the merchant, a third communication to be sent to the first customer in response to the first communication; determining that the computing device of the merchant is authenticated for use by a particular worker associated with the merchant; determining, based at least in part on the one or more permissions, that the particular worker is permitted to send the third communication; and sending the third communication to the computing device of the first customer.

AW. The method as any of clauses AN-AV recites, further comprising: storing, in a data store associated with the service provider, one or more routing rules associated with the merchant, wherein the one or more routing rules designate that a particular type of communication is to be routed to a worker, associated with the merchant, that is associated with a particular role; determining, based at least in part on the context data and the one or more routing rules, that the first communication is to be routed to the worker associated with the particular role; determining that the computing device of the merchant is authenticated for use by the worker that is associated with the particular role; determining, based at least in part on a determination that the computing device of the merchant is authenticated for use by the worker that is associated with the particular role, to send the first communication to the computing device of the merchant; and causing the first communication to be presented via the consolidated communication user interface based at least in part on determining to send the first communication to the computing device of the merchant.

AX. A system comprising: one or more processors; and one or more non-transitory computer-readable media storing instructions that, when executed by the one or more processors, cause the system to perform operations comprising: receiving, from a computing device of a first customer, a first communication via a first communication channel, wherein the first communication is associated with a first service offered by a service provider, and wherein the first communication is associated with a merchant identifier of a merchant, associated with the service provider, that is an intended recipient of the first communication; determining context data associated with the first communication; generating, based at least in part on the context data and in response to receiving the first communication, a recommendation for the merchant to respond via at least one of (i) a second communication channel that is different than the first communication channel or (ii) a second service, offered by the service provider, that is different than the first service; and causing, based at least in part on the merchant identifier, the first communication and the recommendation to be presented via a consolidated communication user interface of a computing device of the merchant, wherein the consolidated communication user interface presents at least (i) the first communication and (ii) a second communication between the merchant and a second customer of the merchant.

AY. The system as clause AX recites, wherein the first communication channel is associated with an email, text communication, first-party application communication, or third-party application communication, and wherein the first service is associated with at least one of a feedback service, an appointment service, a payroll service, a marketing service, a directory service, a gift card service, a loyalty service, an invoice service, an estimate service, a contracts service, a reservation service, an ecommerce service, or a chat service.

AZ. The system as clause AX or AY recites, wherein the second communication is associated with at least one of a different communication channel than the first communication channel or a different service than the first service.

BA. The system as any of clauses AX-AZ recites, wherein the first communication is associated with a first identifier of the first customer, wherein the first identifier is associated with the first communication channel, the operations further comprising: accessing, based at least in part on the first identifier and from a data store associated with the service provider, a customer profile associated with the first customer, wherein the customer profile stores contact information associated with the first customer; determining, based at least in part on the contact information, a second identifier associated with the second communication channel; and based at least in part on receiving, from the computing device of the merchant, a third communication to be sent to the first customer in response to the first communication, associating the third communication with the second identifier for transmission via the second communication channel.

BB. One or more non-transitory computer-readable media storing instructions that, when executed by one or more processors, cause the one or more processors to perform operations comprising: receiving, from a computing device of a first customer, a first communication via a first communication channel, wherein the first communication is associated with a first service offered by a service provider, and wherein the first communication is associated with a merchant identifier of a merchant, associated with the service provider, that is an intended recipient of the first communication; determining context data associated with the first communication; generating, based at least in part on the context data and in response to receiving the first communication, a recommendation for the merchant to respond via at least one of (i) a second communication channel that is different than the first communication channel or (ii) a second service, offered by the service provider, that is different than the first service; and causing, based at least in part on the merchant identifier, the first communication and the recommendation to be presented via a consolidated communication user interface of a computing device of the merchant, wherein the consolidated communication user interface presents at least (i) the first communication and (ii) a second communication between the merchant and a second customer of the merchant.

BC. The one or more non-transitory computer-readable media as clause BB recites, wherein the second communication is associated with at least one of a different communication channel than the first communication channel or a different service than the first service.

BD. The one or more non-transitory computer-readable media as clause BB or BC recites, the operations further comprising: identifying, based at least in part on analyzing the first communication using at least one of natural language processing or another machine-trained model, a temporal expression associated with the first communication; determining, based at least in part on the temporal expression, a response for the first communication; and causing the response to be presented with the first communication and the recommendation via the consolidated communication user interface, wherein the first communication is associated with a request to reschedule an appointment, and wherein the response is associated with a new date or time for the appointment.

BE. The one or more non-transitory computer-readable media as any of clauses BB-BD recites, the operations further comprising: storing, in a data store associated with the service provider, one or more permissions associated with the merchant, wherein the one or more permissions designate which workers associated with the merchant are permitted to view incoming communications; determining that the computing device of the merchant is authenticated for use by a particular worker associated with the merchant; determining, based at least in part on the one or more permissions, that the particular worker is permitted to view the first communication; and causing the first communication to be presented via the consolidated communication user interface based at least in part on determining that the particular worker is permitted to view the first communication and that the computing device of the merchant is authenticated for use by the particular worker associated with the merchant.

BF. The one or more non-transitory computer-readable media as any of clauses BB-BE recites, the operations further comprising: storing, in a data store associated with the service provider, one or more permissions associated with the merchant, wherein the one or more permissions designate which workers associated with the merchant are permitted to send outgoing communications; receiving, from the computing device of the merchant, a third communication to be sent to the first customer in response to the first communication; determining that the computing device of the merchant is authenticated for use by a particular worker associated with the merchant; determining, based at least in part on the one or more permissions, that the particular worker is permitted to send the third communication; and sending the third communication to the computing device of the first customer.

BG. The one or more non-transitory computer-readable media as any of clauses BB-BF recites, the operations further comprising: storing, in a data store associated with the service provider, one or more routing rules associated with the merchant, wherein the one or more routing rules designate that a particular type of communication is to be routed to a worker, associated with the merchant, that is associated with a particular role; determining, based at least in part on the context data and the one or more routing rules, that the first communication is to be routed to the worker associated with the particular role; determining that the computing device of the merchant is authenticated for use by the worker that is associated with the particular role; determining, based at least in part on a determination that the computing device of the merchant is authenticated for use by the worker that is associated with the particular role, to send the first communication to the computing device of the merchant; and causing the first communication to be presented via the consolidated communication user interface based at least in part on determining to send the first communication to the computing device of the merchant.

While the clauses above are described with respect to one particular implementation, it should be understood that, in the context of this document, the content of the clauses above can also be implemented via a method, device, system, a computer-readable medium, and/or another implementation. Additionally, any of clauses A-BG may be implemented alone or in combination with any other one or more of the clauses A-BG.

What is claimed is:

1. A method, implemented at least in part by a server computing device of a service provider, the method comprising:
    receiving, from a computing device of a first customer, a first communication via a first communication channel, wherein the first communication is associated with a first service offered by the service provider, and wherein the first communication is associated with a merchant identifier of a merchant that is (i) associated with the service provider and (ii) an intended recipient of the first communication;
    determining context data associated with the first communication;
    generating, based at least in part on the context data and in response to receiving the first communication, a recommendation for the merchant to respond via at least one of (i) a second communication channel that is different than the first communication channel or (ii) a second service, offered by the service provider, that is different than the first service; and
    causing, based at least in part on the merchant identifier, the first communication and the recommendation to be presented via a consolidated communication user interface of a computing device of the merchant, wherein the consolidated communication user interface presents at least (i) the first communication and (ii) a second communication between the merchant and a second customer of the merchant.

2. The method as claim 1 recites, wherein the second communication is associated with at least one of a different communication channel than the first communication channel or a different service than the first service.

3. The method as claim 1 recites, wherein the first communication is associated with a first identifier of the first customer, wherein the first identifier is associated with the first communication channel, the method further comprising:
    accessing, based at least in part on the first identifier and from a data store associated with the service provider, a customer profile associated with the first customer, wherein the customer profile stores contact information associated with the first customer;
    determining, based at least in part on the contact information, a second identifier associated with the second communication channel; and
    based at least in part on receiving, from the computing device of the merchant, a third communication to be sent to the first customer in response to the first communication, associating the third communication with the second identifier for transmission via the second communication channel.

4. The method as claim 1 recites, wherein the context data is associated with at least one of a date associated with the first communication, a time associated with the first communication, a topic associated with the first communication, content of the first communication, a merchant preference of the merchant, a customer preference of the first customer, the first communication channel, or the first service.

5. The method as claim 1 recites, wherein the context data is determined based at least in part on analyzing the first communication using at least one of natural language processing or a machine-trained model, wherein the machine-trained model is trained based at least in part on analyzing previous communications transmitted by the service provider.

6. The method as claim 1 recites, further comprising:
    identifying, based at least in part on analyzing the first communication using at least one of natural language processing or a machine-trained model, a temporal expression associated with the first communication;
    determining, based at least in part on the temporal expression, a response for the first communication; and
    causing the response to be presented with the first communication and the recommendation via the consolidated communication user interface.

7. The method as claim 6 recites, wherein the first communication is associated with a request to reschedule an appointment, and wherein the response is associated with a new date or time for the appointment.

8. The method as claim 1 recites, further comprising:
storing, in a data store associated with the service provider, one or more permissions associated with the merchant, wherein the one or more permissions designate which workers associated with the merchant are permitted to view incoming communications;
determining that the computing device of the merchant is authenticated for use by a particular worker associated with the merchant;
determining, based at least in part on the one or more permissions, that the particular worker is permitted to view the first communication; and
causing the first communication to be presented via the consolidated communication user interface based at least in part on determining that the particular worker is permitted to view the first communication and that the computing device of the merchant is authenticated for use by the particular worker associated with the merchant.

9. The method as claim 1 recites, further comprising:
storing, in a data store associated with the service provider, one or more permissions associated with the merchant, wherein the one or more permissions designate which workers associated with the merchant are permitted to send outgoing communications;
receiving, from the computing device of the merchant, a third communication to be sent to the first customer in response to the first communication;
determining that the computing device of the merchant is authenticated for use by a particular worker associated with the merchant;
determining, based at least in part on the one or more permissions, that the particular worker is permitted to send the third communication; and
sending the third communication to the computing device of the first customer.

10. The method as claim 1 recites, further comprising:
storing, in a data store associated with the service provider, one or more routing rules associated with the merchant, wherein the one or more routing rules designate that a particular type of communication is to be routed to a worker, associated with the merchant, that is associated with a particular role;
determining, based at least in part on the context data and the one or more routing rules, that the first communication is to be routed to the worker associated with the particular role;
determining that the computing device of the merchant is authenticated for use by the worker that is associated with the particular role;
determining, based at least in part on a determination that the computing device of the merchant is authenticated for use by the worker that is associated with the particular role, to send the first communication to the computing device of the merchant; and
causing the first communication to be presented via the consolidated communication user interface based at least in part on determining to send the first communication to the computing device of the merchant.

11. A system comprising:
one or more processors; and
one or more non-transitory computer-readable media storing instructions that, when executed by the one or more processors, cause the system to perform operations comprising:
receiving, from a computing device of a first customer, a first communication via a first communication channel, wherein the first communication is associated with a first service offered by a service provider, and wherein the first communication is associated with a merchant identifier of a merchant that is (i) associated with the service provider and (ii) an intended recipient of the first communication;
determining context data associated with the first communication;
generating, based at least in part on the context data and in response to receiving the first communication, a recommendation for the merchant to respond via at least one of (i) a second communication channel that is different than the first communication channel or (ii) a second service, offered by the service provider, that is different than the first service; and
causing, based at least in part on the merchant identifier, the first communication and the recommendation to be presented via a consolidated communication user interface of a computing device of the merchant, wherein the consolidated communication user interface presents at least (i) the first communication and (ii) a second communication between the merchant and a second customer of the merchant.

12. The system as claim 11 recites, wherein the first communication channel is associated with an email, text communication, first-party application communication, or third-party application communication, and wherein the first service is associated with at least one of a feedback service, an appointment service, a payroll service, a marketing service, a directory service, a gift card service, a loyalty service, an invoice service, an estimate service, a contracts service, a reservation service, an ecommerce service, or a chat service.

13. The system as claim 11 recites, wherein the second communication is associated with at least one of a different communication channel than the first communication channel or a different service than the first service.

14. The system as claim 11 recites, wherein the first communication is associated with a first identifier of the first customer, wherein the first identifier is associated with the first communication channel, the operations further comprising:
accessing, based at least in part on the first identifier and from a data store associated with the service provider, a customer profile associated with the first customer, wherein the customer profile stores contact information associated with the first customer;
determining, based at least in part on the contact information, a second identifier associated with the second communication channel; and
based at least in part on receiving, from the computing device of the merchant, a third communication to be sent to the first customer in response to the first communication, associating the third communication with the second identifier for transmission via the second communication channel.

15. One or more non-transitory computer-readable media storing instructions that, when executed by one or more processors, cause the one or more processors to perform operations comprising:
receiving, from a computing device of a first customer, a first communication via a first communication channel, wherein the first communication is associated with a first service offered by a service provider, and wherein the first communication is associated with a merchant identifier of a merchant that is (i) associated with the service provider and (ii) an intended recipient of the first communication;

determining context data associated with the first communication;

generating, based at least in part on the context data and in response to receiving the first communication, a recommendation for the merchant to respond via at least one of (i) a second communication channel that is different than the first communication channel or (ii) a second service, offered by the service provider, that is different than the first service; and causing, based at least in part on the merchant identifier, the first communication and the recommendation to be presented via a consolidated communication user interface of a computing device of the merchant, wherein the consolidated communication user interface presents at least (i) the first communication and (ii) a second communication between the merchant and a second customer of the merchant.

16. The one or more non-transitory computer-readable media as claim 15 recites, wherein the second communication is associated with at least one of a different communication channel than the first communication channel or a different service than the first service.

17. The one or more non-transitory computer-readable media as claim 15 recites, the operations further comprising:
identifying, based at least in part on analyzing the first communication using at least one of natural language processing or a machine-trained model, a temporal expression associated with the first communication;
determining, based at least in part on the temporal expression, a response for the first communication; and
causing the response to be presented with the first communication and the recommendation via the consolidated communication user interface, wherein the first communication is associated with a request to reschedule an appointment, and wherein the response is associated with a new date or time for the appointment.

18. The one or more non-transitory computer-readable media as claim 15 recites, the operations further comprising:
storing, in a data store associated with the service provider, one or more permissions associated with the merchant, wherein the one or more permissions designate which workers associated with the merchant are permitted to view incoming communications;
determining that the computing device of the merchant is authenticated for use by a particular worker associated with the merchant;
determining, based at least in part on the one or more permissions, that the particular worker is permitted to view the first communication; and causing the first communication to be presented via the consolidated communication user interface based at least in part on determining that the particular worker is permitted to view the first communication and that the computing device of the merchant is authenticated for use by the particular worker associated with the merchant.

19. The one or more non-transitory computer-readable media as claim 15 recites, the operations further comprising:
storing, in a data store associated with the service provider, one or more permissions associated with the merchant, wherein the one or more permissions designate which workers associated with the merchant are permitted to send outgoing communications;
receiving, from the computing device of the merchant, a third communication to be sent to the first customer in response to the first communication;
determining that the computing device of the merchant is authenticated for use by a particular worker associated with the merchant;
determining, based at least in part on the one or more permissions, that the particular worker is permitted to send the third communication; and
sending the third communication to the computing device of the first customer.

20. The one or more non-transitory computer-readable media as claim 15 recites, the operations further comprising:
storing, in a data store associated with the service provider, one or more routing rules associated with the merchant, wherein the one or more routing rules designate that a particular type of communication is to be routed to a worker, associated with the merchant, that is associated with a particular role;
determining, based at least in part on the context data and the one or more routing rules, that the first communication is to be routed to the worker associated with the particular role;
determining that the computing device of the merchant is authenticated for use by the worker that is associated with the particular role;
determining, based at least in part on a determination that the computing device of the merchant is authenticated for use by the worker that is associated with the particular role, to send the first communication to the computing device of the merchant; and
causing the first communication to be presented via the consolidated communication user interface based at least in part on determining to send the first communication to the computing device of the merchant.

* * * * *